US012810828B2

(12) United States Patent
Yeates et al.

(10) Patent No.: US 12,810,828 B2
(45) Date of Patent: Nov. 24, 2026

(54) MUSICAL INSTRUMENT MOUNTING SYSTEM

(71) Applicant: Ultimate Drill Book, Inc., Austin, TX (US)

(72) Inventors: John Yeates, Austin, TX (US); Josh Gall, Austin, TX (US); Luke Gall, Austin, TX (US)

(73) Assignee: Ultimate Drill Book, Inc., Austin, TX (US)

( * ) Notice: Subject to any disclaimer, the term of this patent is extended or adjusted under 35 U.S.C. 154(b) by 384 days.

(21) Appl. No.: 18/648,351

(22) Filed: Apr. 27, 2024

(65) Prior Publication Data

US 2025/0336379 A1 Oct. 30, 2025

(51) Int. Cl.
*G10G 5/00* (2006.01)

(52) U.S. Cl.
CPC .................................... *G10G 5/005* (2013.01)

(58) Field of Classification Search
CPC ............. G10G 5/005; G10G 7/00; G10G 5/00
See application file for complete search history.

(56) References Cited

U.S. PATENT DOCUMENTS

2002/0121176 A1 * 9/2002 Vaughn .................... G10G 5/00 84/421

* cited by examiner

*Primary Examiner* — Kimberly R Lockett
(74) *Attorney, Agent, or Firm* — McGuire Woods LLP

(57) ABSTRACT

A musical instrument mounting system includes a musical instrument mounting device including an attachment portion configured to attach to one or more types of musical instruments and a receiver section attached to the attachment portion, where the receiver section includes a receiving means configured to receive a coupling device for securing a mobile electronic device to the musical instrument mounting device. The system further includes a retainer device configured to retain a mobile electronic device. The retainer device includes an extension arm, the coupling device affixed to the extension arm, and a receiver portion configured to support a mobile electronic device, where the receiver portion is removably affixed to the first side of the extension arm. The system further includes a cover plate removably affixed to the extension arm opposite the receiver portion, where the cover plate includes a substantially flat body having first and second surfaces.

20 Claims, 54 Drawing Sheets

1300

1300

1300

2300

MUSICAL INSTRUMENT MOUNTING SYSTEM

BACKGROUND

Marching bands are well respected groups of talented musicians that typically exude school spirit in relation to high schools and colleges. Typically, the bands perform at halftime shows of sporting events of the high schools/colleges. When a marching band performs, it is imperative that all members of the marching band are in sync with one another. During a performance, each band member will have a music sheet, in physical or electronic form, that they carry with them in order to stay in sync with the rest of the band. Due to the active nature of marching performances (movement and the use of hands to play an instrument), it is often complicated to keep the music sheet within eyesight.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

Figure 1A:
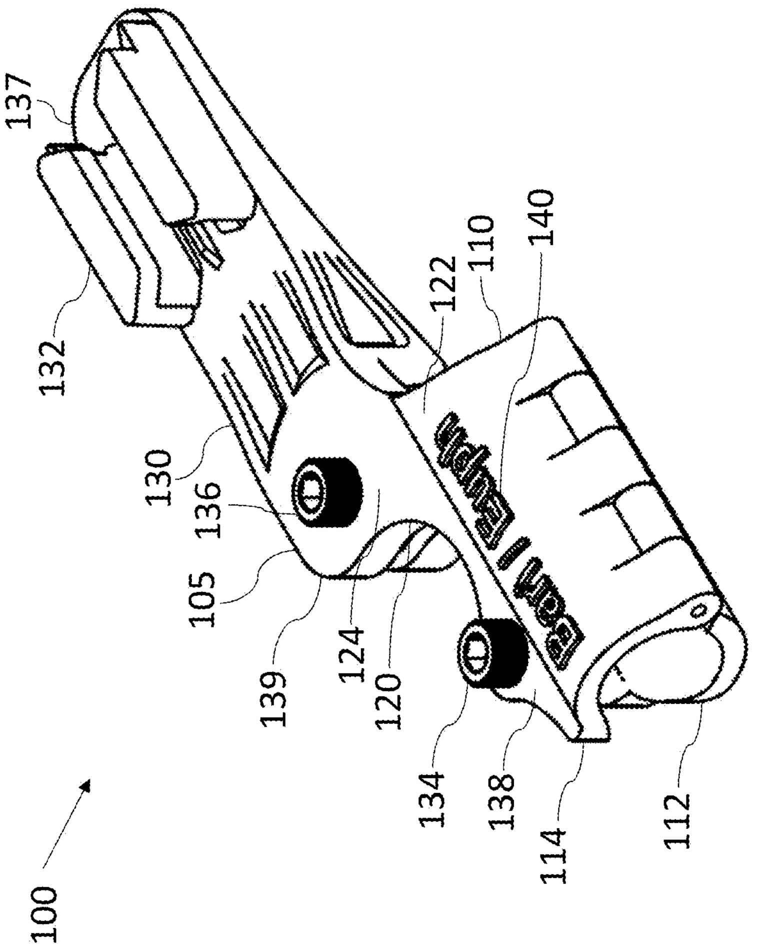
FIG. 1A is an illustration of an isometric view of a musical instrument mounting device configured to mount to brass instruments in accordance with certain embodiments of the present disclosure.

The illustrated figures are only exemplary and are not intended to assert or imply any limitation with regard to the environment, architecture, design, or process in which different examples may be implemented.

DETAILED DESCRIPTION

The present invention relates generally to mounting systems, and more particularly to mounting systems for securing an electronic device to a musical instrument.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

Unless otherwise indicated, all numbers expressing quantities of components, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit. Further, although voltage signals discussed herein are discussed as positive voltages, a negative voltage signal or differential voltage signal may be generated, used, or detected without departing from the scope of the present invention.

Presented herein is a musical instrument mounting system for mounting a mobile electronic device to a musical instrument. The musical instrument mounting system comprises a musical instrument mounting device including an attachment portion configured to attach to one or more types of musical instruments and a receiver section attached to the attachment portion, where the receiver section includes a receiving means configured to receive a coupling device for securing a mobile electronic device to the musical instrument mounting device. The musical instrument mounting system further includes a retainer device configured to retain a mobile electronic device. The retainer device includes an extension arm having a top end, a bottom end, a first side, and a second side. The retainer device further includes the coupling device affixed to the bottom end of the extension arm and a receiver portion configured to support a mobile electronic device, where the receiver portion is removably affixed to the first side of the extension arm. The musical instrument mounting system further includes a cover plate removably affixed to the second side of the extension arm opposite the receiver portion, where the cover plate includes a substantially flat body having a first surface and a second surface.

FIG. 1A is an illustration of an isometric view of a musical instrument mounting device 100 configured to mount to brass instruments in accordance with certain embodiments of the present disclosure. As shown, musical instrument mounting device 100 comprises mounting body 105 including a clamp section 110 affixable to a musical instrument, where the clamp section 110 includes at least one of a lower clamp portion 112 and an upper clamp portion 114 rotatably affixed via a pin positioned along an axis of rotation. Collectively, the lower clamp portion 112 and the upper clamp portion 114 define a space configured to securely receive and circumnavigate a portion of a brass instrument (in this case, a trumpet 145). Mounting body 105 further includes a transition section 120 (as shown, having an hourglass configuration) positioned opposite the axis of rotation and extending away from clamp section 110. Clamp section 110 is affixed to transition section 120 at a first side 122 of transition section 120 and opposite the axis of rotation. Mounting body 105 further includes a receiver section 130 including a receiving means (as shown, retainer body 132 configured in the form of a buckle) positioned at a distal end 137 of the receiver section 130, where the retainer (buckle) body 132 includes a first frame member and a second frame member defining a channel therebetween, where retainer (buckle) body) 132 is configured to receive a retainer device 150 (see FIG. 1C), including a receiver section 151 and a coupling device 152 (positionable within the channel), for securing a mobile electronic device (not depicted). The receiver section 130 is affixed to transition section 120 at a second side 124 of transition section 120 opposite the first side 122. As shown, receiver section 130 is aligned parallel to the axis of rotation. It is further noted that clamp section 110 defines a clamp axis parallel with clamp section 110 and receiver section 130 defines a receiver axis parallel with receiver section 130, where clamp axis and receiver axis are aligned parallel to one another.

Figure 1B:
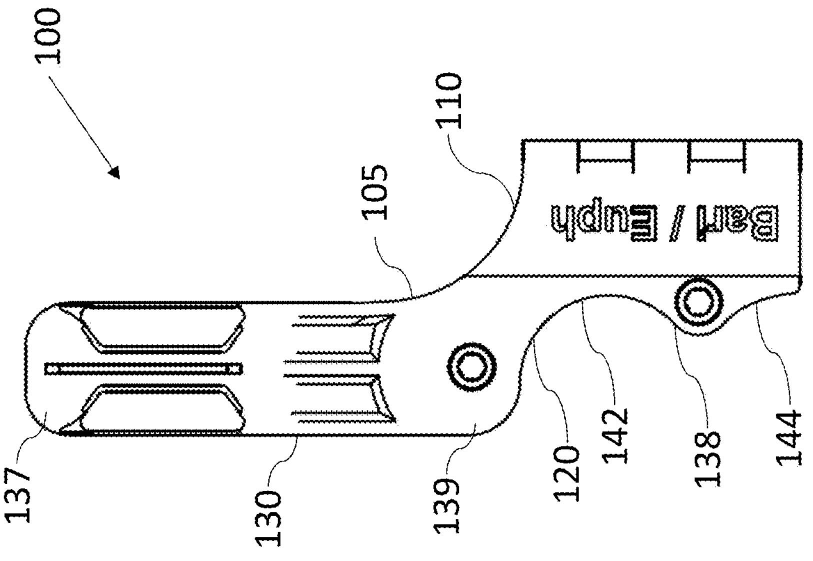
FIG. 1B is an illustration of a front view of a musical instrument mounting device configured to mount to brass instruments in accordance with certain embodiments of the present disclosure.
Figure 1C:
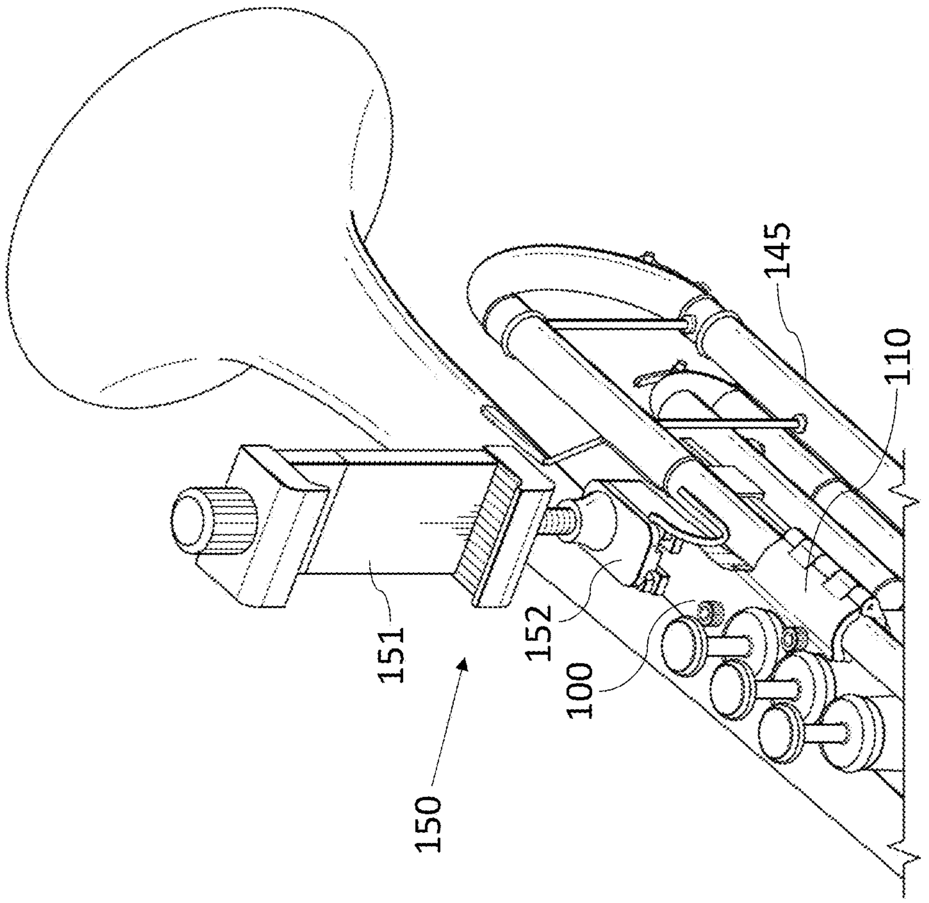
FIG. 1C is an illustration of a perspective view of a musical instrument mounting device mounted to an exemplary brass instrument in accordance with certain embodiments of the present disclosure.
Figure 1E:
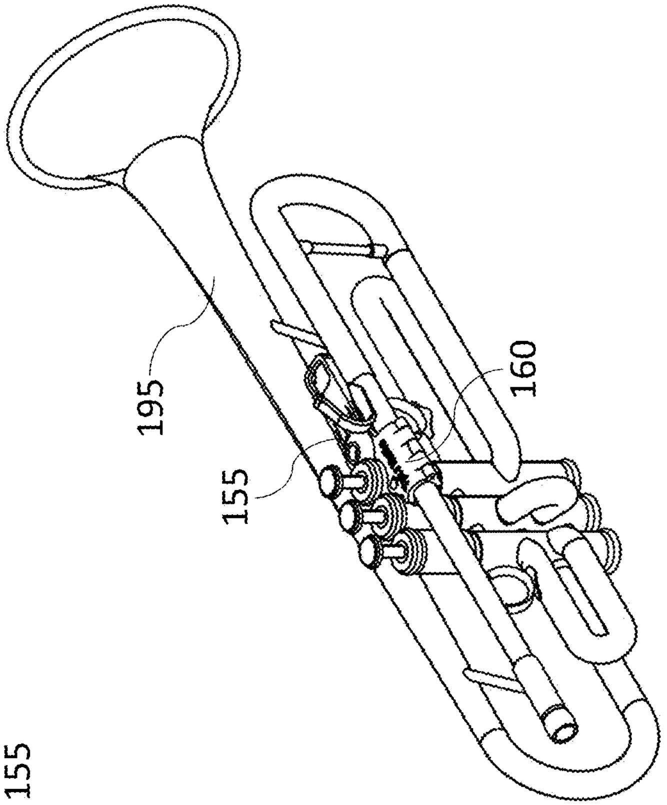
FIG. 1E is an illustration of a perspective view of an alternative musical instrument mounting device mounted to an exemplary brass instrument in accordance with certain embodiments of the present disclosure.
Figure 1D:
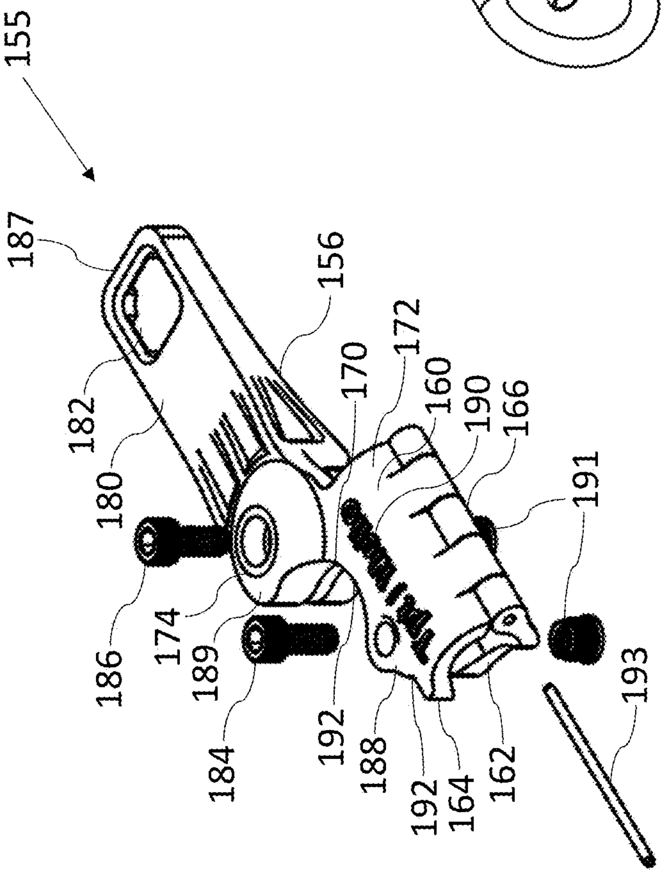
FIG. 1D is an illustration of an isometric view of an alternative musical instrument mounting device configured to mount to brass instruments in accordance with certain embodiments of the present disclosure.

As further shown in FIG. 1A, mounting body 105 is generally segmented into a lower portion and an upper portion, where the lower portion and the upper portion are attached to one another along the axis of rotation via clamp pin (depicted as clamp pin 193 in FIG. 1D). Lower portion includes lower clamp portion 112 affixed to a lower receiver portion of receiver section 130 via a lower transition portion of transition section 120, where each of the lower clamp portion 112, the lower receiver portion, and the lower transition portion are affixed to one another as one contiguous piece. Additionally, upper portion includes upper clamp portion 114 affixed to an upper receiver portion of receiver section 130 via an upper transition portion of transition section 120, where each of the upper clamp portion 114, the upper receiver portion, and the upper transition portion are also affixed to one another as one contiguous piece. Musical instrument mounting device 100 further includes at least one affixing means configured to attach lower clamp portion 112 to upper clamp portion 114. In an embodiment, the at least one affixing means comprises a first fastener 134 removably affixable to the lower clamp portion 112 and the upper clamp portion 114 at a clamp edge 138 opposite the axis of rotation. The at least one affixing means further includes a second fastener 136 removably affixable to the lower receiver portion and the upper receiver portion at a proximal end 139 of receiver section 130. Additionally shown in FIG. 1A, lower receiver portion and upper receiver portion taper in width along receiver section 130 toward the distal end of receiver section 130.

FIG. 1B is an illustration of a front view of a musical instrument mounting device 155 configured to mount to brass instruments (such as, for example, trumpet 145 shown in FIG. 1C) in accordance with certain embodiments of the present disclosure. As shown, transition section 120 projects at a diagonal from clamp section 110, where receiver section 130 continues to extend outward from transition section 120 and parallel with the axis of rotation (and with clamp section 110). A first concavity 142 is defined along the proximal end 139 of receiver section 130, transition section 120, and clamp edge 138 of clamp section 110. A second concavity 144 is defined along clamp edge 138 of clamp section 110. First and second concavities 142,144 are configured to conform to/abut one or more portions of trumpet 145, as shown in FIG. 1C. Regarding FIG. 1C, when clamp section 110 of musical instrument mounting device 100 is affixed to a leadpipe of trumpet 145, additional securement is provided to retainer device 150 (includes coupling device 152) via contact between first and second concavities 142,144 and valve casings of trumpet 145. Additionally regarding this configuration, transition section 120 of musical instrument mounting device 100 is specifically wedged between at least one piston valve of trumpet 145 and a finger hook of the trumpet 145.

FIG. 1D is an illustration of an isometric view of an alternative musical instrument mounting device 155 configured to mount to brass instruments in accordance with certain embodiments of the present disclosure. As shown, musical instrument mounting device 155 comprises a mounting body 156 including a clamp section 160 affixable to a musical instrument, where the clamp section 160 includes at least one of a lower clamp portion 162 and an upper clamp portion 164 rotatably affixed via a pin positioned along an axis of rotation 166. Collectively, the lower clamp portion 162 and the upper clamp portion 164 define a space configured to securely receive and circumnavigate a portion of a brass instrument (in this case, a leadpipe of a trumpet 195). Mounting body 156 further includes a transition section 170 positioned opposite the axis of rotation 166 and extending away from clamp section 160. Clamp section 160 is affixed to transition section 170 at a first side 172 of transition section 170 and opposite the axis of rotation 166. Mounting body 156 further includes a receiver section 180 including a receiving means (as shown, retainer body 182) positioned at a distal end 187 of the receiver section 180, where the retainer body 182 is configured to receive a retainer device 1050 (see FIG. 10A, includes an attachment head 1051 and an attachment section 1071) for securing a mobile electronic device (not depicted). Retainer body 182 is configured as a roughly square indentation and includes slots (see FIG. 1D) for receiving protrusions affixed to coupling portion 1060/attachment section 1071 (collectively embody a snap-fit mechanism when retainer body 182 and attachment section 1071 are affixed to one another). Furthermore, the receiver section 180 is affixed to transition section 170 at a second side 174 of transition section 170 opposite the first side 172. As shown, receiver section 180 is aligned parallel to the axis of rotation 166.

As further shown in FIG. 1D, musical instrument mounting device 155 is generally segmented into a lower portion and an upper portion, where the lower portion and the upper portion are attached to one another along the axis of rotation 166 via clamp pin 193. Lower portion includes lower clamp portion 162 affixed to a lower receiver portion of receiver section 180 via a lower transition portion of transition section 170, where each of the lower clamp portion 162, the lower receiver portion, and the lower transition portion are affixed to one another as one contiguous piece. Additionally, upper portion includes upper clamp portion 164 affixed to an upper receiver portion of receiver section 180 via an upper transition portion of transition section 170, where each of the upper clamp portion 164, the upper receiver portion, and the upper transition portion are also affixed to one another as one contiguous piece. Musical instrument mounting device 155 further includes at least one affixing means configured to attach lower clamp portion 162 to upper clamp portion 164. In an embodiment, the at least one affixing means comprises a first fastener 184 removably affixable to the lower clamp portion 162 and the upper clamp portion 164 at a clamp edge 188 opposite the axis of rotation 166. The at least one affixing means further includes a second fastener 186 removably affixable to the lower receiver portion and the upper receiver portion at a proximal end 189 of receiver section 180. In order to provide additional securement of first fastener 184 and second fastener 186, threaded receivers 191 are configured to rotatably affix to ends of first fastener 184 and second fastener 186. Additionally shown in FIG. 1D, lower receiver portion and upper receiver portion taper in width along receiver section 180 toward the distal end of receiver section 180.

As further shown in FIG. 1D, first concavity 192 is defined along the proximal end 189 of receiver section 180, transition section 170, and clamp edge 188 of clamp section 160. A second concavity 194 is defined along clamp edge 188 of clamp section 160. First and second concavities 192,194 are configured to conform to/abut one or more portions of trumpet 195, as shown in FIG. 1E. Regarding FIG. 1E, when clamp section 160 of musical instrument mounting device 155 is affixed to a leadpipe of trumpet 195, additional securement is provided to a retainer device (such as, for example, retainer device 1050 presented in FIG. 10A) via contact between first and second concavities 192,194 and valve casings of trumpet 195.

In an embodiment, musical instrument mounting devices 100,155 are configured to mount to brass instruments other than trumpets 145,195 and may include brass instruments such as, but not limited to: a horn, a trombone, a tuba, an alto horn, a baritone horn, a flugelhorn, a cornet, a bugle, a euphonium, a sousaphone, a mellophone, a buccina, a bass trombone, a contrabass bugle, or a French horn. It is noted that clamp sections 110,160 may be configured to be offset from respective receiver sections 130, 180 in order to effectively attach musical instrument mounting devices 100, 155 to lead pipes of trumpets 145,195. When clamp sections 110,160 are attached, receiver sections 130,180 are positioned distally to valves of trumpets 145,195 and adjacent to finger hooks of trumpets 145,195 so that receiver sections

130,180 are positioned to present electronic music sheets on mobile electronic devices within a line of vision of individuals playing trumpets 145,195. This beneficial configuration may also, in embodiments, support effective attachment of musical instrument mounting devices (presenting electronic music sheets on mobile electronic devices within a line of vision of individuals) to other brass instruments such as, for example, baritones or euphoniums.

In an embodiment, each of the clamp section 110, transition section 120, and receiver section 130 are affixed to one another as an integral body. In another embodiment, each of the clamp section 160, transition section 170, and receiver section 180 are affixed to one another as an integral body. In an additional embodiment, lower clamp portion 112, lower transition portion, and lower receiver portion of musical instrument mounting device 100 are affixed to one another as an integral body and upper clamp portion 114, upper transition portion, and upper receiver portion of musical instrument mounting device 100 are affixed to one another as an integral body. In an additional embodiment, lower clamp portion 162, lower transition portion, and lower receiver portion of musical instrument mounting device 155 are affixed to one another as an integral body and upper clamp portion 164, upper transition portion, and upper receiver portion of musical instrument mounting device 155 are affixed to one another as an integral body.

In regard to musical instrument mounting devices 100, 155, in an additional embodiment, lower receiver portions of receiver sections 130,180 may be segmented into two separate portions. First portions of lower receiver portions may be located at proximal ends 139,189 (configured to receive second fasteners 136,186) and may generally be more rounded than the second portions of lower receiver portions. In this embodiment, the second portions of lower receiver portions may be affixed to and are integral with upper receiver portions of receiver sections 130,180. Additionally in this embodiment, only the second portions of lower receiver portions taper in width with upper receiver portions of receiver sections 130,180 (and not first portions of lower receiver portions). Additional detail regarding these embodiments may be presented in FIGS. 13-22.

Figure 2B:
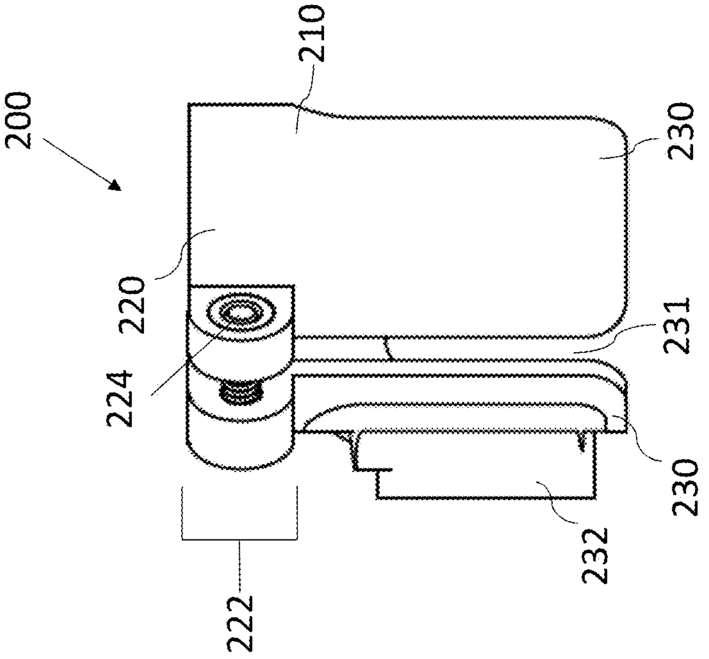
FIG. 2B is an illustration of a side view of a musical instrument mounting device configured to mount to woodwind instruments in accordance with certain embodiments of the present disclosure.
Figure 2A:
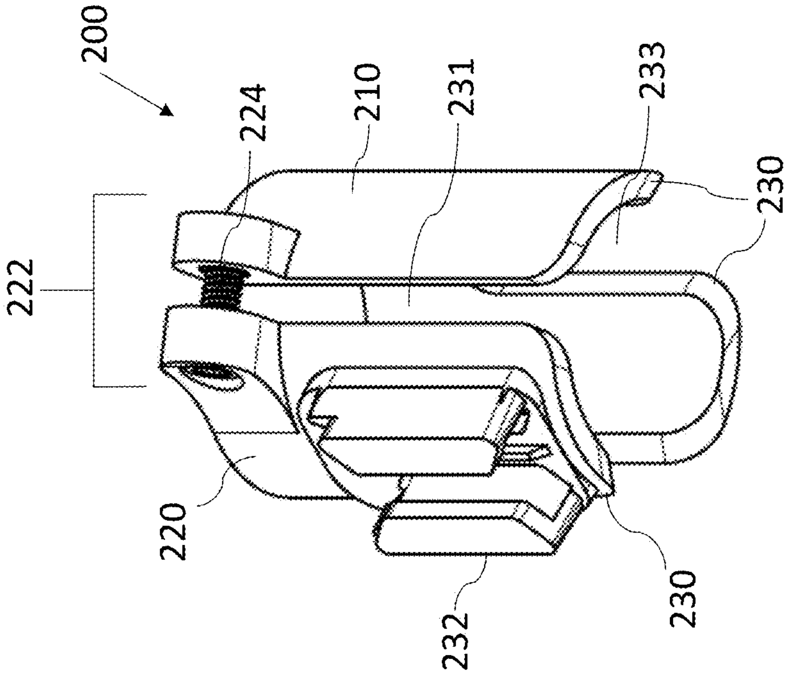
FIG. 2A is an illustration of a bottom perspective view of a musical instrument mounting device configured to mount to woodwind instruments in accordance with certain embodiments of the present disclosure.

FIG. 2A is an illustration of a bottom view of a musical instrument mounting device 200 configured to mount to woodwind instruments in accordance with certain embodiments of the present disclosure. As shown, musical instrument mounting device 200 includes a mounting body 210 having a substantially circular perimeter and an upper compression section 220 configured to circumnavigate a body of a woodwind instrument. Mounting body 210 extends away from upper compression section 220 as lower extension walls 230 that are defined/segmented via slit 231 and cutouts 233 positioned on mounting body 210. As at least partially shown, cutouts 233 are defined as openings that extend from the bottom of mounting body 210 to a defined height along the length of mounting body 210. When musical instrument mounting device 200 is positioned on a woodwind instrument, cutouts 233 allow mounting body 210 to be "form fitted" around portions of a rod system and tone hole plates of the woodwind instrument. This configuration may allow musical instrument mounting device 200 to be comfortably positioned around an upper portion of a woodwind instrument. Slit 231 extends the length of musical instrument mounting device 200 and between first protrusion and second protrusion in order to provide a space for mounting body 210 to compress and retract when a tension adjustment portion 222 is adjusted. Tension adjustment portion 222, integral with mounting body 210, includes a first protrusion and a second protrusion held in a compressed state via fastening device 224. When fastening device 224 is rotated, first and second protrusions are moved closer together or farther apart from one another depending on the direction that fastening device is rotated 224. This structure/function may allow musical instrument mounting device 210 to be positionable on multiple sizes of woodwind instruments. As further shown in FIG. 2A, a retainer (buckle) body 232 (similar to retainer (buckle) body 132 of FIGS. 1A-1C) is positioned along a single lower extension wall 230 and is configured to receive and secure a coupling device (similar to coupling device 152 of FIG. 1C) to musical instrument mounting device 200.

FIG. 2B is an illustration of a side view of a musical instrument mounting device 200 configured to mount to woodwind instruments in accordance with certain embodiments of the present disclosure. As shown, lower extension walls 230 extend from upper compression section 220 and terminate at a uniform end. Tension adjustment portion 222, in combination with the surface area of lower extension walls 230, assists in compressing musical instrument mounting device 200 to a woodwind instrument. As further shown in FIG. 2B, tension adjustment portion 222 is positioned adjacent buckle body 232. By virtue of this configuration, minimal effort to manually readjust musical instrument mounting device 200 may be needed when a coupling device (for example, coupling device 152)/mobile electronic device is attached to buckle body 232.

Figure 2C:
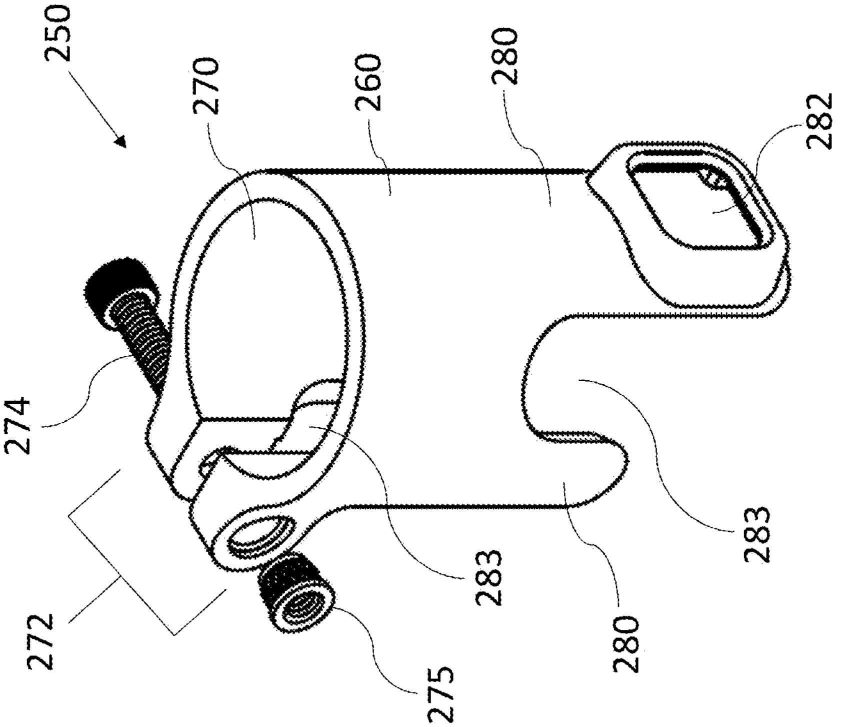
FIG. 2C is an illustration of a perspective view of an alternative musical instrument mounting device configured to mount to woodwind instruments in accordance with certain embodiments of the present disclosure.

FIG. 2C is an illustration of a perspective view of an alternative musical instrument mounting device 250 configured to mount to woodwind instruments in accordance with certain embodiments of the present disclosure. Mounting body 260 of alternative musical instrument mounting device 250 includes similar elements to mounting body 250 of musical instrument mounting device 200, while also including elements specific to mounting body 260. As shown, mounting body 260 includes a substantially cylindrical body having an upper compression section 270 and including a tension adjustment portion 272 having a fastening device 274 and threaded receiver 275. Tensions adjustment portion 272 may function similarly to tension adjustment portion 222 and may instead include a cutout 283 positioned below, and aligned with, tension adjustment portion 272. A second cutout 283 is shown positioned between two lower extension walls 280, where one of the lower extension walls 280 is longer in length than the other lower extension wall 280. The longer lower extension wall 280 includes a retainer body 282 positioned along a single lower extension wall 230 and is configured to receive and secure a retainer device 1050 (see FIG. 10A, includes an attachment head 1051 and an attachment section 1071) for securing a mobile electronic device (not depicted).

Figure 2D:
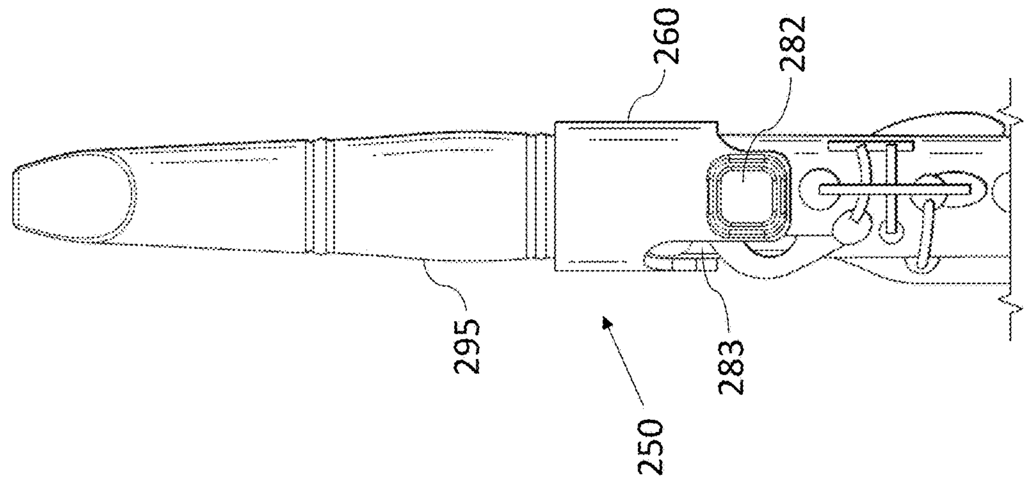
FIG. 2D is an illustration of a perspective view of an alternative musical instrument mounting device mounted to an exemplary woodwind instrument in accordance with certain embodiments of the present disclosure.
Figure 2E:
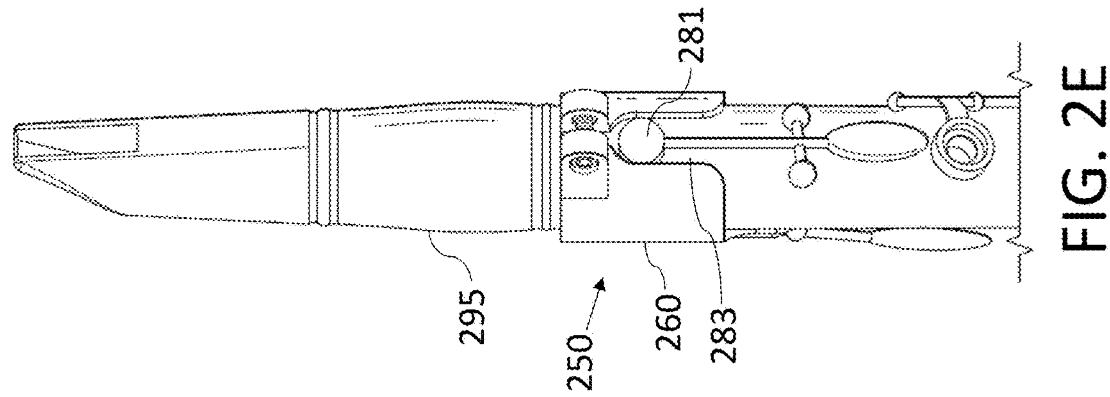
FIG. 2E is an illustration of a perspective view of an alternative musical instrument mounting device mounted to an exemplary woodwind instrument in accordance with certain embodiments of the present disclosure.
Figure 2F:
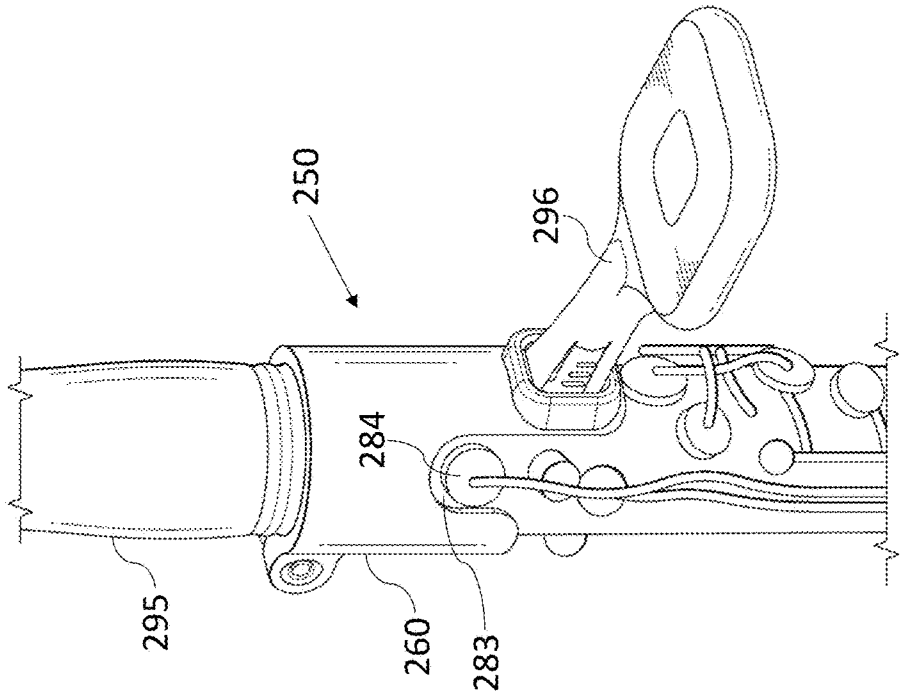
FIG. 2F is an illustration of a perspective view of an alternative musical instrument mounting device mounted to an exemplary woodwind instrument in accordance with certain embodiments of the present disclosure.

FIGS. 2D, 2E, and 2F are illustrations of multiple views of an alternative musical instrument mounting device 250 mounted to an exemplary woodwind instrument 295 in accordance with certain embodiments of the present disclosure. As shown, exemplary woodwind instrument 295 is a clarinet. When musical instrument mounting device 250 is affixed to clarinet 295, musical instrument mounting device 250 is positioned just below the barrel of clarinet 295, where cutouts 283 are configured to receive/at least partially surround a register key 281 and a portion of a rod system 284 of clarinet 295. When musical instrument mounting device 250 is positioned as shown in FIGS. 2D, 2E, and 2F, a retainer device 296 (similar to retainer device 1050 presented in FIG. 10A), is configured to extend perpendicularly from musical instrument mounting device 250 in order to effectively and securely hold a receiver section (such as, for example, receiver section 1151 of FIG. 11A) and mobile electronic device (not depicted) when an individual is playing clarinet 295.

It is noted that cutouts 283 are spatially positioned on mounting bodies 210,260 in order to effectively attach musical instrument mounting devices 200,250 just below a barrel section of a clarinet 295. When mounting bodies 210,260 are attached at this position, cutouts 283 are positioned to conform around the shape of keys/register keys located on an upper joint (located just below the barrel section) of clarinet 295. This positioning may present electronic music sheets on mobile electronic devices within a line of vision of individuals playing clarinet 295. The beneficial configuration of musical instrument mounting devices 200,250 may also, in embodiments, support effective attachment of musical instrument mounting devices (presenting electronic music sheets on mobile electronic devices within a line of vision of individuals) to other woodwind instruments such as, for example, oboes.

In an embodiment, musical instrument mounting devices 200,250 are configured to mount to woodwind instruments such as, but not limited to: a flute, a clarinet, bagpipes, a piccolo, a cor anglaise a recorder, an oboe, or a bassoon.

Figure 3B:
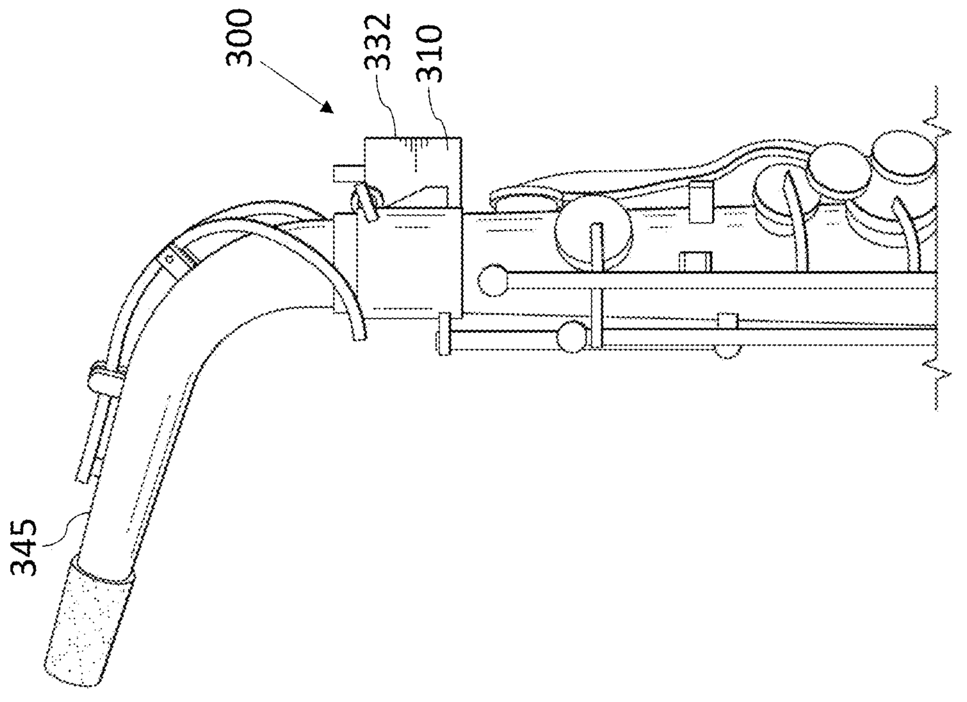
FIG. 3B is an illustration of a side view of an alternative musical instrument mounting device mounted to a saxophone in accordance with certain embodiments of the present disclosure.
Figure 3A:
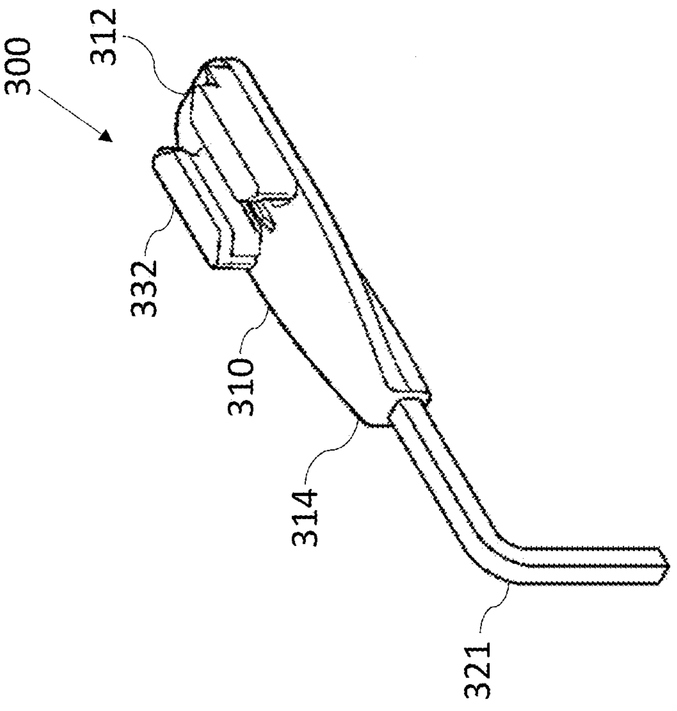
FIG. 3A is an illustration of an isometric view of a musical instrument mounting device configured to mount to a saxophone in accordance with certain embodiments of the present disclosure.

FIG. 3A is an illustration of an isometric view of a musical instrument mounting device 300 configured to mount to an exemplary musical instrument 345 (as shown in FIG. 3B, a saxophone) in accordance with certain embodiments of the present disclosure. As shown, musical instrument mounting device 300 includes a mounting body 310 having an upper end 312 and a lower end 314. A retainer (buckle) body 332 configured to receive an adapter device (not depicted) is positioned at the upper end 312 of mounting body 310 while an attachment segment 321 configured to attach musical instrument mounting device 300 to saxophone 345 (via insertion of attachment segment 321 into an orifice of saxophone 345) is positioned at the lower end 314. When affixed to saxophone 345, attachment segment 321 extends retainer (buckle) body 332 outward from saxophone 345. As shown in FIG. 3B, an alternative musical instrument mounting device 300 includes a mounting body 310 wider than that of the musical instrument mounting device 300 of FIG. 3A. As further shown, a retainer (buckle) body 332 extends the entire length of the mounting body 310 and further includes a retainer structure (not pictured) for affixing mounting body 310 to a neck screw of saxophone 345.

Figure 3E:
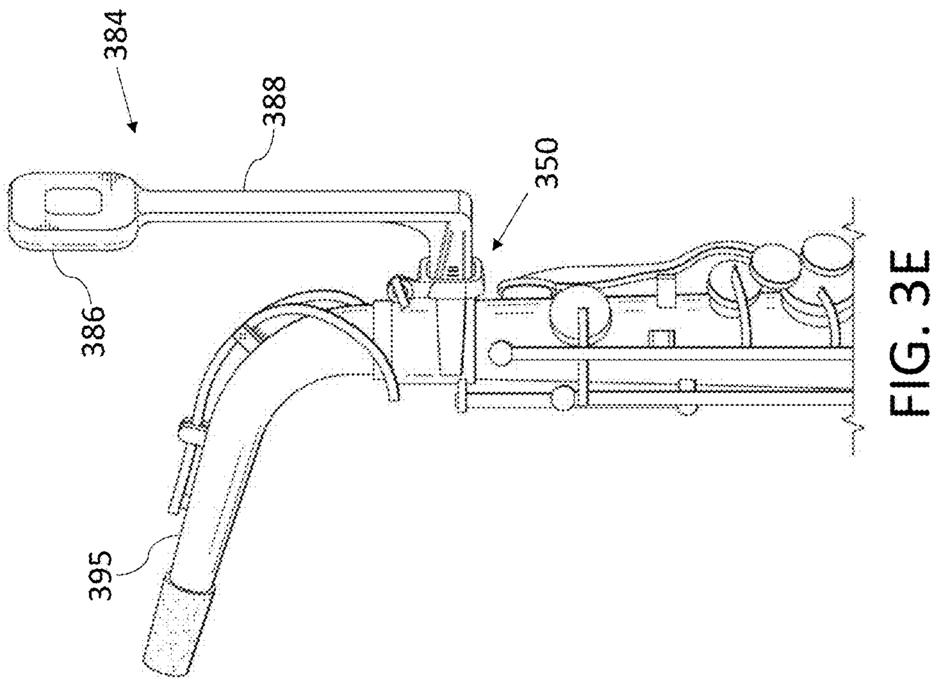
FIG. 3E is an illustration of a side view of an alternative musical instrument mounting device mounted to a saxophone in accordance with certain embodiments of the present disclosure.
Figure 3D:
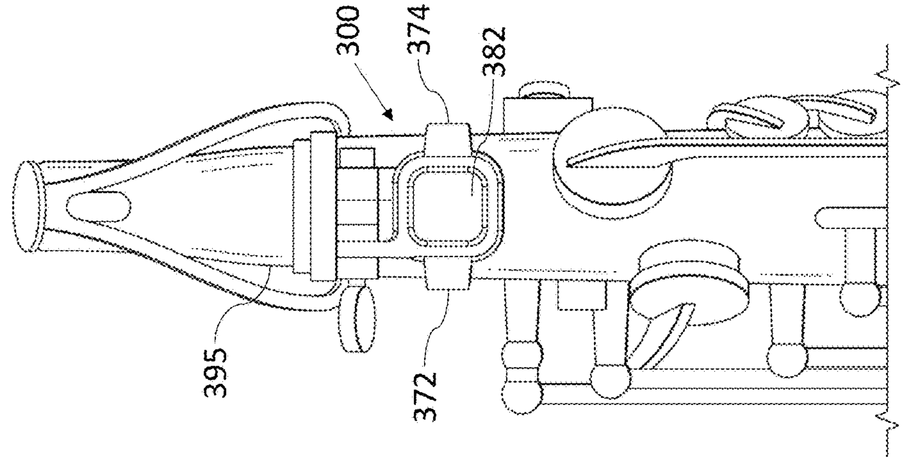
FIG. 3D is an illustration of a front view of an alternative musical instrument mounting device mounted to a saxophone in accordance with certain embodiments of the present disclosure.
Figure 3C:
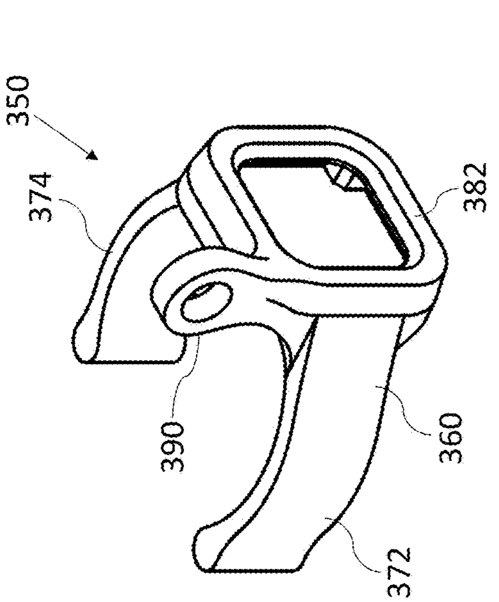
FIG. 3C is an illustration of an isometric view of an alternative musical instrument mounting device configured to mount to a saxophone in accordance with certain embodiments of the present disclosure.

FIG. 3C is an illustration of an isometric view of an alternative musical instrument mounting device 350 configured to mount to a saxophone 395 (see FIG. 3D) in accordance with certain embodiments of the present disclosure. Mounting body 360 of alternative musical instrument mounting device 350 includes similar elements to mounting body 310 of musical instrument mounting device 300, while also including elements specific to mounting body 360. As shown, a retainer body 382 (similar to retainer body 282 of FIG. 2C) is positioned at a front of mounting body 360 and is configured to receive and secure a retainer device 1050 (see FIG. 10A, includes an attachment head 1051 and an attachment section 1071) for securing a mobile electronic device (not depicted).

A first clip portion 372 and a second clip portion 374 extend outwardly from retainer body 382 and are configured to securely fit around a neck of saxophone 395 via compressive forces (see FIG. 3D). As a second form of attachment (attachment portion), retainer body 382 includes a loop retainer 390 extending outwardly from a corner of retainer body 382 (perpendicular to first clip portion 372 and second clip portion 374). When attached to a neck of a saxophone 395, loop retainer 390 may be positioned to attach to a neck screw of saxophone 395. As further shown in FIG. 3E, when musical instrument mounting device 350 is positioned as shown, a retainer device 384 is affixed to retainer body 382 and is configured to allow an extension arm 388 to extend perpendicularly from musical instrument mounting device 350 in order to effectively and securely hold a receiver section 386 and mobile electronic device (not depicted) within a line of sight of an individual playing saxophone 395.

It is noted that musical instrument mounting devices 300,350 may be configured to effectively attach to one or more portions of necks of saxophones 345,395. In regard to musical instrument mounting device 300, when musical instrument mounting device 300 is attached, one or more of: mounting body 310 is affixed to a neck screw of saxophone 345 via a loop (see FIG. 3B) and/or attachment segment 321 is positioned within an orifice of the neck of saxophone 345 (so that retainer (buckle) body 332 is positioned adjacent the neck of saxophone 345). In regard to musical instrument mounting device 350, when musical instrument mounting device 350 is attached, loop retainer 390 is positioned on/around a neck screw of saxophone 345 so that retainer body 382 is positioned adjacent the neck of saxophone 395. In both cases, the configurations of musical instrument mounting devices 300,350 are configured to be positioned in order to present electronic music sheets on mobile electronic devices within a line of vision of individuals playing saxophones 345,395.

Figure 4B:
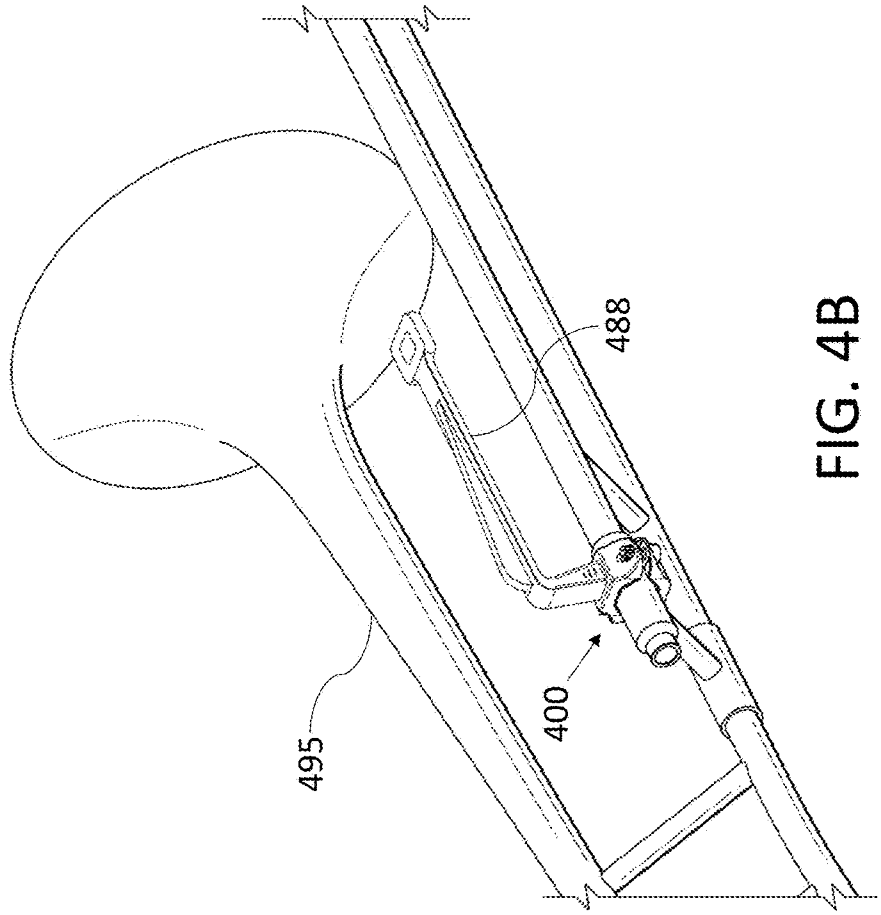
FIG. 4B is an illustration of a second zoomed-in view of a musical instrument mounting device mounted to an exemplary musical instrument in accordance with certain embodiments of the present disclosure.
Figure 4A:
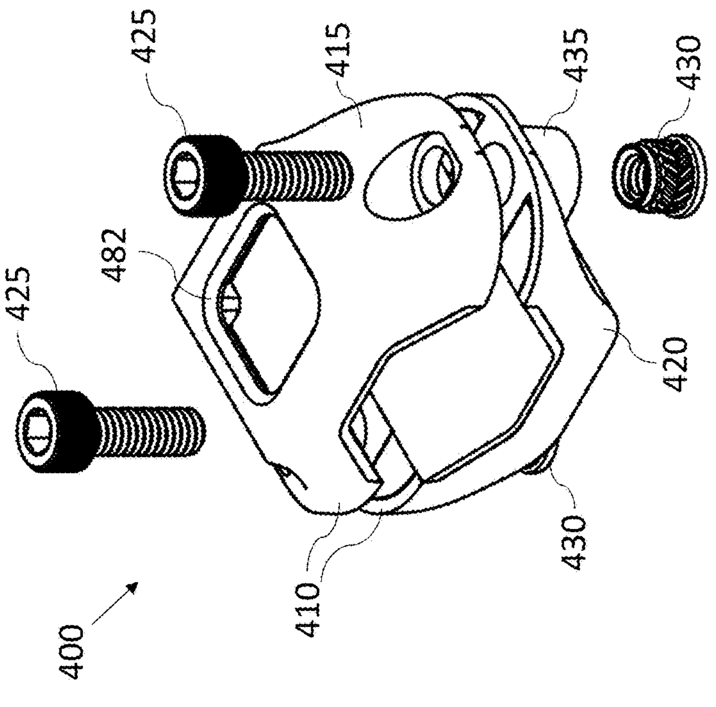
FIG. 4A is an illustration of an isometric view of a musical instrument mounting device configured to mount to an exemplary musical instrument in accordance with certain embodiments of the present disclosure.

FIG. 4A is an illustration of an isometric view of a musical instrument mounting device configured to mount to an exemplary musical instrument (as shown, a trombone 495) in accordance with certain embodiments of the present disclosure. As shown, musical instrument mounting device 400 is configured as a clamp and includes a clamp body 410 having an upper clamp section 415 and a lower clamp section 420 fully separable from one another and fastenable together via a pair of fastening devices 425 and threaded receivers 430. Clamp body 410 is configured to fasten around a mouthpiece receiver of a trombone 495 (as specifically shown, around a mouthpiece receiver of trombone 495). As further shown in FIG. 4B, when musical instrument mounting device 400 is positioned as shown, an extension arm 488 is affixed to a retainer body 482 and is configured to allow extension arm 388 to extend perpendicularly from musical instrument mounting device 400 in order to effectively and securely hold a receiver section (similar to receiver section 386) and mobile electronic device (not depicted) within a line of sight of an individual playing trombone 495.

It is noted that upper and lower clamp sections 415,420 may be configured to effectively attach musical instrument mounting device 400 to a mouthpiece receiver of trombone 495. When upper and lower clamp sections 415,420 are attached, retainer body 482 is positioned adjacent mouthpiece of trombone 495 (on mouthpiece receiver of trombone 495, which is stationary) so that retainer body 482 is positioned to present electronic music sheets on mobile electronic devices within a line of vision of individuals playing trombone 495.

Figure 5:
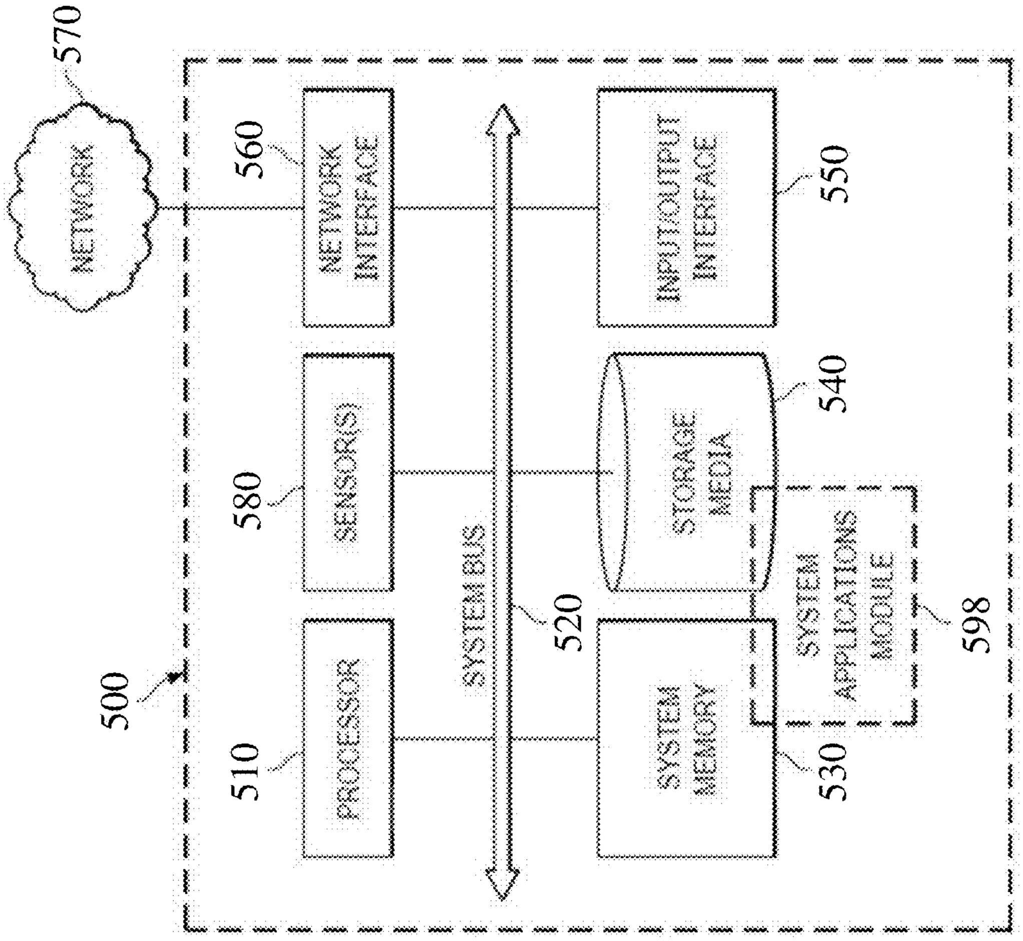
FIG. 5 is an illustration of a computing machine and a system applications module, in accordance with certain example embodiments.

Referring now to FIG. 5, illustrated is a computing machine 500 and a system applications module 598, in accordance with example embodiments. The computing machine 500 can correspond to any of the various computers, mobile devices, laptop computers, Internet of Things (IoT), servers, embedded systems, or computing systems presented herein. The module 598 can comprise one or more hardware or software elements, e.g. other OS application and user and kernel space applications, designed to facilitate the computing machine 500 in performing the various methods and processing functions presented herein. The computing machine 500 can include various internal or attached components such as a processor 510, system bus 520, system memory 530, storage media 540, input/output interface 550, a network interface 560 for communicating with a network 570, e.g. cellular/GPS, Bluetooth, WIFI, or Devicenet, EtherCAT, Analog, RS485, etc., and one or more sensors 580.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

Processor 510 can be designed to execute code instructions in order to perform the operations and functionality described herein, manage request flow and address mappings, and to perform calculations and generate commands. Processor 510 can be configured to monitor and control the operation of the components in the computing machines. Processor 510 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. Processor 510 can be a single processing unit, multiple processing units, a single processing core, multiple processing cores, special purpose processing cores, co-processors, or any combination thereof. According to certain embodiments, processor 510 along with other components of computing machine 500 can be a software based or hardware based virtualized computing machine executing within one or more other computing machines.

The system memory 530 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 530 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 530. The system memory 530 can be implemented using a single memory module or multiple memory modules. While the system memory 530 is depicted as being part of the computing machine, one skilled in the art will recognize that the system memory 530 can be separate from the computing machine 500 without departing from the scope of the subject technology. It should also be appreciated that the system memory 530 can include, or operate in conjunction with, a non-volatile storage device such as the storage media 540.

The storage media 540 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 540 can store one or more operating systems, application programs and program modules, data, or any other information. The storage media 540 can be part of, or connected to, the computing machine. The storage media 540 can also be part of one or more other computing machines that are in communication with the computing machine such as servers, database servers, cloud storage, network attached storage, and so forth.

The applications module 598 and other OS application modules can comprise one or more hardware or software elements configured to facilitate the computing machine with performing the various methods and processing functions presented herein. The applications module 598 and other OS application modules can include one or more algorithms or sequences of instructions stored as software or firmware in association with the system memory 530, the storage media 540 or both. The storage media 540 can therefore represent examples of machine or computer readable media on which instructions or code can be stored for execution by the processor 510. Machine or computer readable media can generally refer to any medium or media used to provide instructions to the processor 510. Such machine or computer readable media associated with the applications module 598 and other OS application modules can comprise a computer software product. It should be appreciated that a computer software product comprising the applications module 598 and other OS application modules can also be associated with one or more processes or methods for delivering the applications module 598 and other OS application modules to the computing machine via a network, any signal-bearing medium, or any other communication or delivery technology. The applications module 598 and other OS application modules can also comprise hardware circuits or information for configuring hardware circuits such as microcode or configuration information for an FPGA or other PLD. In one exemplary embodiment, applications module 598 and other OS application modules can include algorithms capable of performing the functional operations described by the flow charts (modes of operation) computer systems presented herein.

The input/output ("I/O") interface 550 can be configured to couple to one or more external devices, to receive data from the one or more external devices, and to send data to the one or more external devices. Such external devices along with the various internal devices can also be known as peripheral devices. The I/O interface 550 can include both electrical and physical connections for coupling the various peripheral devices to the computing machine or the processor 510. The I/O interface 550 can be configured to communicate data, addresses, and control signals between the peripheral devices, the computing machine, or the processor 510. The I/O interface 550 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 550 can be configured to implement only one interface or bus technology. Alternatively, the I/O interface 550 can be configured to implement multiple interfaces or bus technologies. The I/O interface 550 can be configured as part of, all of, or to operate in conjunction with, the system bus 520. The I/O interface 550 can include one or more buffers for buffering transmissions between one or more external devices, internal devices, the computing machine, or the processor 520.

The I/O interface 520 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 520 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 500 can operate in a networked environment using logical connections through the NIC 560 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The one or more sensors 580 can be a position sensor. The position sensor can be a capacitive, optical, strain gauge, or magnetic sensor. The sensors 580 can be traditional sensors or semiconductor based sensors.

The processor 510 can be connected to the other elements of the computing machine or the various peripherals discussed herein through the system bus 520. It should be appreciated that the system bus 520 can be within the processor 510, outside the processor 510, or both. According to some embodiments, any of the processors 510, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 6:
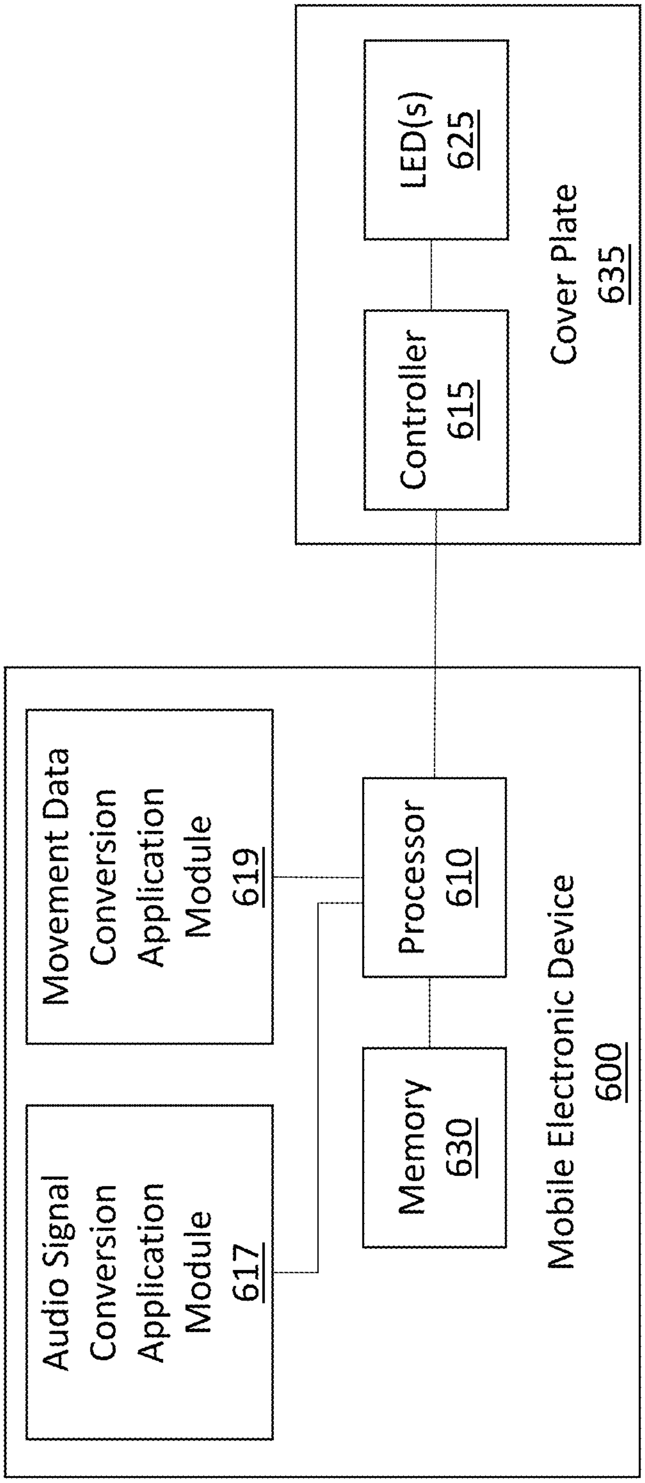
FIG. 6 is an illustration of a diagrammatic view of a mobile electronic device electrically connected to a cover plate in accordance with certain embodiments of the present disclosure.

FIG. 6 is an illustration of a diagrammatic view of a mobile electronic device 600 electrically connected to a cover plate device 635 in accordance with certain embodiments of the present disclosure. As shown, cover plate 635 includes a controller 615 electrically connected (wired or wireless connection) to one or more LEDs 625 and to processor 610 (similar to processor 510 of FIG. 5) of mobile electronic device 600. Generally, cover plate 635 is configured to be secured to a retainer device of mobile electronic device 600 and may be utilized to shield an individual's mobile electronic device 600 while mobile electronic device 600 is mounted to a musical instrument. In regard to shielding, cover plate 635 may cover up/conceal the presence of mobile electronic device 600 and/or may additionally present aesthetically pleasing visual presentations on a side opposite the location of the mobile electronic device 600. Mobile electronic device 600 further includes a memory 630 (similar to system memory 530 of FIG. 5) coupled to processor 610 to store instructions. The instructions, when executed by processor 610, causes processor 610 to perform operations including sending continuous varying signals (a set of digital signals) to controller 615, which instructs the one or more LEDs 625 to emit one or more wavelengths of light. The continuous varying signals may correlate with one or more LEDs being turned on, turned off, or adjusted in intensity. The continuous varying signals, in embodiments, may correlate with any of: one or more frequencies projected by one or more instruments, one or more sequences in a marching pattern of a marching band, one or more directional changes of the mobile electronic device 600, or at least a portion of a graphic embodying one or more colors. As a result, one or more LEDs on one or more cover plates 635 can collectively create a visual pattern/image/discernible graphic embodying one or more colors that is visible from an audience perspective. In an embodiment, controller 615 is electrically connected to a power source housed in one of: the cover plate 635 or the mobile electronic device 600.

In another embodiment, mobile electronic device 600 comprises an audio sensor (not depicted) configured to detect one or more audio signals from a musical instrument of a musical instrument family of any of: brass, woodwind, and percussion. Operations of processor 610 further include: storing the one or more detected audio signals in the memory 630, converting the one or more audio signals to the one or more correlating digital signals via an audio signal conversion application module 617, and sending the one or more correlating digital signals to controller 615 to adjust the emission of light from at least some of the one or more LEDs 625. In a further embodiment, the audio sensor is configured to detect one or more audio signals from at least another musical instrument, where at least some musical instruments of the at least another musical instrument are a different musical instrument family than the musical instrument. As an example, the different musical instrument family comprises any of: brass, woodwind, or percussion.

In another embodiment, the operations further include: sending the one or more correlating digital signals to controller 615 to activate a single color of the one or more LEDs 625, where the one or more audio signals originate from a single musical instrument type. In another embodiment, the operations further include: sending the one or more correlating digital signals to controller 615 to activate multiple colors of the one or more LEDs 625, where each respective color of the multiple colors correlate to a respective set of the one or more audio signals and each respective set of the one or more audio signals originate from a respective family of multiple musical instrument families. In a further embodiment, a first set of the one or more audio signals originate from brass family instruments, a second set of the one or more audio signals originate from woodwind family instruments, and a third set of the one or more audio signals originate from percussion family instruments.

In another embodiment, mobile electronic device 600 comprises an accelerometer and a gyroscope, where the accelerometer and the gyroscope are configured to detect one or more movements of mobile electronic device 600. Operations of processor 610 further include: storing the one or more movements of mobile electronic device 600 in the memory 630 in the form of movement data, converting the movement data to one or more correlating digital signals via a movement data conversion application module 619, and sending the one or more correlating digital signals to controller 615 to adjust the emission of light from the at least some of the one or more LEDs 625. In a further embodiment, the movement data correlates to at least one of: a marching action of an individual holding mobile electronic device 600 or a directional change of the individual holding mobile electronic device 600.

In another embodiment, at least one additional cover plate is utilized by an individual using cover plate 635, where cover plate 635 and the at least one additional cover plate is synced with one another via a local area network (LAN).

In another embodiment, a piezoelectric transducer is electrically connected to the one or more LEDs 625. The piezoelectric transducer is configured to convert at least one of mechanical energy or sound waves into electricity in order to power the one or more LEDs 625.

In other embodiments, mobile electronic device 600 and cover plate 635 may be connected (wired or wireless) and work in tandem with one or more sensors and/or devices in order to collect and/or create and/or process data by the one or more sensors and/or devices. The sensors and/or devices may utilize and may be categorized into one or more general categories of functionality that include, but are not limited to: positioning technologies, sensing technologies (active), environmental analysis technologies (passive), communication technologies, and device functionality technologies. It is further noted that mobile electronic device 600 and/or cover plate 635 may embody one or more characteristics/features of the technologies presented herein.

In regard to the positioning technologies, mobile electronic device 600 and/or cover plate 635 may utilize sensors/devices such as, but not limited to: gyroscopes, accelerometers, compasses, and GPS devices. End-use cases/data collected/functionality resulting from the utilization of mobile electronic device 600 and/or cover plate 635 with the sensors/devices above include, but are not limited to: position data (for example, position on a performance field), device orientation data, cardinal direction data, screen-facing data, latitude data, longitude data, rate of travel data, direction of travel data, G-force data, bubble level functionality, exhaustion level data, and breathing data.

In one embodiment, one or more positioning technologies may be used to give a member of a marching band or similar individual real-time feedback to improve the movement of their instrument. For example, a gyroscope and accelerometer may be utilized on a musical instrument (or within a mobile electronic device) to determine if a marching band member is moving their instrument in a synchronized manner with instruments of other band members. A gyroscope may be used to determine a rate of rotation of a musical instrument while an accelerometer may be used to determine tilt direction and acceleration of a musical instrument (generally, movement characteristics). The data can be utilized to give visual or audio notifications or signals to the marching band member, or converted into verbal commands form a virtual assistant (using communication technologies described below, for example). Data and feedback can be further customized to an individual band member using artificial intelligence and learning algorithms, which may be trained using prior movement data of the musical instrument or other musical instruments.

In regard to the sensing technologies (active), mobile electronic device 600 and/or cover plate 635 may utilize sensors/devices such as, but not limited to: infrared light devices, LiDAR devices, ultrasonic wave devices, RFID devices, and NFC devices. End-use cases/data collected/functionality resulting from the utilization of mobile electronic device 600 and/or cover plate 635 with the sensors/devices above include, but are not limited to: real-time/post-performance analysis data, attendance data, AI object recognition data, object analysis/avoidance data, environmental recognition data, and listening environment analysis data.

In one embodiment, one or more sensing technologies (active) may be used to give a member of a marching band or similar individual real-time feedback to increase safety performance. For example, RFID devices (tags and readers) may be used to determine if a marching band member is marching/performing too close to other band members. The RFID tags/readers may be used to determine proximity to other band member while a performance is occurring (where a distance limit may be set for safety purposes). The data can be utilized to give visual or audio notifications or signals to the marching band member, or converted into verbal commands from a virtual assistant. Data and feedback can be further customized to an individual band member using artificial intelligence and learning algorithms, which may be trained using prior performance data of the band member or other band members.

In regard to the environmental analysis technologies (passive), mobile electronic device 600 and/or cover plate 635 may utilize sensors/devices such as, but not limited to: humidity sensors, temperature sensors, cameras, microphones, and timers/clocks. End-use cases/data collected/functionality resulting from the utilization of mobile electronic device 600 and/or cover plate 635 with the sensors/devices above include, but are not limited to: real-time/post-performance analysis data, weather data, forecasted weather data, attendance data, AI object recognition data, object analysis/avoidance data, environmental recognition data, exhaustion level data, breathing data, listening environment analysis data, front/rear video capture, video chat capabilities, text-to-speech functionality, speech recognition functionality, decibel level monitoring capabilities, wired/wireless charging capabilities, battery level indicator functionality, and time analytics.

In one embodiment, one or more environmental analysis technologies (passive) may be used to give a member of a marching band or similar individual real-time feedback to improve their performance. For example, a microphone may be used to determine if a marching band member is playing their instrument at an appropriate volume in relation to a standard volume or in relation to other band members. A microphone may be used to determine a noise/volume level of a musical instrument (such as, for example, a decibel level). The data can be utilized to give visual or audio notifications or signals to the marching band member, or converted into verbal commands from a virtual assistant. Data and feedback can be further customized to an individual band member using artificial intelligence and learning algorithms, which may be trained using prior noise/volume data of the band member or other band members.

In regard to the communication technologies, mobile electronic device 600 and/or cover plate 635 may utilize sensors/devices such as, but not limited to: Bluetooth enabled devices, Wireless (Wi-Fi) enabled devices, BLE enabled devices, cellular enabled devices, antenna devices, UHF enabled devices, and VHF enabled devices. End-use cases/data collected/functionality resulting from the utilization of mobile electronic device 600 and/or cover plate 635 with the sensors/devices above include, but are not limited to: real-time/post-performance analysis data, device interactivity (and data), triggering capabilities, tuning data, attendance data, front/rear video capture, communication data, radio wave communication capabilities, video chat capabilities, impairment accessibility, pass-through display functionality, and mounted accessory recognition.

In one embodiment one or more communication technologies may be used to give a member of a marching band or similar individual real-time instructions relative to a performance. For example, a Bluetooth enabled device may be used to alter a musical performance. The Bluetooth enabled device may be used to receive data in the form of updated visual instructions of a performance from another Bluetooth enabled device. The data can be utilized to give visual or audio notifications or signals to the marching band member, or converted into verbal commands from a virtual assistant. Data and feedback can be further customized to one or more band members using artificial intelligence and learning algorithms to optimize specific characteristics of a performance, which may be trained using prior performance data of one or more band members.

In regard to device functionality technologies, mobile electronic device 600 and/or cover plate 635 may utilize sensors/devices such as, but not limited to: display screens (such as, for example, E-ink, LED, and OLED screens), lights, buttons/triggers, wireless charging devices, temperature regulation devices, and robotic devices. End-use cases/data collected/functionality resulting from the utilization of mobile electronic device 600 and/or cover plate 635 with the sensors/devices above include, but are not limited to: triggering capabilities, activating lights (multiple technologies), tuning data, overlaid digital user interface (UI) elements, impairment accessibility, AR/mixed display elements, electronic logo functionality/data, advertisement display functionality/data, and privacy glass actuation functionality.

In one embodiment, one or more device functionality technologies may be used to give a member of a marching band or similar individual real-time performance assistance. For example, a robotic device may be used to "play" or actuate a portion of an instrument if a band member is physically impaired. The robotic device may be affixed to an instrument (such as a trumpet, for example) in a way that allows the robotic device to stay affixed to the trumpet while also pressing a valve (in the case that the physical impairment is an individual missing a finger). Data (collected regarding the accuracy of the pressing of the valve) can be utilized to reprogram the robotic device in the case where the timing of the pressing of the valve is off. Data and feedback can be further customized to the robotic device using artificial intelligence and learning algorithms, which may be trained using prior performance data of the robotic device.

It is noted that any of the data collected in regard to the positioning technologies, sensing technologies (active), environmental analysis technologies (passive), communication technologies, and/or device functionality technologies may be utilized as comparative data sets for accuracy purposes and/or data for generative data trend analysis.

In one embodiment, one or more positioning technologies and sensing technologies (active) may be used to give a member of a marching band or similar individual real-time feedback to improve their performance. For example, GPS positioning technology may be combined with LIDAR technology to determine if a marching band member is marching in a synchronized manner (speed and direction) with other marching band members or relative to the dimensions and a position on a field of performance. LIDAR may be used to determine proximity to another member, a conductor, or a fixed position on a field or in a stadium. GPS, IMU, or gyroscope sensors can determine whether the member is moving themselves or their instrument at an appropriate speed, acceleration, pitch, yaw, or other desired movement characteristic. The data can be combined to give visual or audio notifications or signals to the marching band member, or converted into verbal commands from a virtual assistant. Data and feedback can be further customized to an individual band member using artificial intelligence and learning algorithms, which may be trained using prior performance data of the band member or other band members.

In embodiments, any of the data collected may be collated and stored in a database that may be accessed and utilized by one or more members of a band and/or a band director so that the data can be reviewed for performance quality.

Figure 7B:
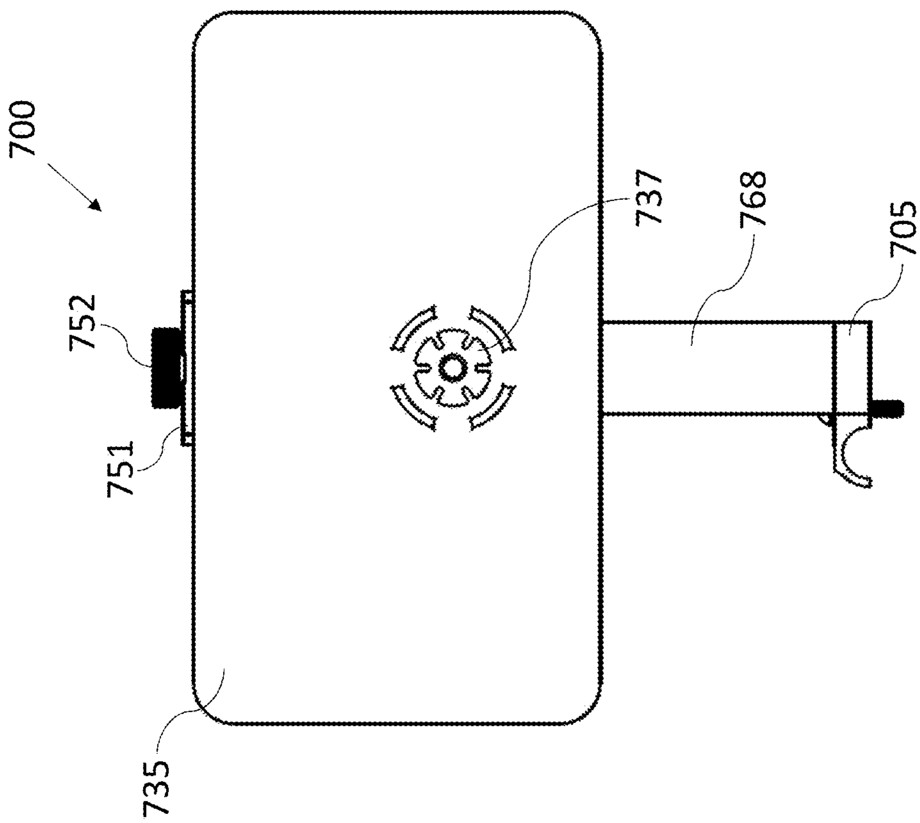
FIG. 7B is an illustration of a rear view of a mobile electronic device mounting system in accordance with certain embodiments of the present disclosure.
Figure 7A:
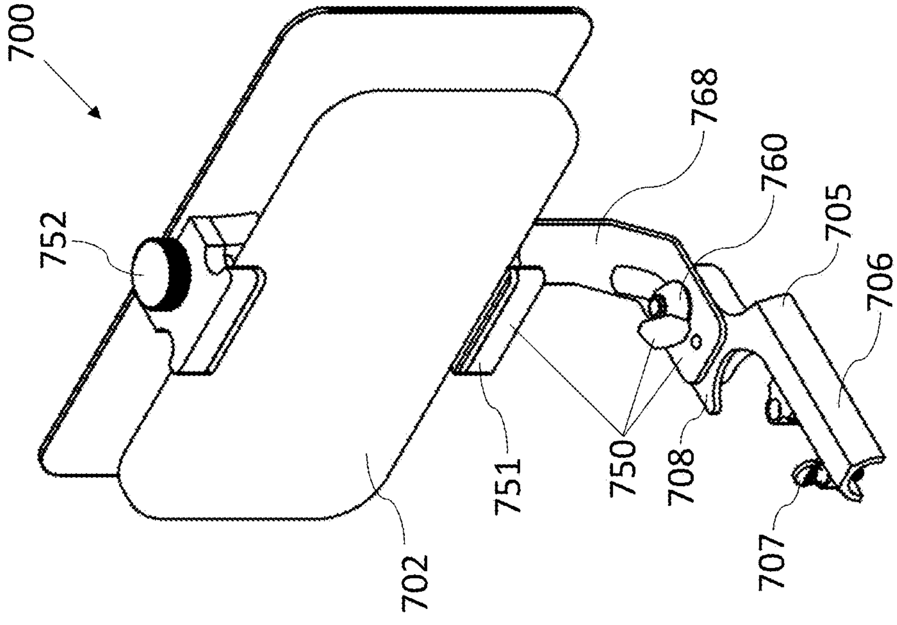
FIG. 7A is an illustration of an isometric view of a mobile electronic device mounting system in accordance with certain embodiments of the present disclosure.

FIG. 7A is an illustration of an isometric view of a mobile electronic device mounting system 700 in accordance with certain embodiments of the present disclosure. As shown, system 700 is configured to mount a mobile electronic device 702 to an instrument (not depicted). System 700 includes a musical instrument mounting device 705 (similar to musical instrument mounting devices 100,155) including an attachment portion 706 configured to removably attach to an instrument (as shown, via a fastener 707). Attachment portion 706, as shown, defines a space that is configured to securely receive a portion of the (brass) instrument. Musical instrument mounting device 705 additionally includes a receiver section 708 attached to the attachment portion 706 and having a retainer body including a receiving means configured to receive a coupling device 760 for securing a mobile electronic device 702 to musical instrument mounting device 705 (in this embodiment, an orifice for receiving a bolt). As shown, the receiving means includes an orifice for receiving a bolt and a wingnut (coupling device 760). In other embodiments, musical instrument mounting device 705 may be any other musical instrument mounting device disclosed that includes an attachment portion and a receiver section.

System 700 further includes a retainer device 750 configured to retain a mobile electronic device 702. Retainer device 750 includes an extension arm 768 having a top end, a bottom end, a first side and a second side. Retainer device 750 further includes the coupling device 760 affixed to the bottom end of the extension arm 768 and a receiver portion 751 (configured to support a mobile electronic device 702) removably affixable to the first side of the extension arm 768. Receiver portion 751 includes a clamp body that is adjustable, via twist mechanism 752 (as shown, a twist knob positioned at a top end of receiver portion 751), to receive mobile electronic devices of varying sizes. When utilized, twist knob is configured to vary a compression force of receiver portion 751 on mobile electronic device 702. A cover plate 735 is removably attached to the second side of the extension arm 768 opposite the receiver portion 751 and includes a substantially flat body having a first surface 736 and a second surface 738. Cover plate 735 is configured to protect mobile electronic device 702 and/or to be utilized as a display device (including one or more LEDs 737 depicted on second surface 738 in FIG. 7B). As further shown in FIG. 7B, cover plate 735 includes an LED 737 integral with the cover plate 735. In additional embodiments, cover plate 735 includes multiple LEDs 737 configured to illuminate at the same or project different luminosities. It is noted that when retainer device 750 supports/retains mobile electronic device 702, mobile electronic device 702 and cover plate 735 are parallel with one another. In embodiments, cover plate 735 comprises a perimeter greater than that of mobile electronic device 702.

It is noted that when cover plates 735, in conjunction with musical instrument mounting devices, are utilized by multiple individuals playing instruments in a marching band routine, cover plate 735 may provide a visually uniform perspective to a crowd watching the marching band routine. This may reduce distraction for the audience by concealing different configurations of mobile electronic devices that would normally be visible to the audience if the individuals were not using cover plates 735.

In an embodiment, mounting system 700 may include any musical instrument mounting device disclosed, as opposed to only including musical instrument mounting device 705.

Figure 8:
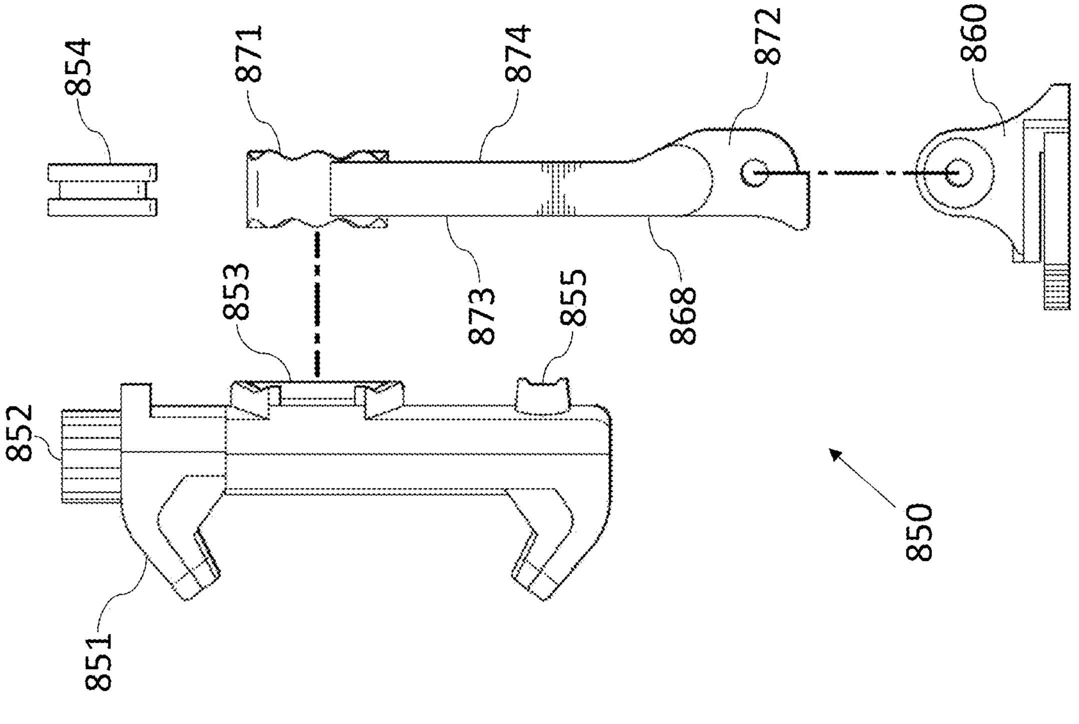
FIG. 8 is an illustration of a deconstructed side view of an alternative retainer device for securing a mobile electronic device in accordance with certain embodiments of the present disclosure.

FIG. 8 is an illustration of a deconstructed side view of an alternative retainer device 850 for securing a mobile electronic device (not depicted) in accordance with certain embodiments of the present disclosure. As shown, retainer device 850 includes a coupling device 860 configured to attach to a retainer (buckle) body of a musical instrument mounting device (such as, for example retainer bodies 132,232,332). An extension arm 868 affixable to coupling device 860 includes a top end 871, a bottom end 872, a first side 873, and a second side 874. A receiver portion 851 configured to receive and support a mobile electronic device is affixable to top end 871 of extension arm 868 and includes twist mechanism 852 that adjusts receiver portion 851 to receive mobile electronic devices of varying sizes.

As further shown in FIG. 8, coupling device 860 and extension arm 868 collectively include alignable orifices configured to receive a pin for rotatable attachment of the extension arm 868 with coupling device 860. Extension arm 868 includes a stepped magnet 854 positioned at the top end 871 of extension arm 868, where stepped magnet 854 includes a first surface exposed along first side 873 of extension arm and a second opposing surface exposed along second side 974 of extension arm 868. Receiver portion 851 includes a (first) disc magnet 853 that removably attaches to a first side of stepped magnet 854 positioned at top end 871 of extension arm 868. As further shown receiver portion 851 comprises a protrusion 855 integral with receiver portion 851 that is positioned below first disc magnet 853, where protrusion 855 is configured to abut extension arm 868 and increase surface contact of first disc magnet 853 and the first surface of stepped magnet 854. In an embodiment, a cover plate (similar to cover plate 735 of FIGS. 7A and 7B) may include a second integrated magnet in order to removably attach to a second side of stepped magnet 854.

Figure 9A:
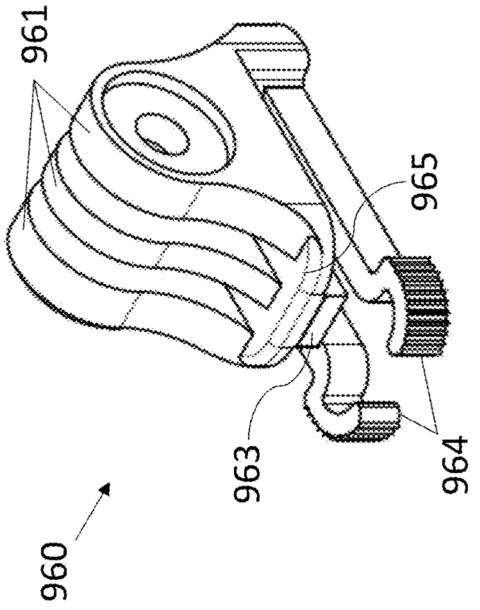
FIG. 9A is an illustration of an isometric view of a coupling device in accordance with certain embodiments of the present disclosure.

FIG. 9A is an illustration of an isometric view of a coupling device 960 in accordance with certain embodiments of the present disclosure. As shown, a plurality of protrusions 961 (three) are positioned in parallel on a top side of a protrusion base 965 and collectively include orifices 962 that define a pin axis. A buckle latch 964 defined below a bottom side of protrusion base 965 extends from a first end of coupling device 960 to a second end of coupling device 960, where the latch portion of the buckle latch 964 projects outwardly from under protrusion base 965. As depicted, buckle latch 964 is configured to engage with a buckle body to secure coupling device 960 to any musical instrument mounting device disclosed that includes any of retainer (buckle) bodies 132,232,332. Buckle latch 964 further includes a pair of extension arms affixed to a first end of coupling device 960 and extend along a majority of the length of coupling device 960, where the pair of extension arms each include a portion of a latch defined at a second end of coupling device 960. Additionally, an alignment portion 963 affixed to and defined below a bottom side of protrusion base 965 extends from a first end of coupling device 960 to a second end of coupling device 960 while also being positioned parallel with the pair of extension arms when the extension arms are in an uncompressed state (see FIGS. 9A, 9C, and 9E). When coupling device 960 is affixed to any of buckle bodies 132,232,332, alignment portion 963 is secured between sidewalls of buckle body 132,232,332, reducing lateral movement of coupling device 960.

Figure 9B:
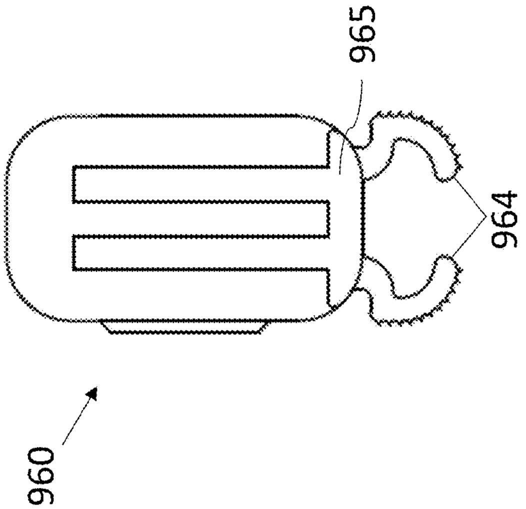
FIG. 9B is an illustration of a top view of a coupling device in accordance with certain embodiments of the present disclosure.
Figure 9C:
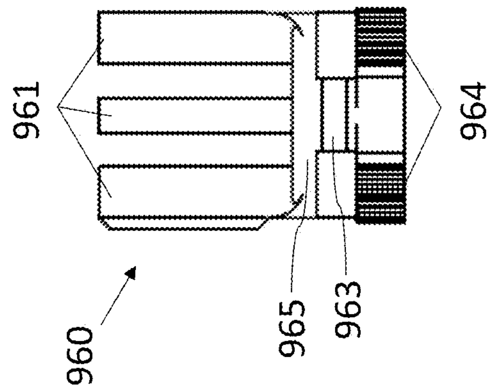
FIG. 9C is an illustration of a front view of a coupling device in accordance with certain embodiments of the present disclosure.

As shown in FIG. 9B, slits are defined between protrusions 961 in order to receive protrusions affixed to a bottom end of an extension arm of a retainer device (such as bottom end 872 of FIGS. 8A and 8B). Protrusions 961 and protrusions of an extension arm may be affixed to one another via a pin insertable into aligned orifices positioned on protrusions 961 and protrusions of the extension arm; pin may provide rotatable attachment between coupling device 960 and the bottom end of the extension arm. FIG. 9C is an illustration of a front view of coupling device 960 and further defines the slits between protrusions 961. As shown, alignment portion 963 is defined between portions of buckle latch 964 in order to keep coupling device 960 properly aligned when attached to a retainer (buckle) body.

Figure 9D:
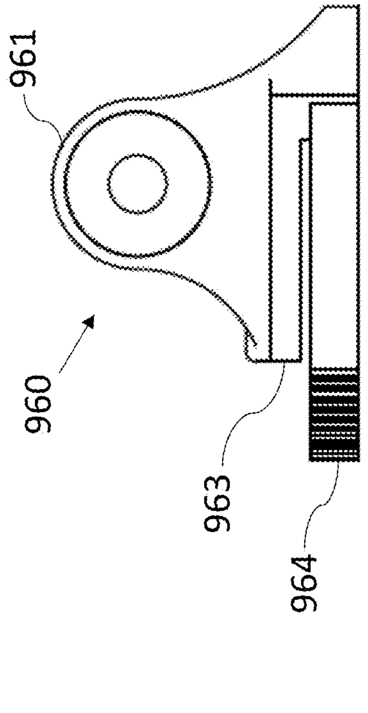
FIG. 9D is an illustration of a side view of a coupling device in accordance with certain embodiments of the present disclosure.
Figure 9E:
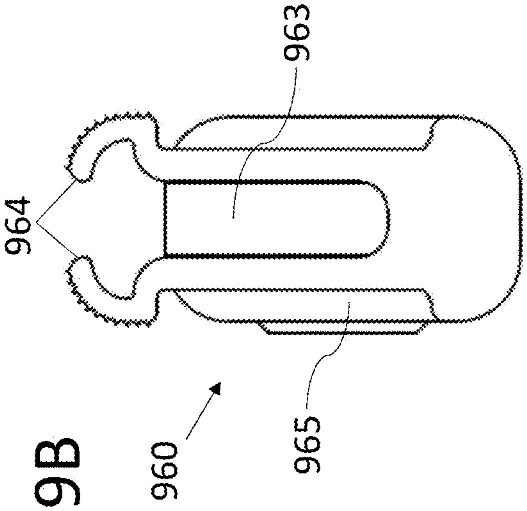
FIG. 9E is an illustration of a bottom view of a coupling device in accordance with certain embodiments of the present disclosure.

FIG. 9D is an illustration of a side view of a coupling device 960 in accordance with certain embodiments of the present disclosure. As shown, latches of buckle latch 964 extend past protrusion base 965 so the latches are accessible for engagement from an individual. As further shown in FIG. 9E, buckle latch 964 includes two extension sections terminating at a pair of exposed latches. In order to attach coupling device 964 to any of retainer (buckle) bodies 132,232,332, a compressive force is applied to the latches (via, for example, fingers of an individual) of buckle latch 964 in order to compress buckle latch to fit between sidewalls of retainer (buckle) bodies 132,232,332 as buckle latch 964 is slid into the retainer (buckle) bodies 132,232,332.

Figure 10A:
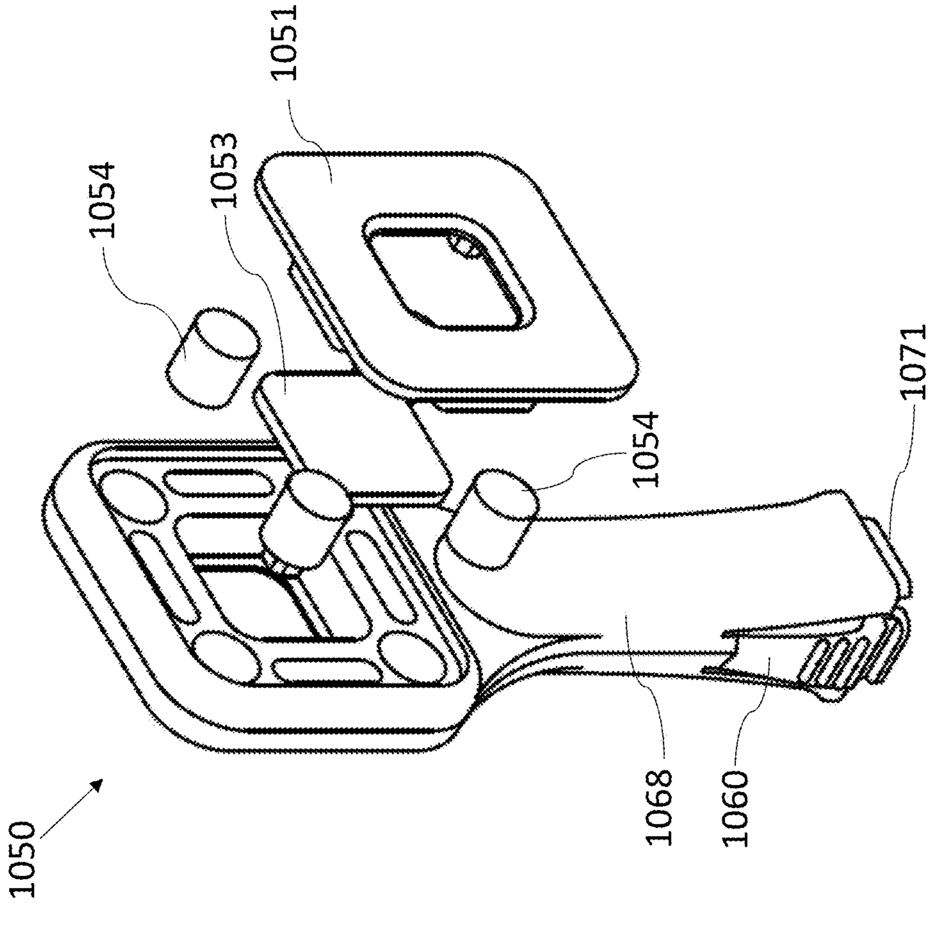
FIG. 10A is an illustration of a deconstructed view of an alternate retainer device for securing a mobile electronic device in accordance with certain embodiments of the present disclosure.
Figure 10B:
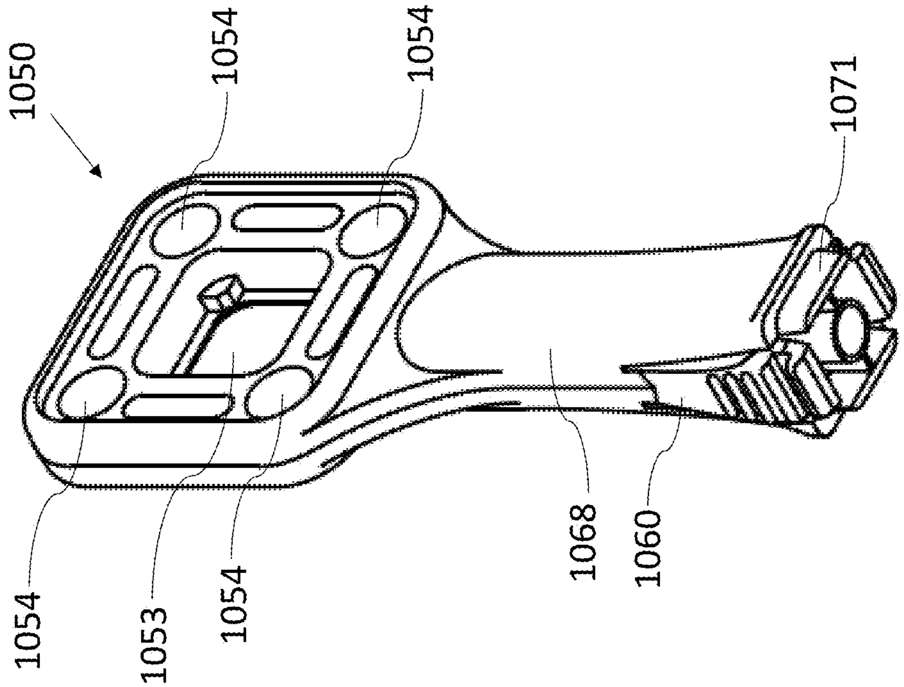
FIG. 10B is an illustration of a bottom perspective view of an alternate retainer device for securing a mobile electronic device in accordance with certain embodiments of the present disclosure.
Figure 11B:
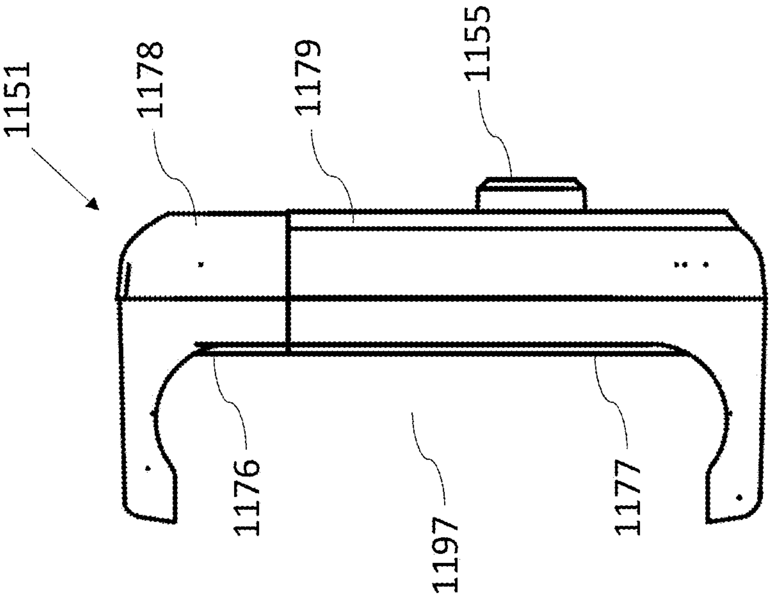
FIG. 11B is an illustration of a side view of an alternative receiver section of a retainer device for securing a mobile electronic device in accordance with certain embodiments of the present disclosure.

FIG. 10A is an illustration of a front view of an alternate retainer device 1050 for securing a mobile electronic device (not depicted) in accordance with certain embodiments of the present disclosure. Retainer device 1050 may be utilized as an alternative to retainer device 850, depicted in FIGS. 8A and 8B. As shown, retainer device 1050 includes an attachment head 1051 including a front side housing a central (metal) plate 1053 and a plurality of front magnets 1054 for receiving a receiver section 1151 (see FIGS. 11A and 11B) secured to a mobile electronic device. An extension arm 1068 connects attachment head 1051 to a coupling portion 1060. Coupling portion 1060, in this embodiment, includes a pair of clips that are configured to be depressed. When depressed, clips depress hooks of an attachment section 1071 that configures attachment section 1071 to fit into an indentation (such as, for example, retainer body 182) positioned on a musical instrument mounting device (in place of a retainer/buckle body) utilizing a snap-fit mechanism. As further shown in FIG. 10B, a rear side of attachment head 1051 includes one or more rear magnets 1054 configured to receive a cover plate (similar to the embodiment of retainer device 850 of FIGS. 8A and 8B). It is noted that retainer device 1050 generally comprises an integral body (as opposed to, for example retainer device 850, which is formed of multiple, separate parts).

Figure 11A:
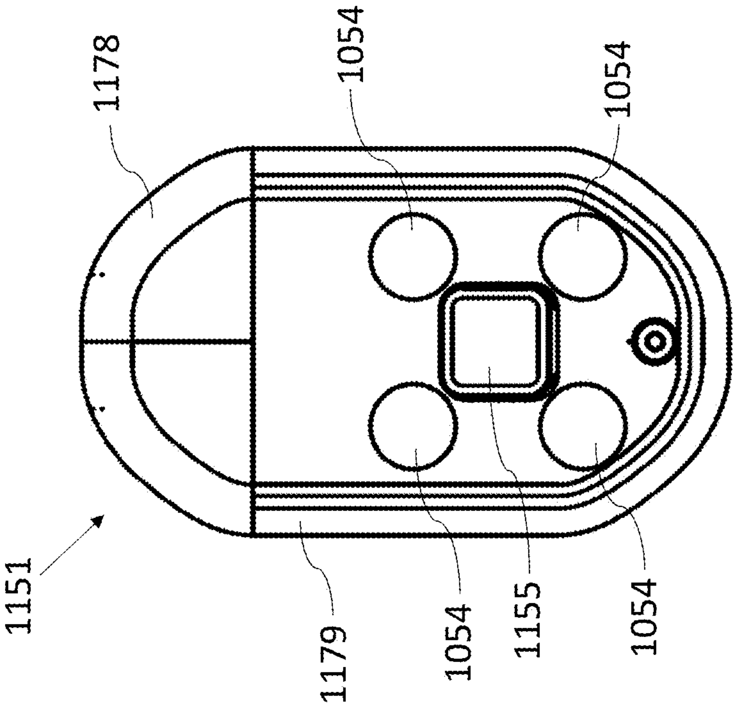
FIG. 11A is an illustration of a rear view of an alternative receiver section of a retainer device for securing a mobile electronic device in accordance with certain embodiments of the present disclosure.

FIG. 11A is an illustration of a rear view of an alternative receiver section 1151 of a retainer device for securing a mobile electronic device in accordance with certain embodiments of the present disclosure. Receiver section 1151 is configured to removably affix to a retainer device (such as, for example, retainer device 1050 of FIG. 10A) via one or more magnets 1154. Receiver section 1151 includes front upper cover 1176, front lower cover 1177, rear upper cover 1178, and rear lower cover 1179. Front upper cover 1176 and front lower cover 1177 collectively define receiving space 1197 (see FIG. 11B) for receiving a mobile electronic device. Push button 1155 is positioned within an orifice defined in rear lower cover 1179 and is actuatable via touch from an individual.

Figure 11C:
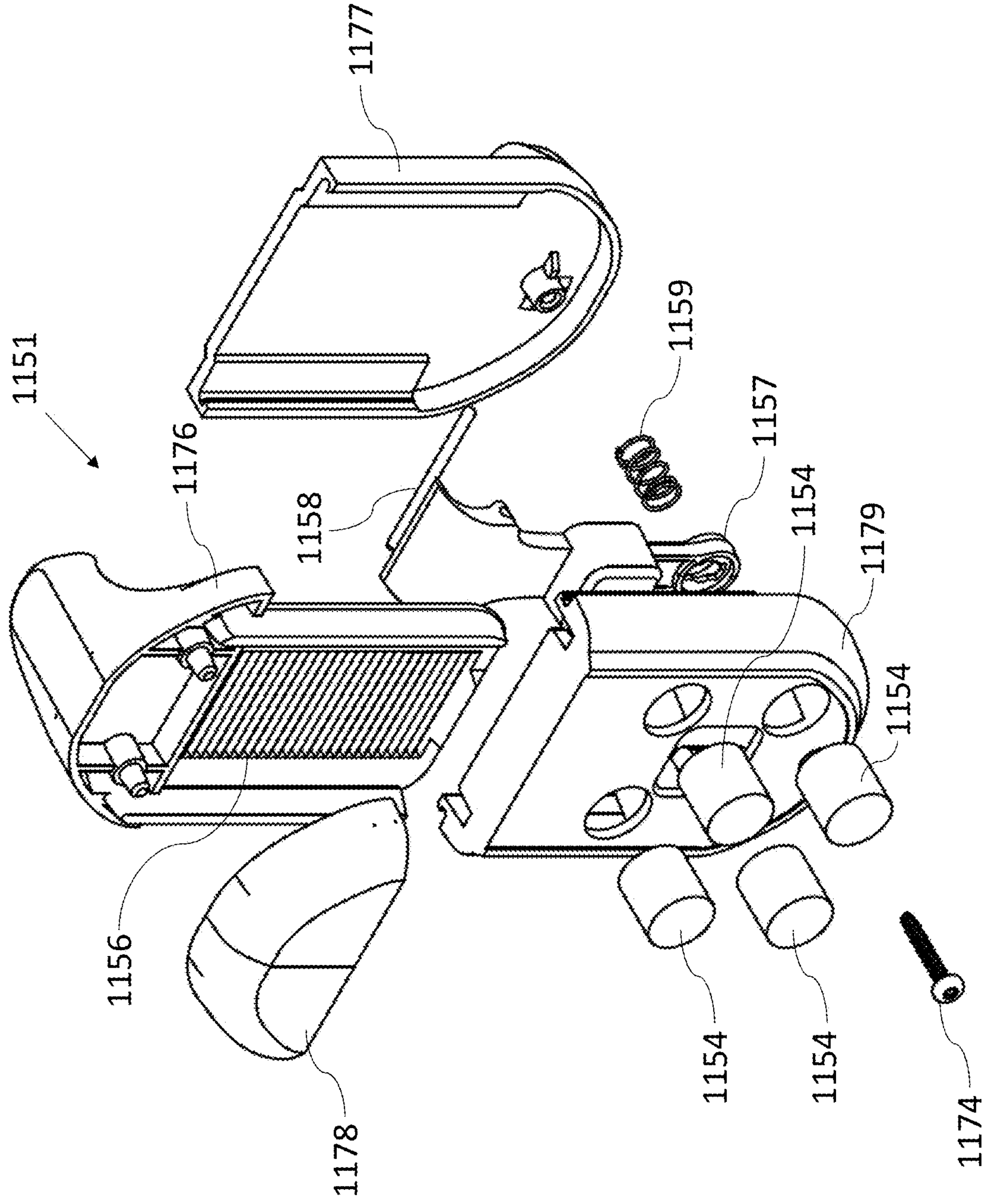
FIG. 11C is an illustration of a deconstructed view of an alternative receiver section of a retainer device for securing a mobile electronic device in accordance with certain embodiments of the present disclosure.

As shown in FIG. 11C, in a deconstructed view of receiver section 1151, push button 1155 defines a middle section of a pawl 1157 that includes a dowel 1158 on a top end of pawl 1157 and a spring receiver on a bottom end of pawl 1157. When front lower cover 1177 and rear lower cover 1179 are mechanically engaged (via slots), a spring 1159 is forced against front lower cover 1177 in order to create leverage for pawl 1157. When front upper cover 1176 is positioned between front lower cover 1177 and rear lower cover 1179, front upper cover 1176 is slidably engaged with front lower cover 1177 and rear lower cover 1179. As front upper cover 1176 is slid up and down, dowel 1158 engages a ratchet wall 1156 of front upper cover 1176 via the leverage provided by spring 1159. The interaction of dowel 1158 and ratchet wall 1156 determines the height of receiving space 1197. In order to adjust the height of receiving space 1197, push button 1155 is engaged (pressed into receiver section 1151) so that dowel 1158 is disengaged from ratchet wall 1156. With push button 1155 engaged, front upper cover 1176 is pushed/pulled upward or downward to a defined position. Once the desired height of the receiving space 1197 is made, push button 1155 may be disengaged so that dowel 1158 reengages ratchet wall 1156 to restrict movement of front upper cover 1176. It is noted that fastening device 1174, when engaging receiver section 1151, acts as a stabilizing device for fastening device 1159 in order to keep fastening device 1159 positioned along an axis defined along the length of fastening device 1159.

Figure 12A:
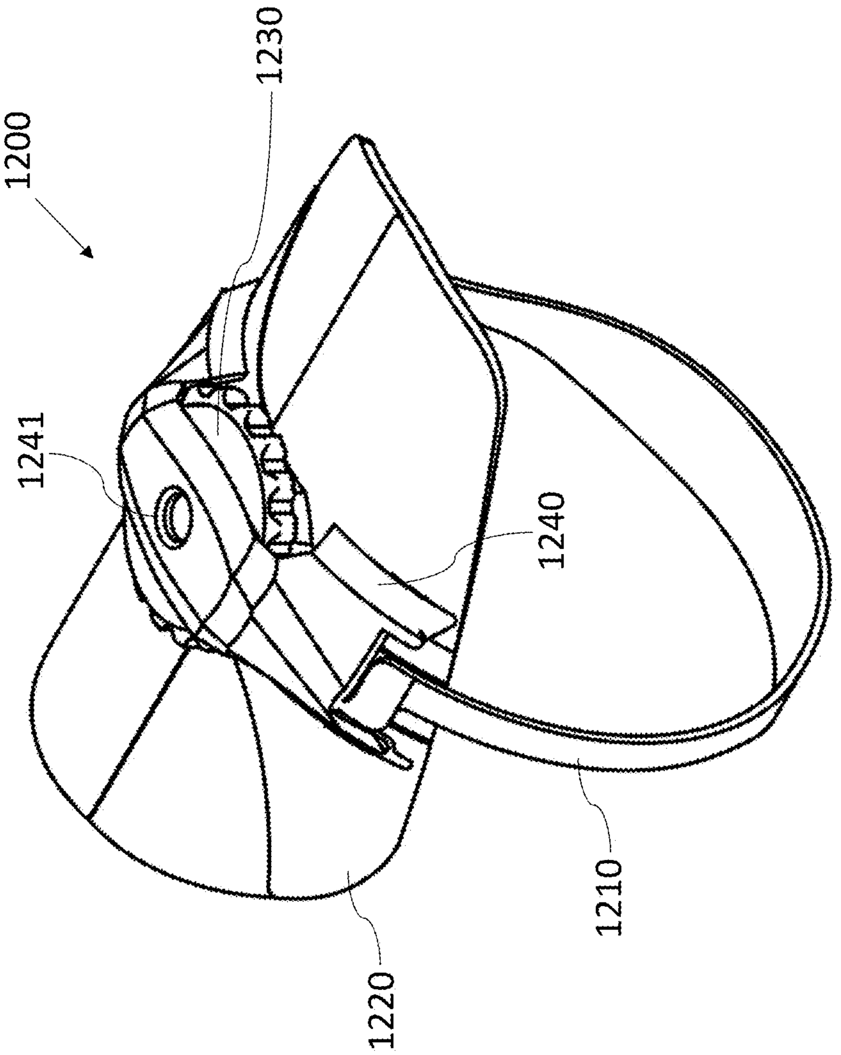
FIG. 12A is an illustration of an arm retainer device for securing a mobile electronic device in accordance with certain embodiments of the present disclosure.
Figure 12C:
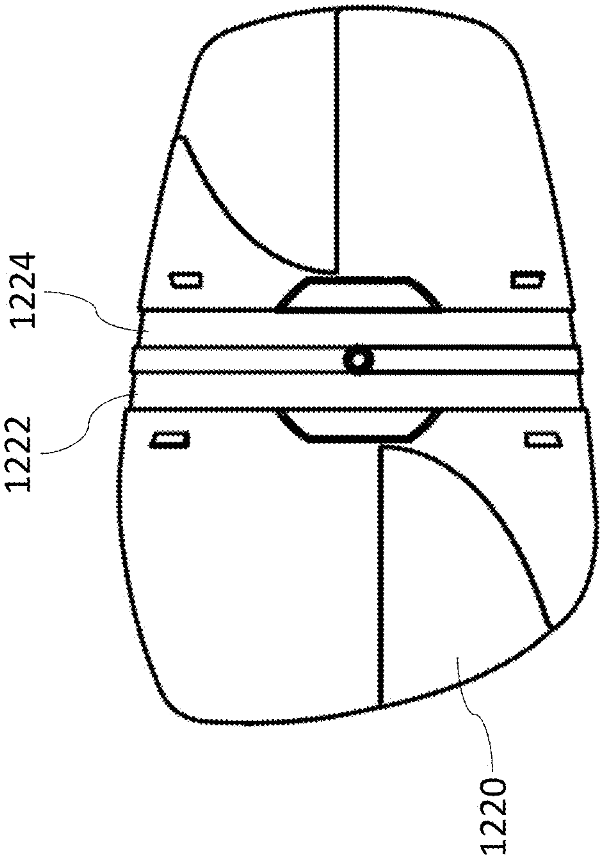
FIG. 12C is an illustration of a brace portion of an arm retainer device for securing a mobile electronic device in accordance with certain embodiments of the present disclosure.
Figure 12B:
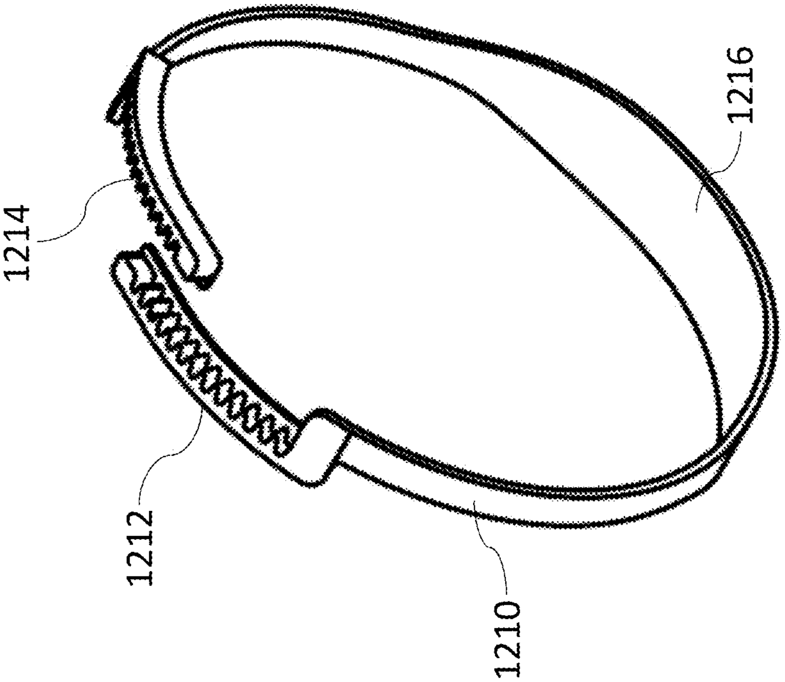
FIG. 12B is an illustration of an arm strap portion of an arm retainer device for securing a mobile electronic device in accordance with certain embodiments of the present disclosure.

FIG. 12A is an illustration of an arm retainer device 1200 for securing a mobile electronic device in accordance with certain embodiments of the present disclosure. As shown, arm retainer device 1200 is configured to be worn by an individual playing a musical instrument in order to support the individual's mobile electronic device (presenting an electronic copy of a music sheet) in a line of sight of the individual during a musical performance. Arm retainer device 1200, as shown in FIG. 12B, includes an arm strap portion 1210 mechanically engaged to a dial wheel 1230 and includes a generally cylindrical configuration configured to be positioned around an arm of an individual. A first set of teeth 1212 is positioned at a first end of a first arm 1213 of arm strap portion 1210, while a second set of teeth 1214 is positioned at a second end of a second arm 1215 of arm strap portion 1210. When dial wheel 1230 is rotated clockwise or counterclockwise, first set of teeth 1212 and second set of teeth 1214 engage the teeth of a rotating sprocket 1236 positioned on a bottom of dial wheel 1230 (see FIG. 12F). During this process, first set of teeth 1212 and second set of teeth 1214 are moved in opposite directions, causing arm strap portion 1210 to increase or decrease in size so that arm strap portion 1210 may be worn comfortably on different sized arms of individuals. In order to keep the first and second set of teeth 1212,1214 aligned with and engaging sprocket 1236, the first set of teeth 1212 is positioned along a first strap guide 1222 of brace portion 1220 while the second set of teeth 1214 is positioned along a second strap guide 1224 of brace portion 1220, where first strap guide 1222 and second strap guide 1224 extend across brace portion 1220 in parallel (see FIG. 12C). Additionally, cover portion 1240 also keeps the first and second set of teeth 1212,1214 positioned along first and second strap guides 1222,1224 and keeps the first and second set of teeth 1212,1214 positioned along the arc-shaped body of brace portion 1220. Additionally, as shown in FIG. 12A dial wheel 1230/cover portion 1240 may include a retainer orifice 1241 configured to receive a retainer device/receiver section for securing a mobile electronic device of an individual. As shown, retainer orifice 1241 comprises a circular configuration but in other embodiments, retainer orifice 1241 may be configured as a retainer (buckle) body (such as, for example, retainer (buckle) bodies 132,232,332) for receiving coupling devices such as, for example, coupling device 960. In additional embodiments, retainer orifice 1241 may be configured as a retainer body (such as, for example, retainer bodies 182,282,382,482) for receiving retainer devices such as, for example, retainer device 1050.

Figure 12D:
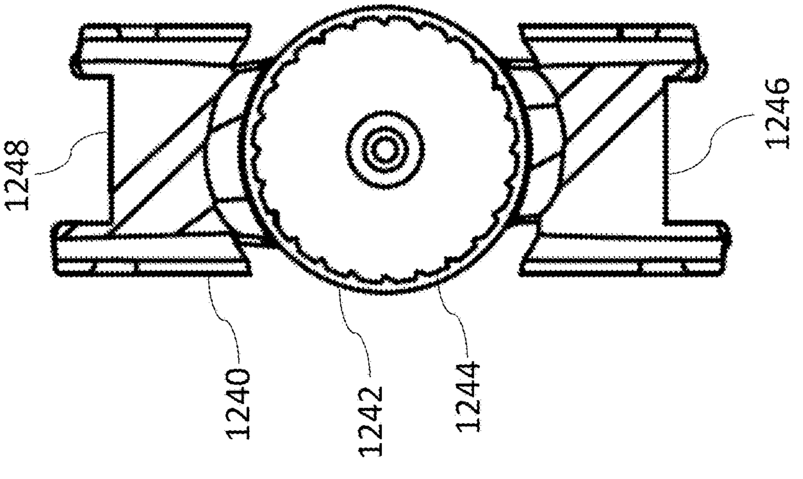
FIG. 12D is an illustration of a top view of a cover portion of an arm retainer device for securing a mobile electronic device in accordance with certain embodiments of the present disclosure.
Figure 12E:
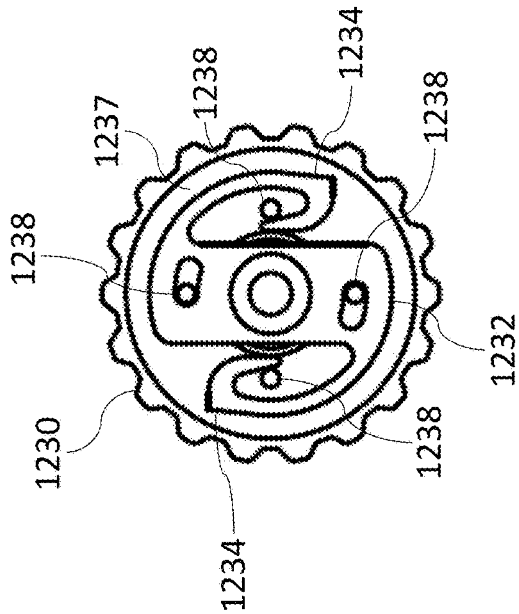
FIG. 12E is an illustration of a top partial cutaway view of a dial wheel of an arm retainer device for securing a mobile electronic device in accordance with certain embodiments of the present disclosure.
Figure 12F:
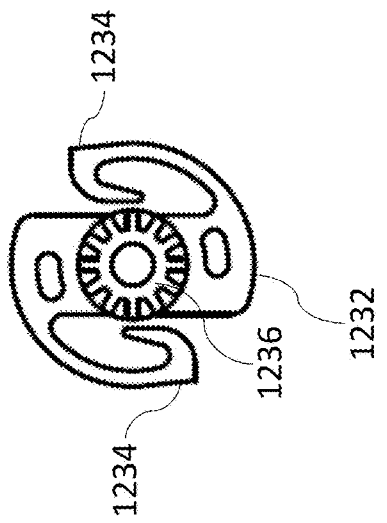
FIG. 12F is an illustration of a bottom view of a pawl body of an arm retainer device for securing a mobile electronic device in accordance with certain embodiments of the present disclosure.

As shown in FIG. 12D, cover portion 1240 includes a first guide orifice 1246 configured to receive first and second sets of teeth 1212,1214 in order to guide first set of teeth 1212 along first strap guide 1222 and guide second set of teeth 1214 along second strap guide 1224. To create rotation in sprocket 1236, and subsequently, movement of first and second sets of teeth 1212,1214, dial wheel 1230 is engaged by an individual and rotated clockwise or counterclockwise. In order to carry these functions out, dial wheel 1230, internally, includes a portion of a ratchet wheel configuration (see FIG. 12E). Dial wheel 1230, pawl body 1232, and sprocket 1236 are collectively fixed along an axis of rotation passing through a center of dial wheel 1230. Dial wheel 1230 is positioned on top of a ratchet wheel 1242 affixed to cover portion 1240 so that pawl body 1232 is aligned with and engages with a plurality of ratchet stops 1244 lining an interior surface of ratchet wheel 1242. Each ratchet stop of the plurality of ratchet stops 1244 includes a pressure angle that is greater in the clockwise direction than in the counterclockwise direction, meaning that when pawls 1234 of pawl body 1232 engage each ratchet stop, the pawls 1234 will more easily traverse each ratchet stop in the clockwise direction than in the counterclockwise direction. Simultaneously, as ratchet stops 1244 are traversed, sprocket 1236 (shown in FIG. 12F) is rotated and first and second sets of teeth 1212,1214 are pushed in opposite directions, where arm strap portion 1210 is tightened when first and second sets of teeth 1212,1214 are pushed toward one another and arm strap portion 1210 is loosened when first and second sets of teeth 1212,1214 are pushed away from one another. In addition, pegs 1238 are positioned to engage pawl body 1232 in order to provide smoothness and control to pawls 1234 when pawls 1234 traverse ratchet stops 1244.

It is noted that arm retainer device 1200 may be utilized by an individual playing an instrument whose line of vision projects across or adjacent a top portion of one of the individual's arm (in order to present an electronic copy of a music sheet on the individual's electronic device) while the individual is playing the instrument. For example, arm retainer device 1200 may be utilized by individuals that play woodwind instruments that include, but are not limited to: flutes, clarinets, bagpipes, piccolos, cor anglaises, recorders, oboes, and bassoons. Other exemplary instruments that may allow an individual to effectively utilize arm retainer device 1200 includes, but is not limited to: trumpets, baritones, sousaphones, and French horns.

Figure 13:
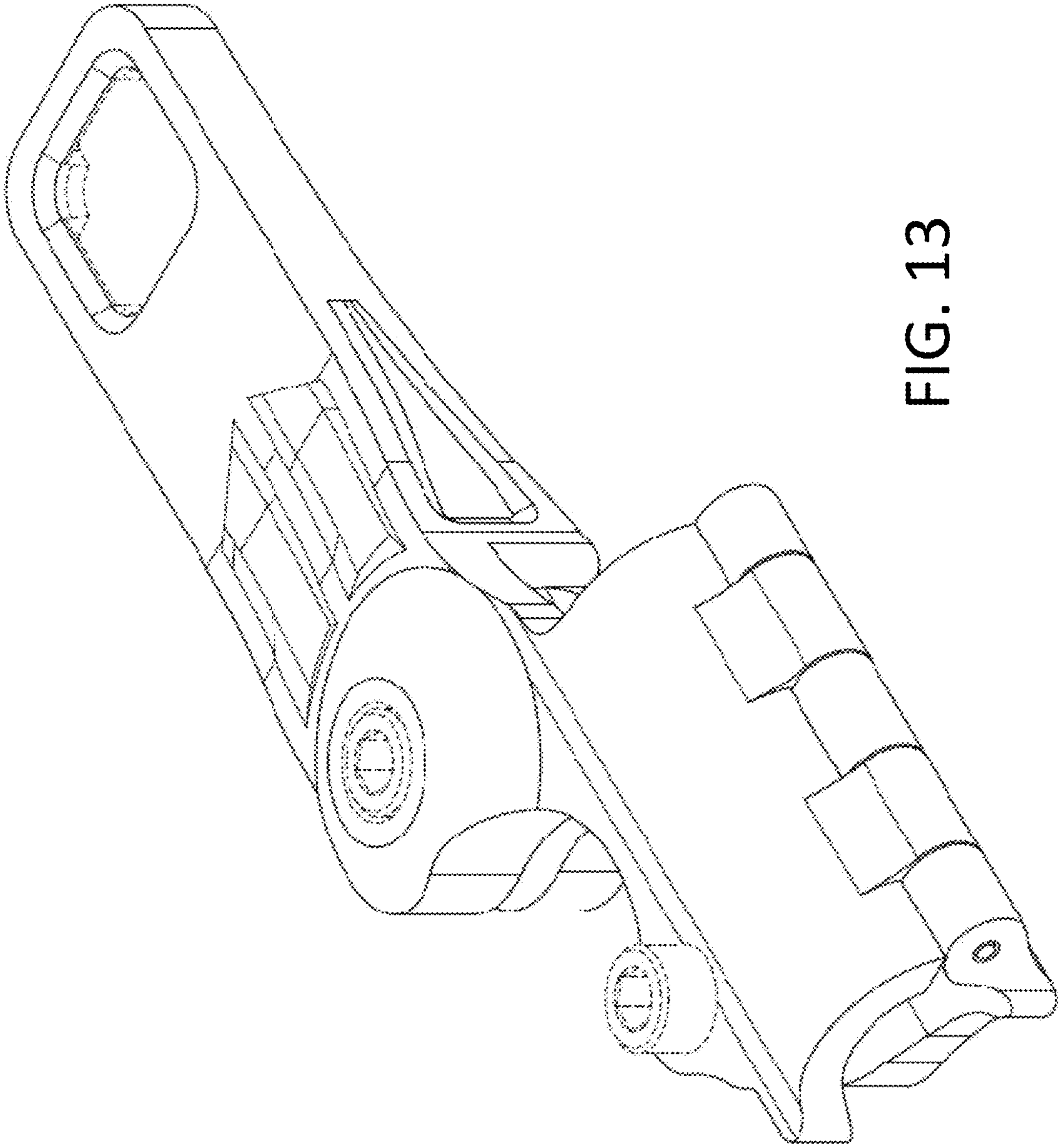
FIG. 13 is an illustration of a perspective view of a musical instrument mounting device in accordance with certain embodiments of the present disclosure.
Figure 14:
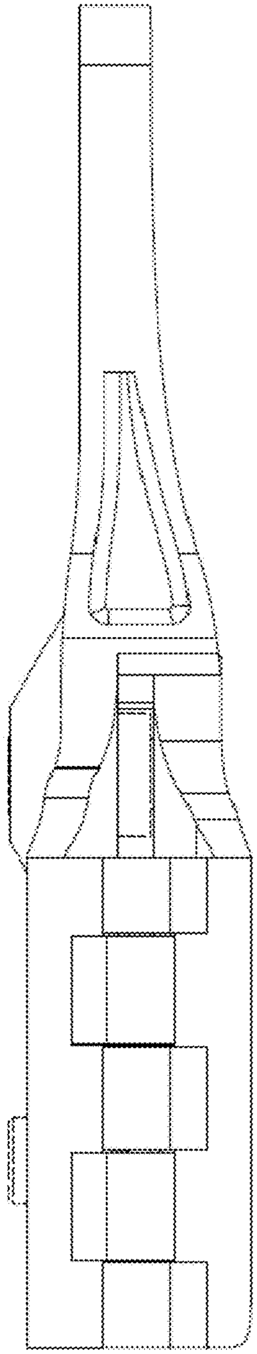
FIG. 14 is an illustration of a side view of a musical instrument mounting device in accordance with certain embodiments of the present disclosure.
Figure 15:
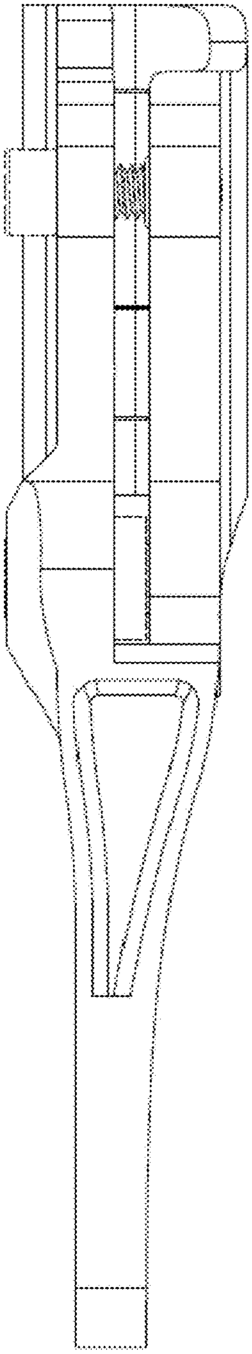
FIG. 15 is an illustration of an additional side view of a musical instrument mounting device in accordance with certain embodiments of the present disclosure.
Figure 17:
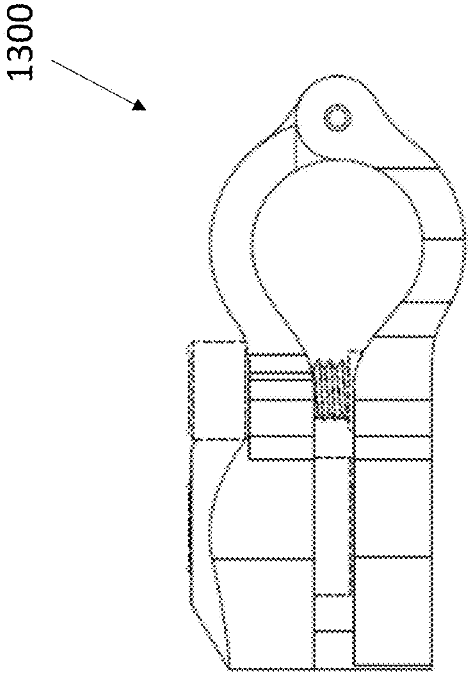
FIG. 17 is an illustration of a bottom view of a musical instrument mounting device in accordance with certain embodiments of the present disclosure.
Figure 16:
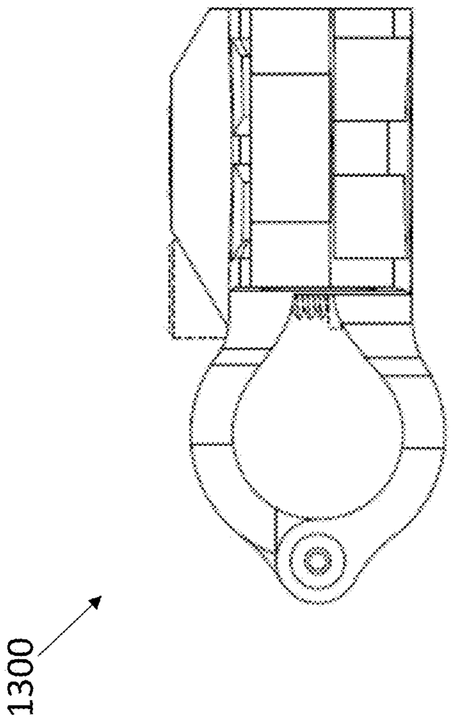
FIG. 16 is an illustration of a top view of a musical instrument mounting device in accordance with certain embodiments of the present disclosure.
Figure 18:
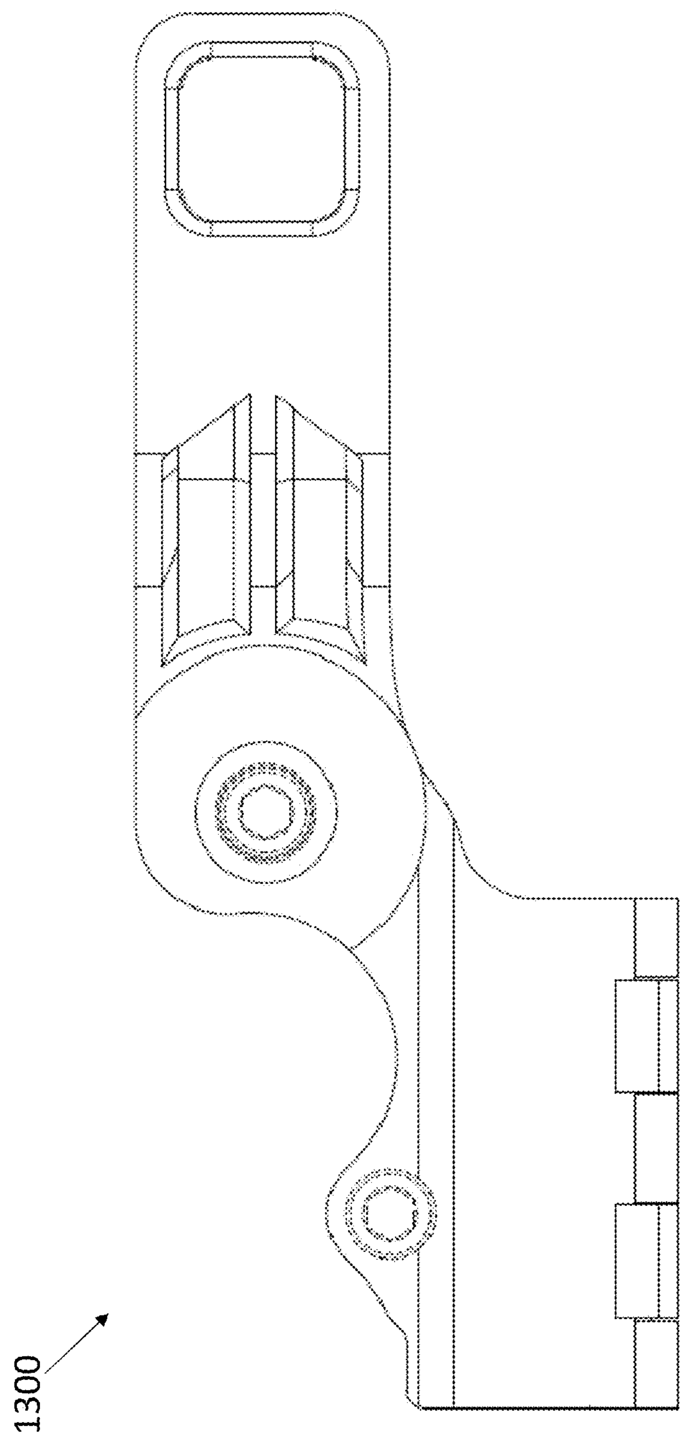
FIG. 18 is an illustration of a front view of a musical instrument mounting device in accordance with certain embodiments of the present disclosure.
Figure 19:
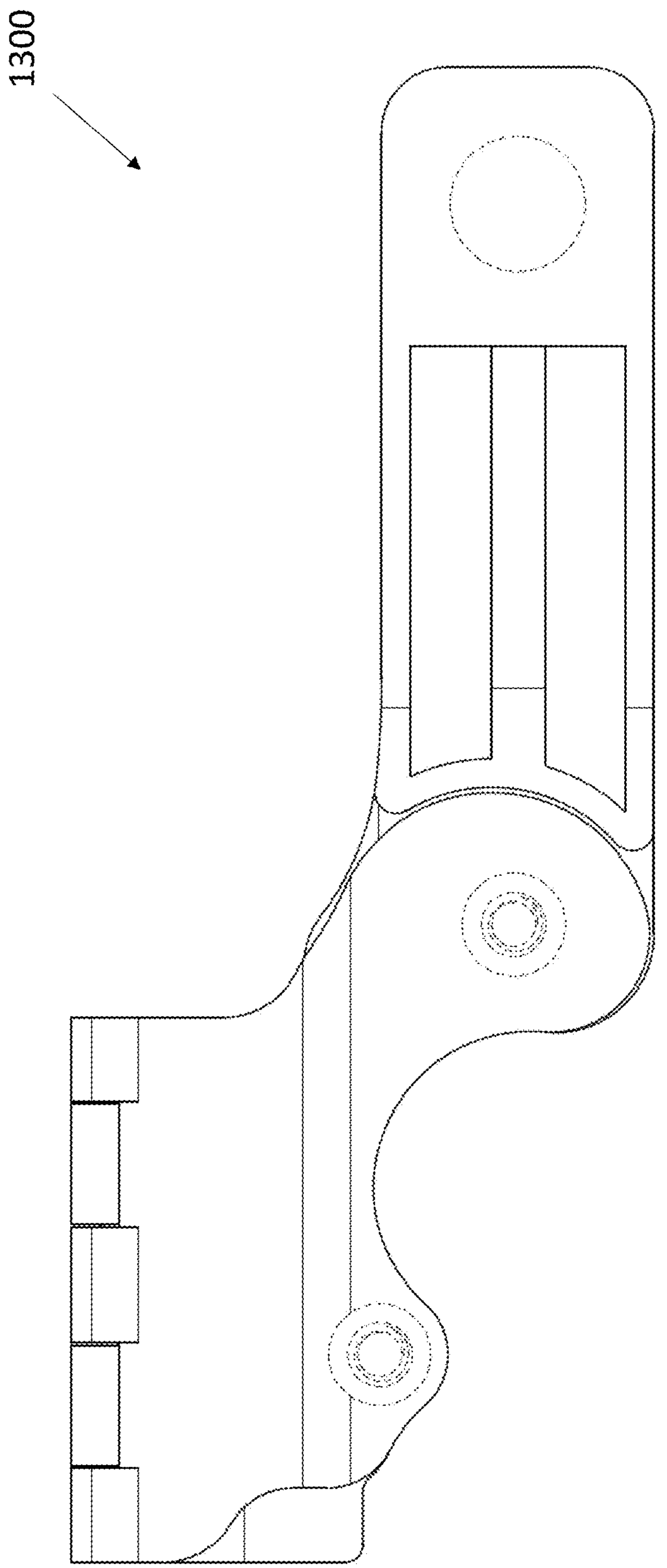
FIG. 19 is an illustration of a rear view of a musical instrument mounting device in accordance with certain embodiments of the present disclosure.
Figure 20:
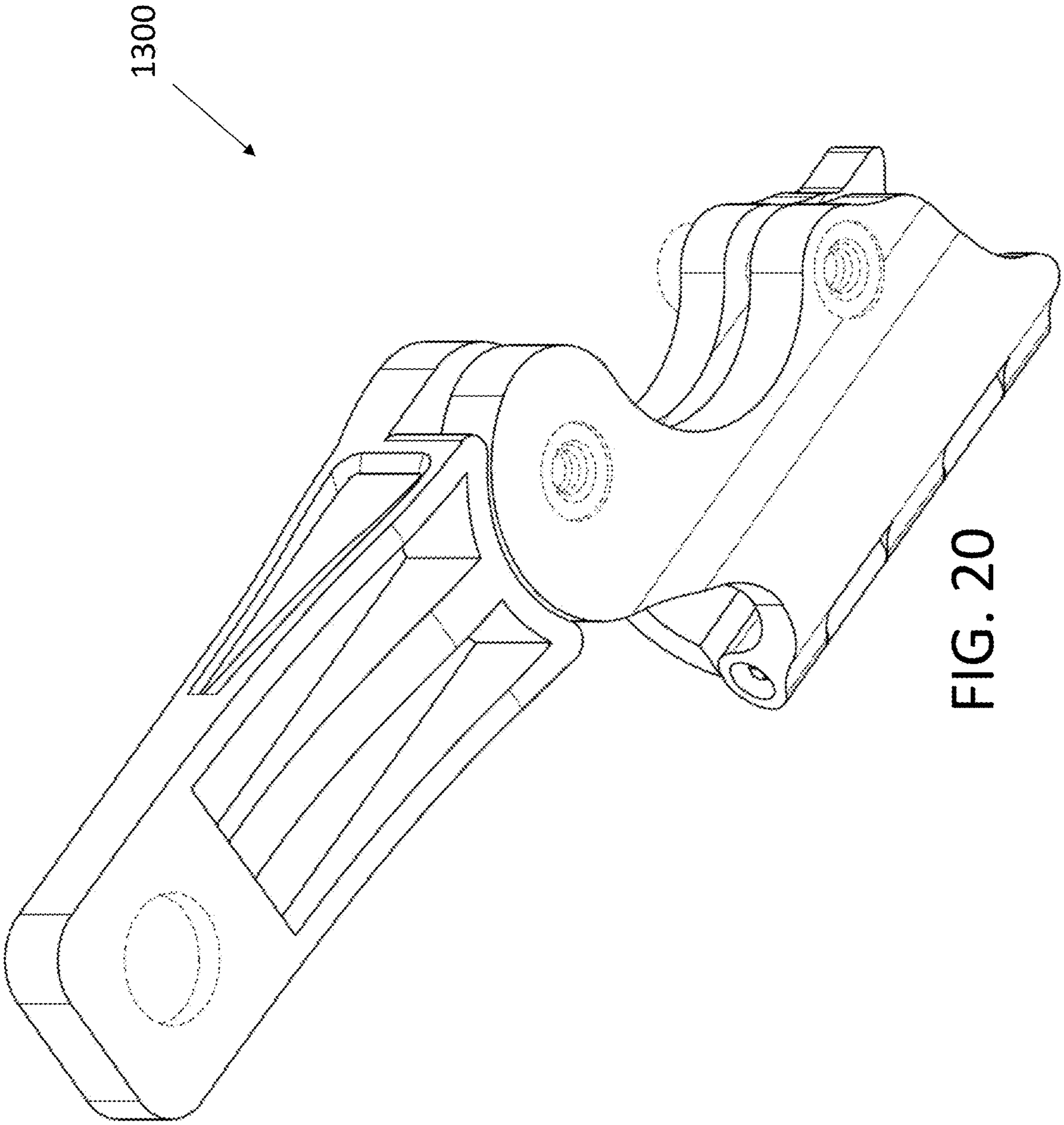
FIG. 20 is an illustration of a bottom perspective view of a musical instrument mounting device in accordance with certain embodiments of the present disclosure.
Figure 21:
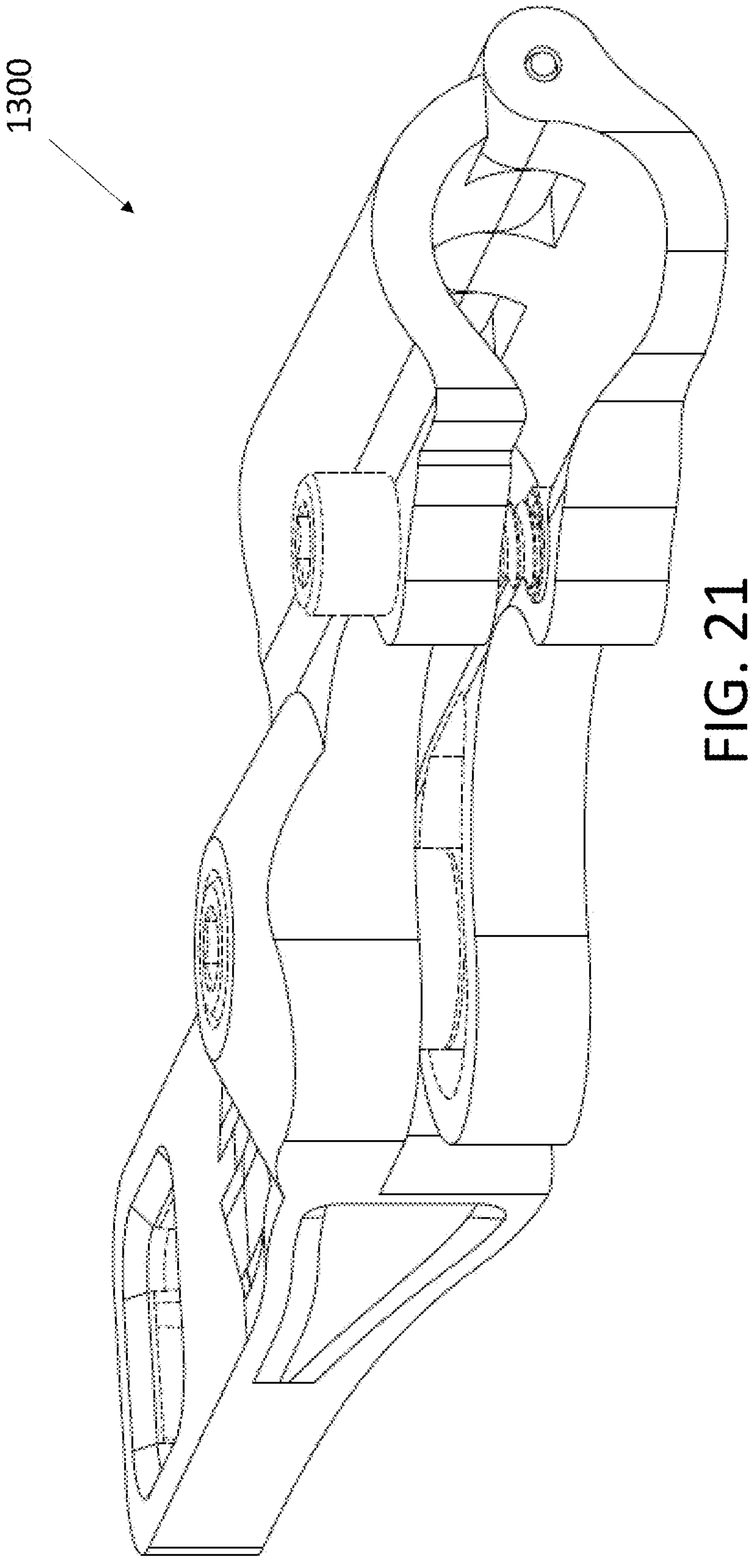
FIG. 21 is an illustration of an additional perspective view of a musical instrument mounting device in accordance with certain embodiments of the present disclosure.
Figure 22:
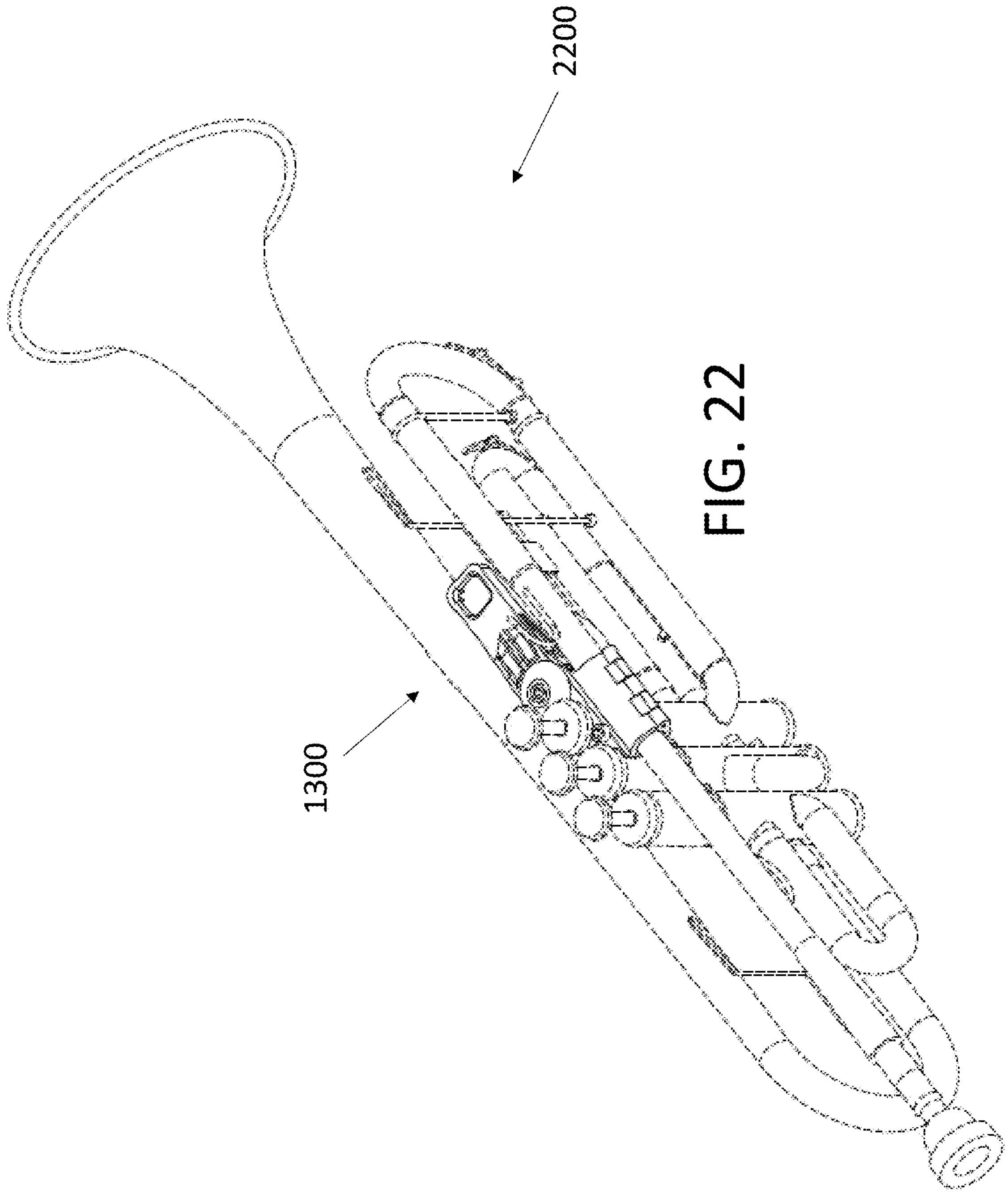
FIG. 22 is an illustration of a perspective view of a musical instrument mounting device mounted to a musical instrument in accordance with certain embodiments of the present disclosure.

FIG. 13 is an illustration of a perspective view of a musical instrument mounting device 1300 in accordance with certain embodiments of the present disclosure. FIG. 14 is an illustration of a side view of musical instrument mounting device 1300 in accordance with certain embodiments of the present disclosure. FIG. 15 is an illustration of an additional side view of musical instrument mounting device 1300 in accordance with certain embodiments of the present disclosure. FIG. 16 is an illustration of a top view of musical instrument mounting device 1300 in accordance with certain embodiments of the present disclosure. FIG. 17 is an illustration of a bottom view of musical instrument mounting device 1300 in accordance with certain embodiments of the present disclosure. FIG. 18 is an illustration of a front view of musical instrument mounting device 1300 in accordance with certain embodiments of the present disclosure. FIG. 19 is an illustration of a rear view of musical instrument mounting device 1300 in accordance with certain embodiments of the present disclosure. FIG. 20 is an illustration of a bottom perspective view of musical instrument mounting device 1300 in accordance with certain embodiments of the present disclosure. FIG. 21 is an illustration of an additional perspective view of musical instrument mounting device 1300 in accordance with certain embodiments of the present disclosure. FIG. 22 is an illustration of a perspective view of musical instrument mounting device 1300 mounted to a musical instrument 2200 in accordance with certain embodiments of the present disclosure. As shown, musical instrument mounting device 1300 may be similar in structure and characteristics as musical instrument mounting device 155 (see FIGS. 1D and 1E). It is further noted that some portions of musical instrument mounting device 1300 found in FIGS. 13-22 are for illustrative purposes only and form no part of any claimed design claimed herein or thereafter.

Figure 23:
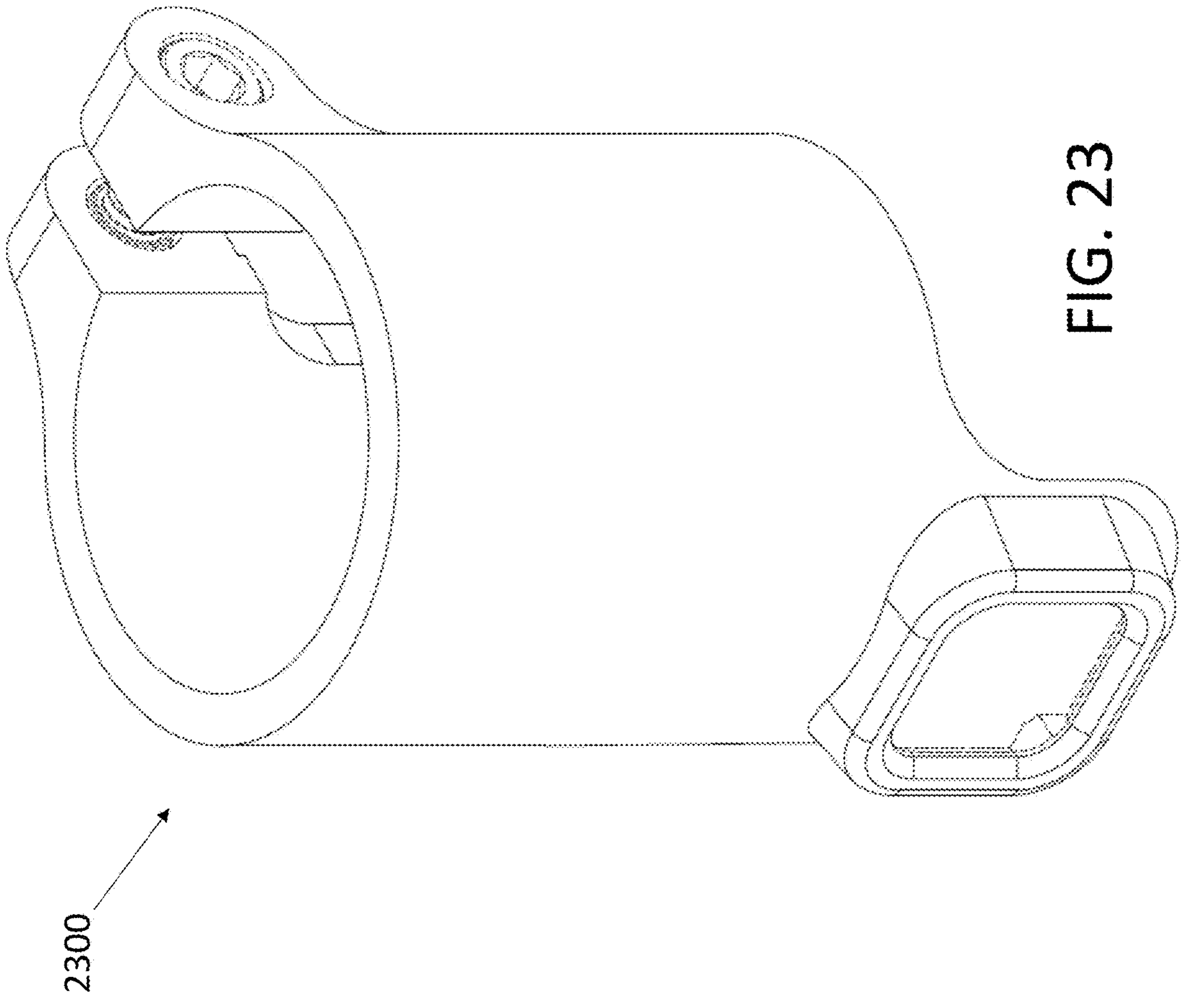
FIG. 23 is an illustration of a perspective view of a musical instrument mounting device in accordance with certain embodiments of the present disclosure.
Figure 24:
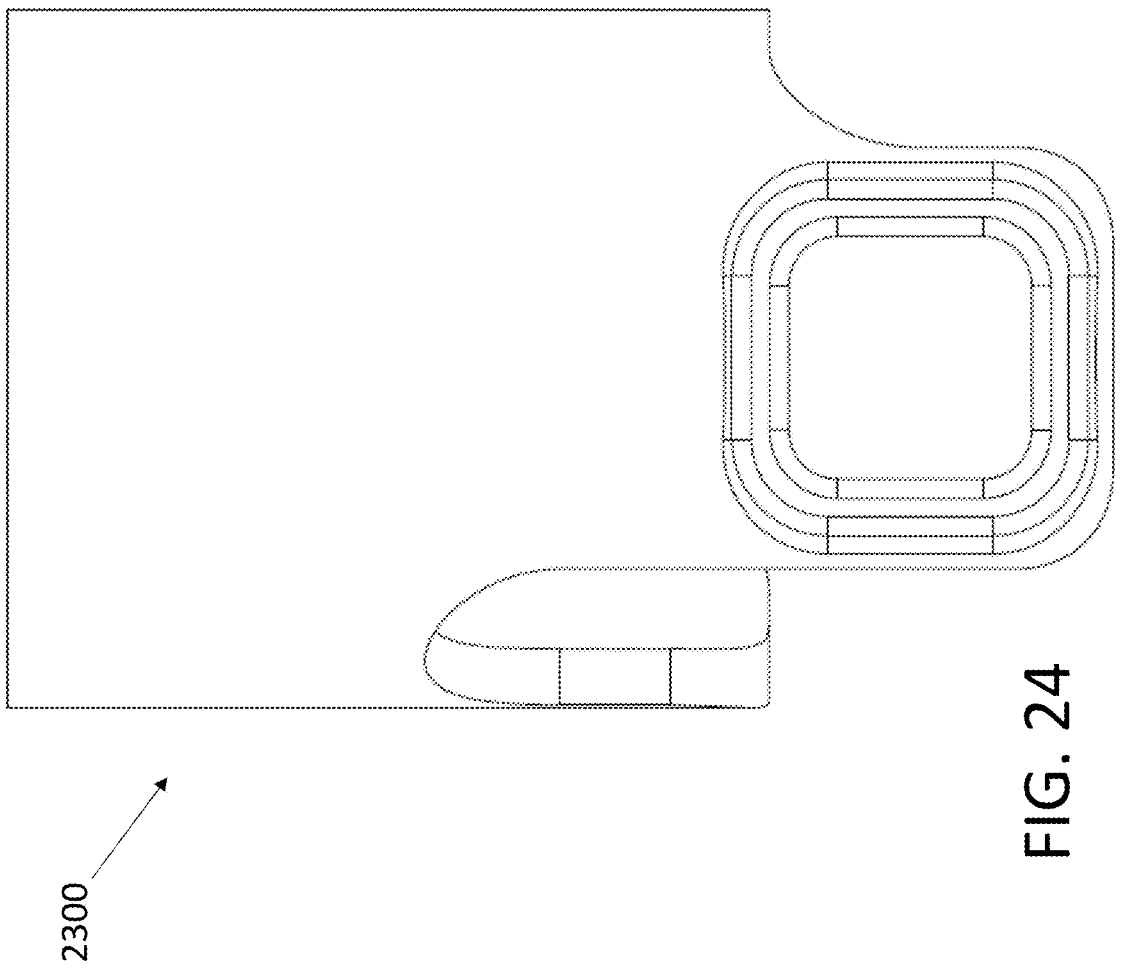
FIG. 24 is an illustration of a front view of a musical instrument mounting device in accordance with certain embodiments of the present disclosure.
Figure 25:
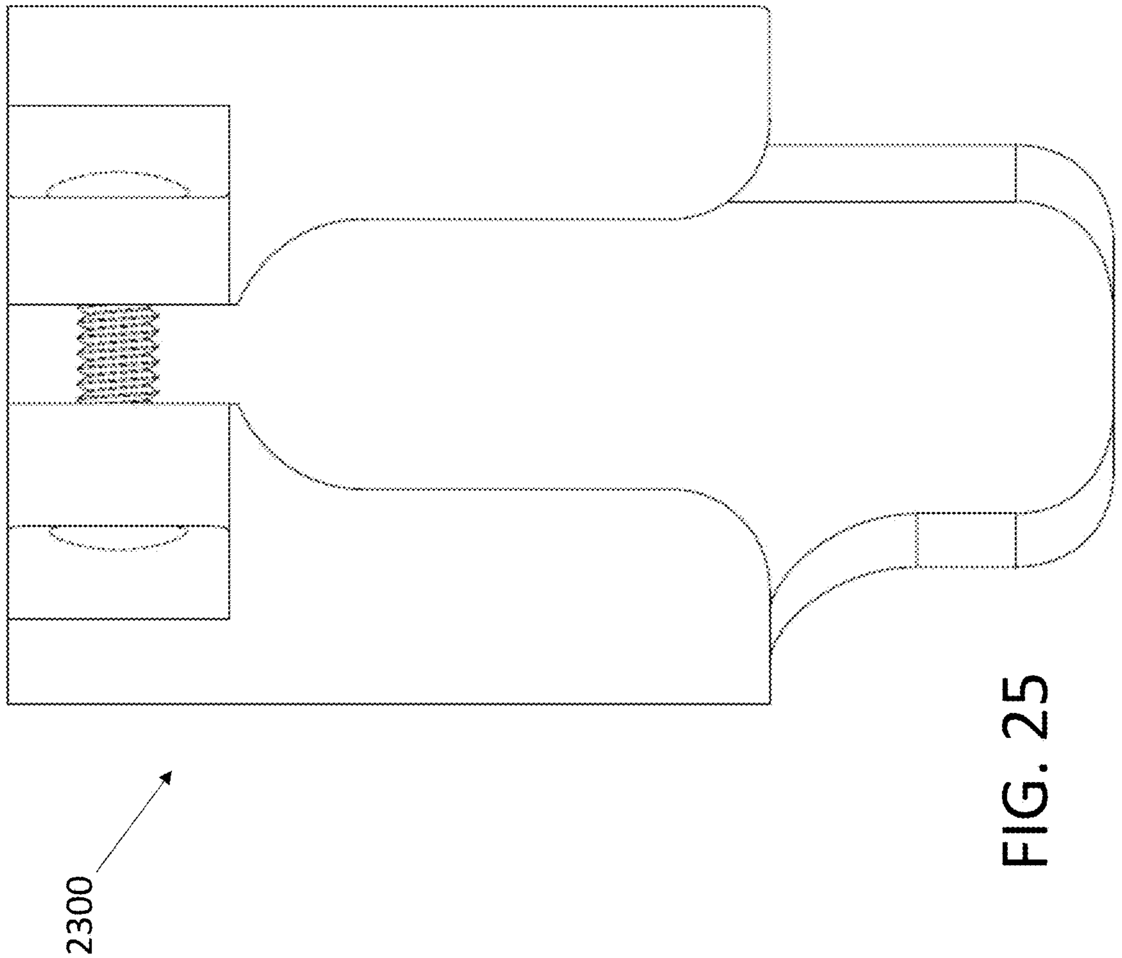
FIG. 25 is an illustration of a rear view of a musical instrument mounting device in accordance with certain embodiments of the present disclosure.
Figure 26:
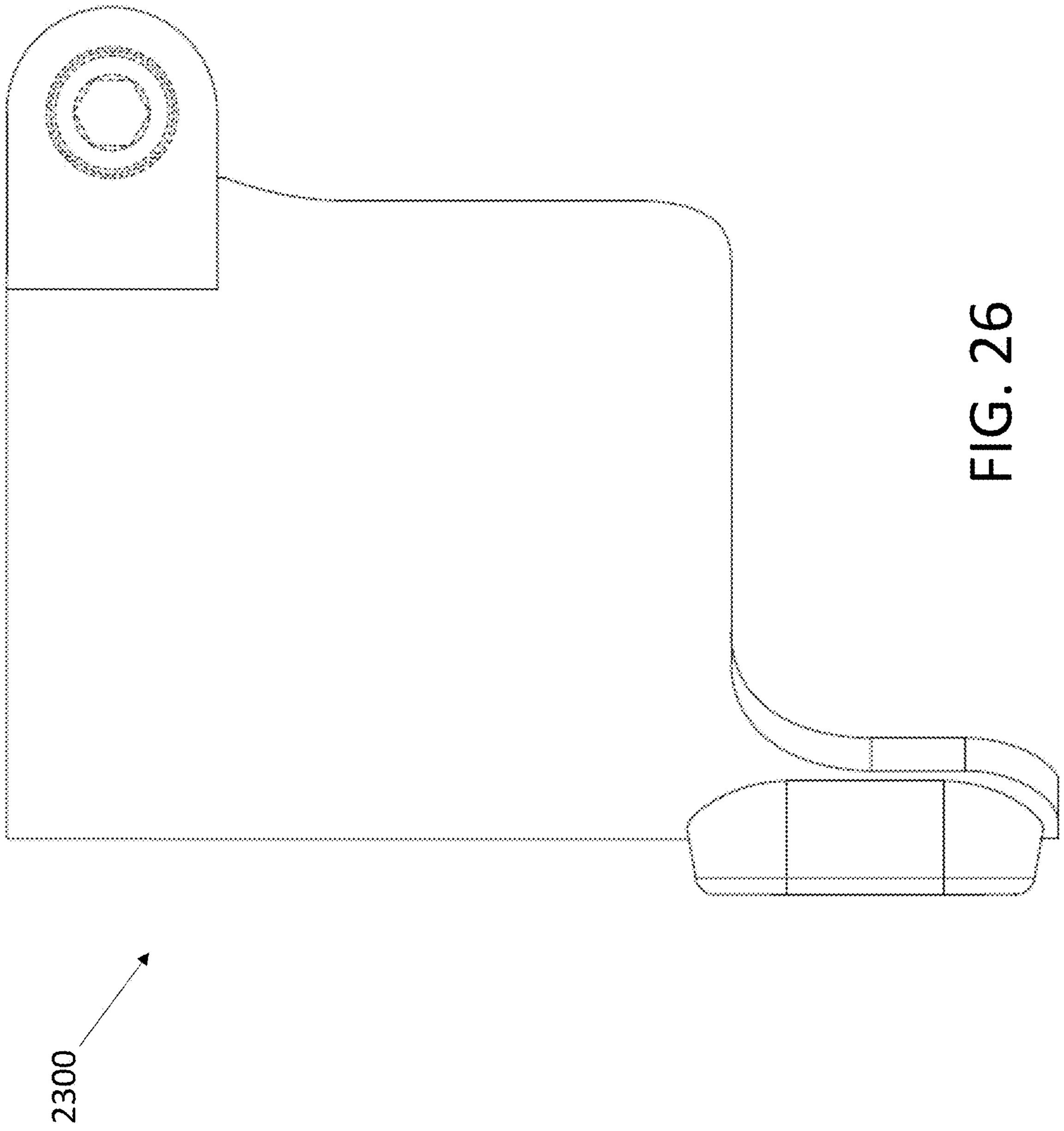
FIG. 26 is an illustration of a side view of a musical instrument mounting device in accordance with certain embodiments of the present disclosure.
Figure 27:
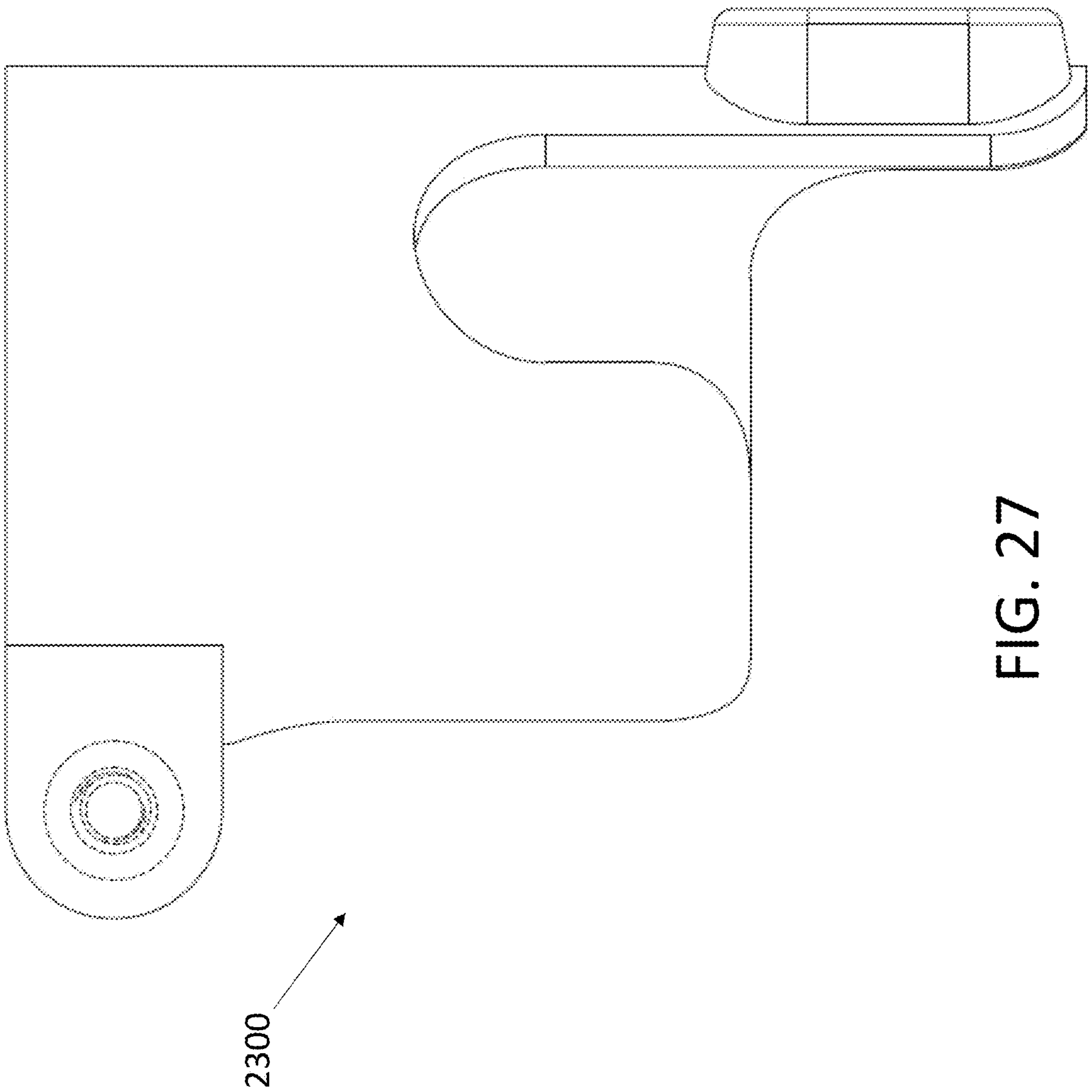
FIG. 27 is an illustration of an additional side view of a musical instrument mounting device in accordance with certain embodiments of the present disclosure.
Figure 28:
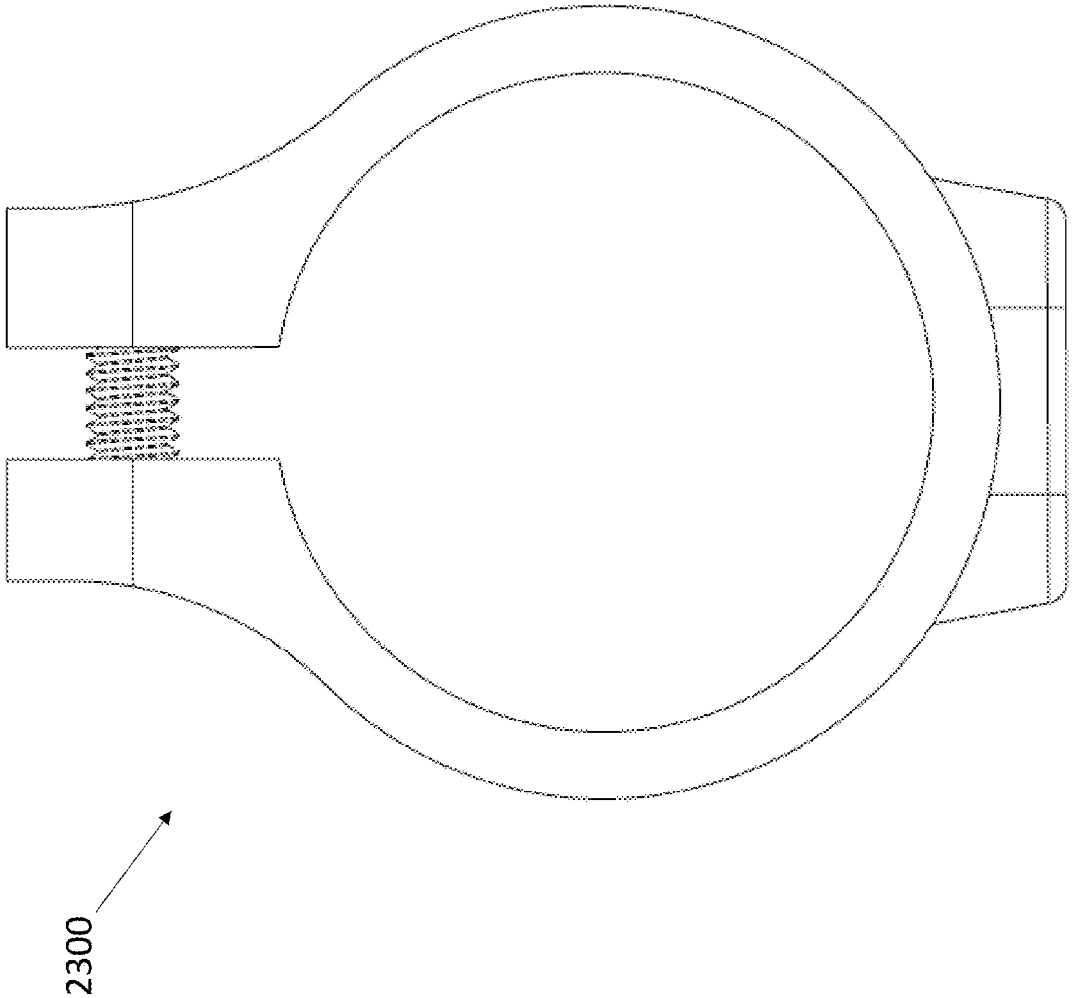
FIG. 28 is an illustration of a top view of a musical instrument mounting device in accordance with certain embodiments of the present disclosure.
Figure 29:
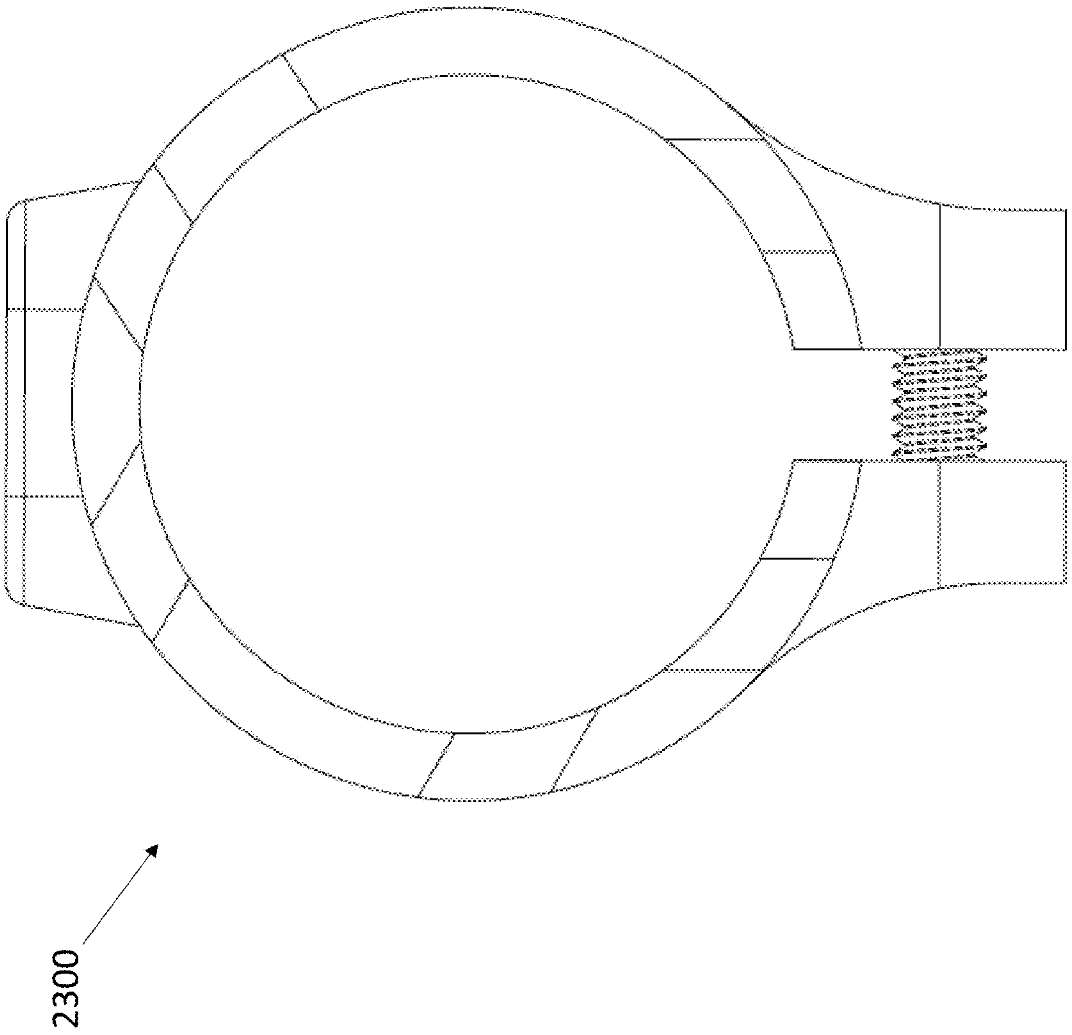
FIG. 29 is an illustration of a bottom view of a musical instrument mounting device in accordance with certain embodiments of the present disclosure.
Figure 30:
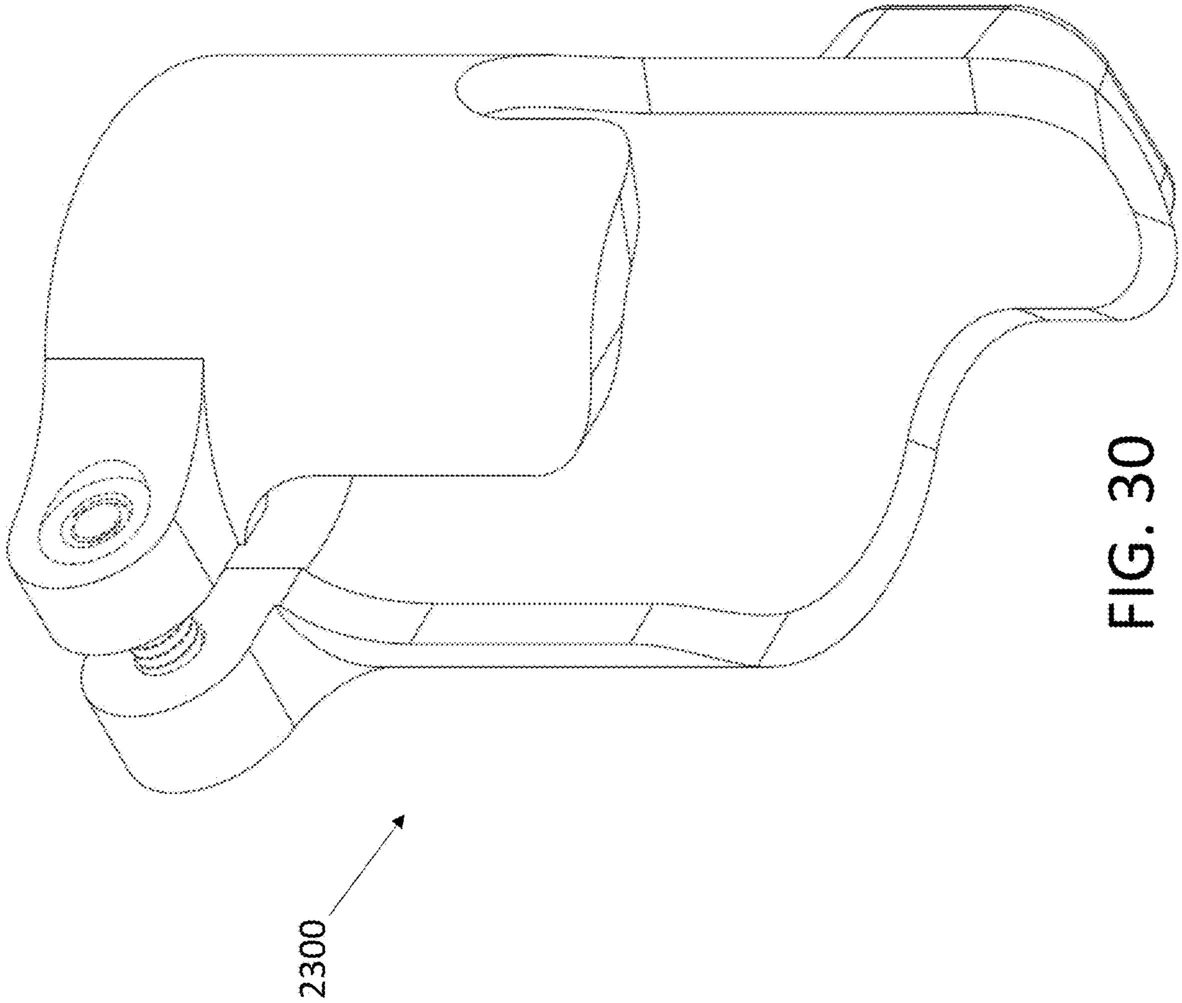
FIG. 30 is an illustration of a bottom perspective view of a musical instrument mounting device in accordance with certain embodiments of the present disclosure.
Figure 31:
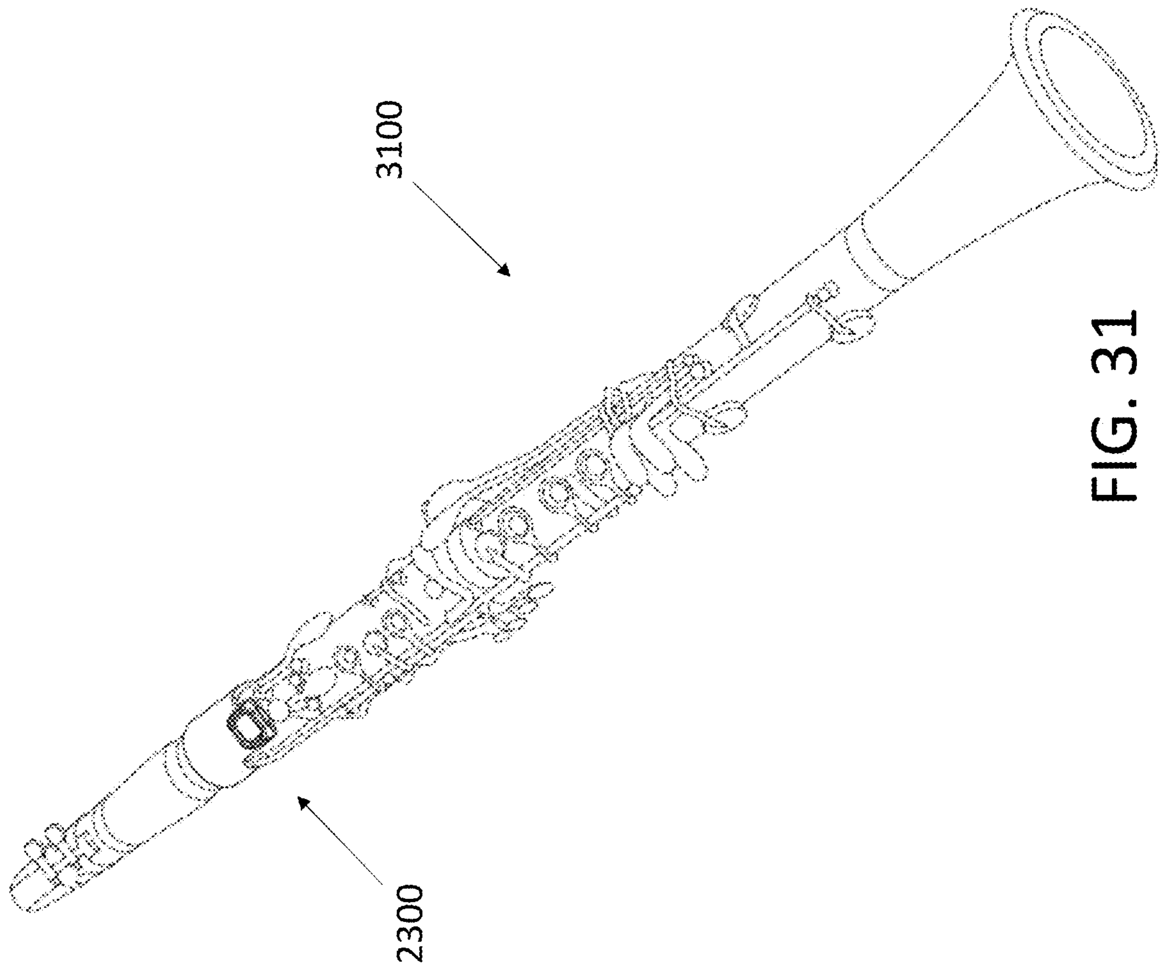
FIG. 31 is an illustration of a perspective view of a musical instrument mounting device mounted to a musical instrument in accordance with certain embodiments of the present disclosure.

FIG. 23 is an illustration of a perspective view of a musical instrument mounting device 2300 in accordance with certain embodiments of the present disclosure. FIG. 24 is an illustration of a front view of musical instrument mounting device 2300 in accordance with certain embodiments of the present disclosure. FIG. 25 is an illustration of a rear view of musical instrument mounting device 2300 in accordance with certain embodiments of the present disclosure. FIG. 26 is an illustration of a side view of musical instrument mounting device 2300 in accordance with certain embodiments of the present disclosure. FIG. 27 is an illustration of an additional side view of musical instrument mounting device 2300 in accordance with certain embodiments of the present disclosure. FIG. 28 is an illustration of a top view of musical instrument mounting device 2300 in accordance with certain embodiments of the present disclosure. FIG. 29 is an illustration of a bottom view of musical instrument mounting device 2300 in accordance with certain embodiments of the present disclosure. FIG. 30 is an illustration of a bottom perspective view of musical instrument mounting device 2300 in accordance with certain embodiments of the present disclosure. FIG. 31 is an illustration of a perspective view of musical instrument mounting device 2300 mounted to a musical instrument 3100 in accordance with certain embodiments of the present disclosure. As shown, musical instrument mounting device 2300 may be similar in structure and characteristics as musical instrument mounting device 155 (see FIGS. 2C-2F). It is further noted that some portions of musical instrument mounting device 2300 found in FIGS. 23-31 are for illustrative purposes only and form no part of any claimed design claimed herein or thereafter.

Figure 32:
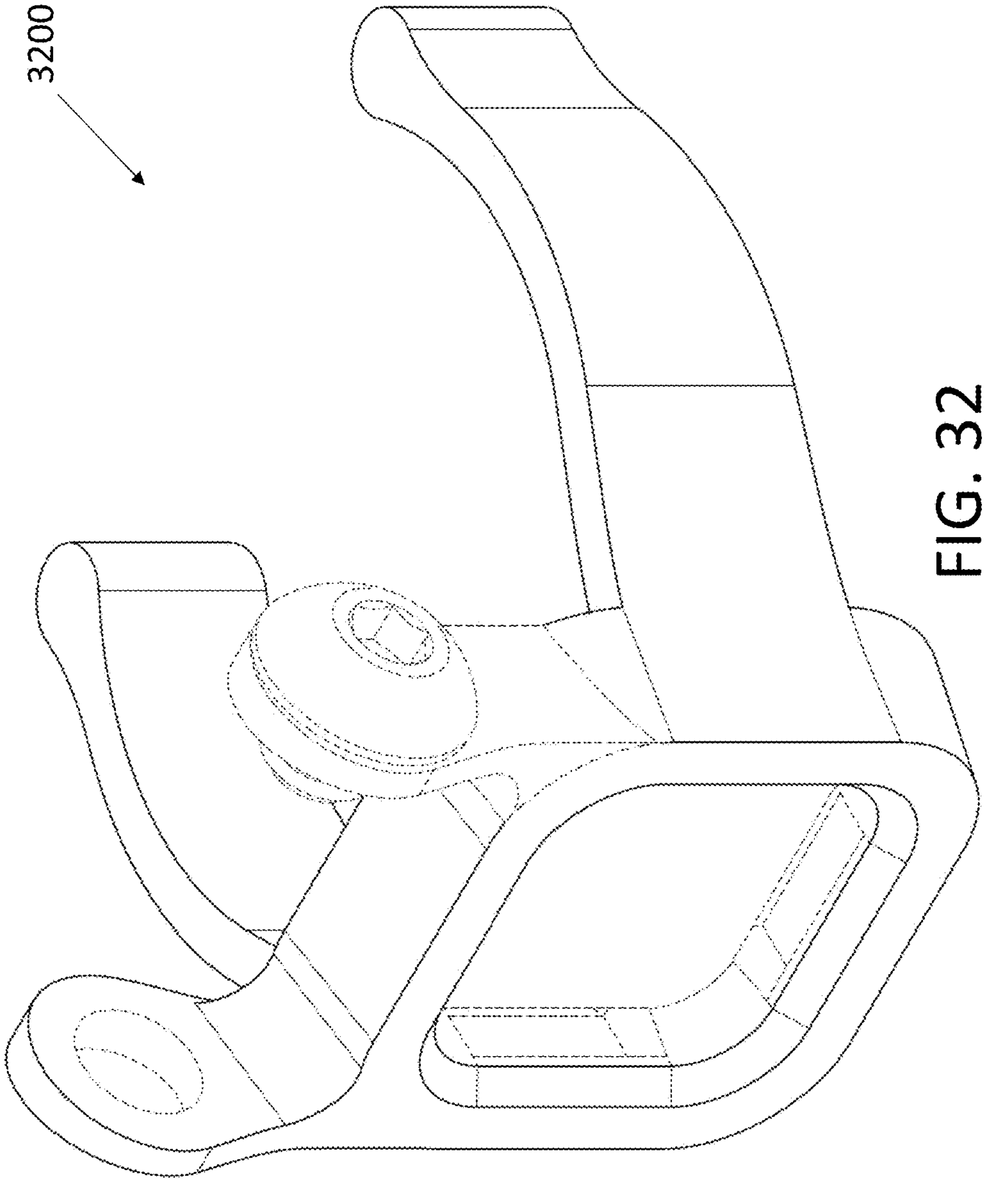
FIG. 32 is an illustration of a perspective view of a musical instrument mounting device in accordance with certain embodiments of the present disclosure.
Figure 33:
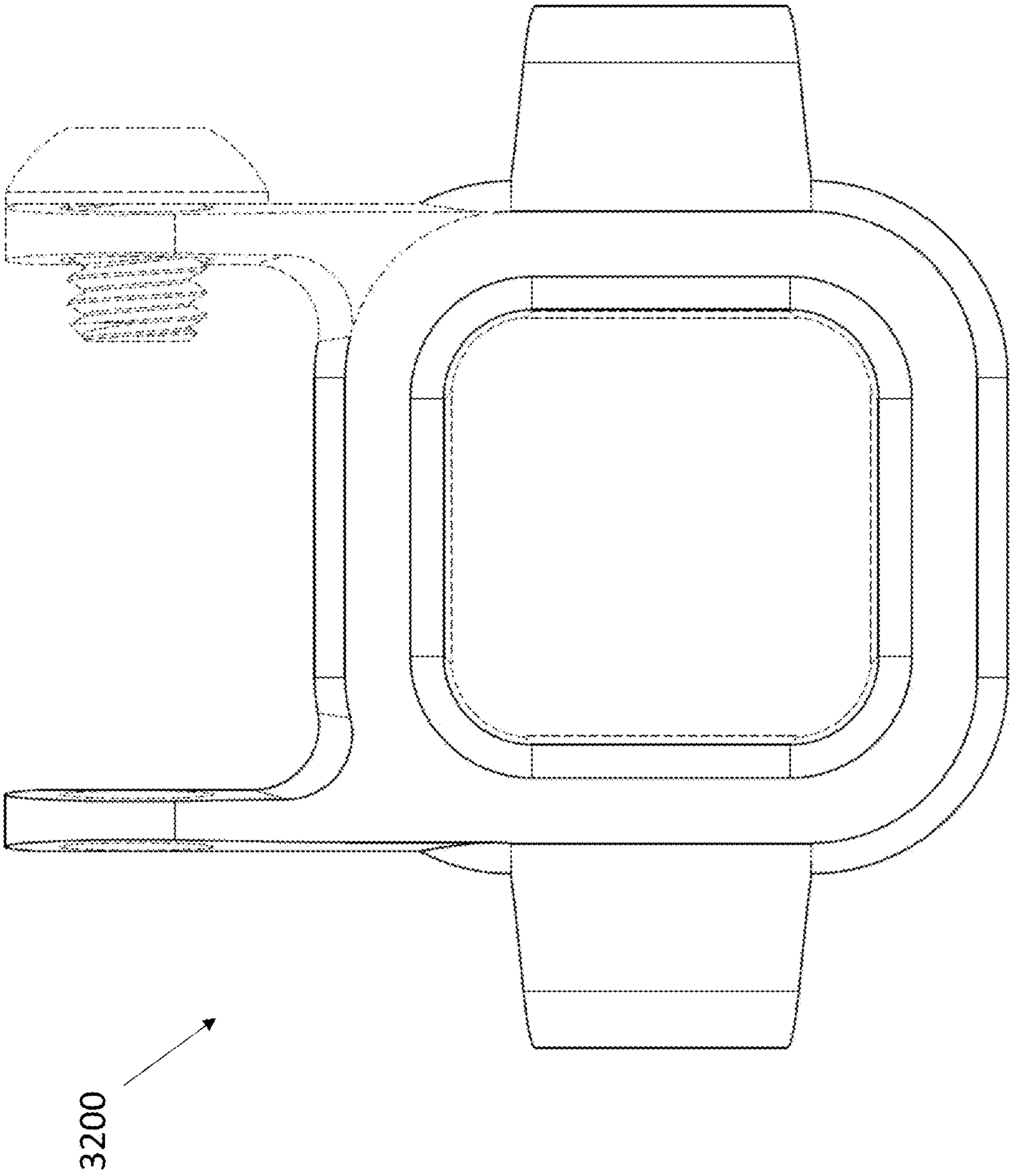
FIG. 33 is an illustration of a front view of a musical instrument mounting device in accordance with certain embodiments of the present disclosure.
Figure 34:
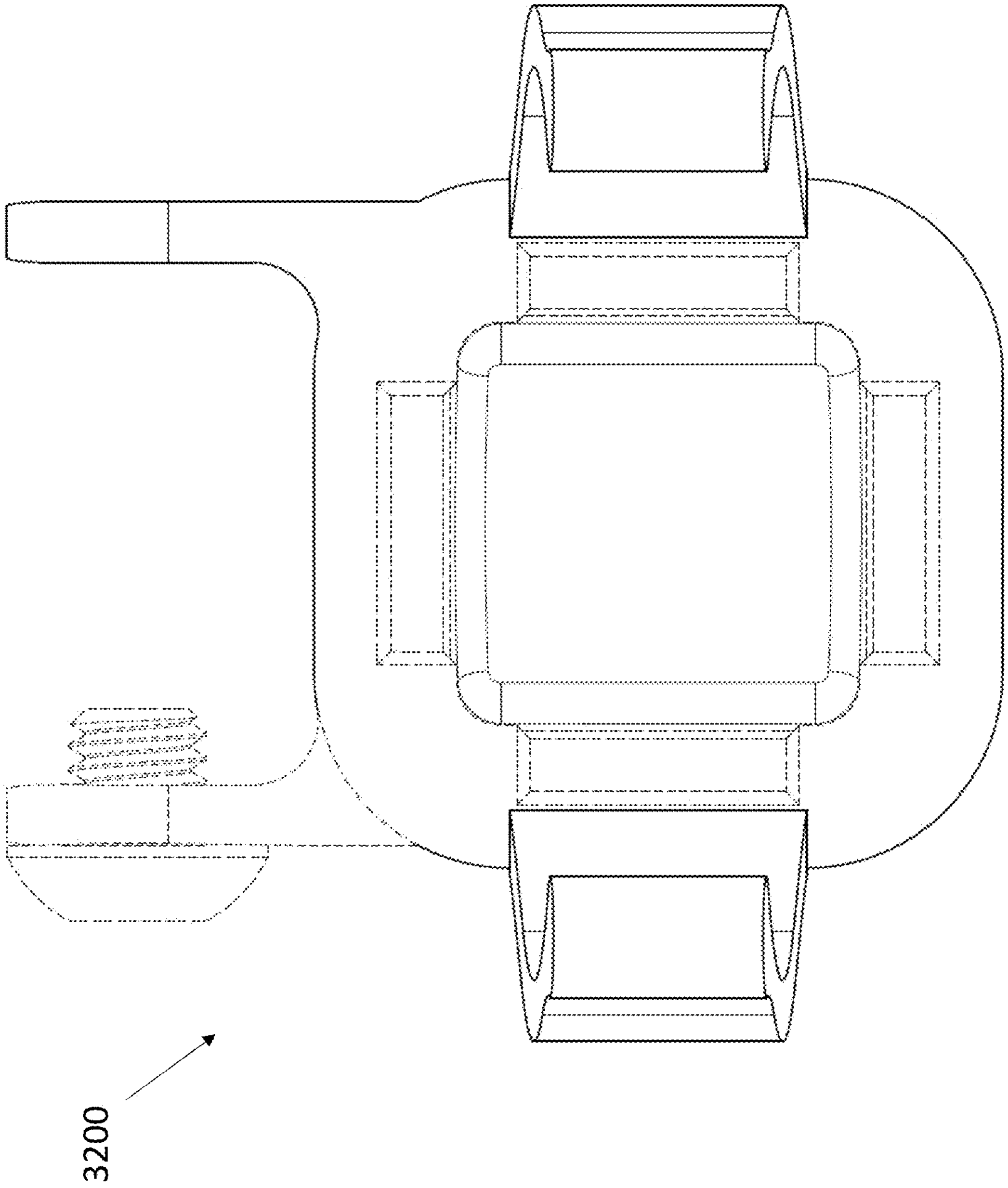
FIG. 34 is an illustration of a rear view of a musical instrument mounting device in accordance with certain embodiments of the present disclosure.
Figure 35:
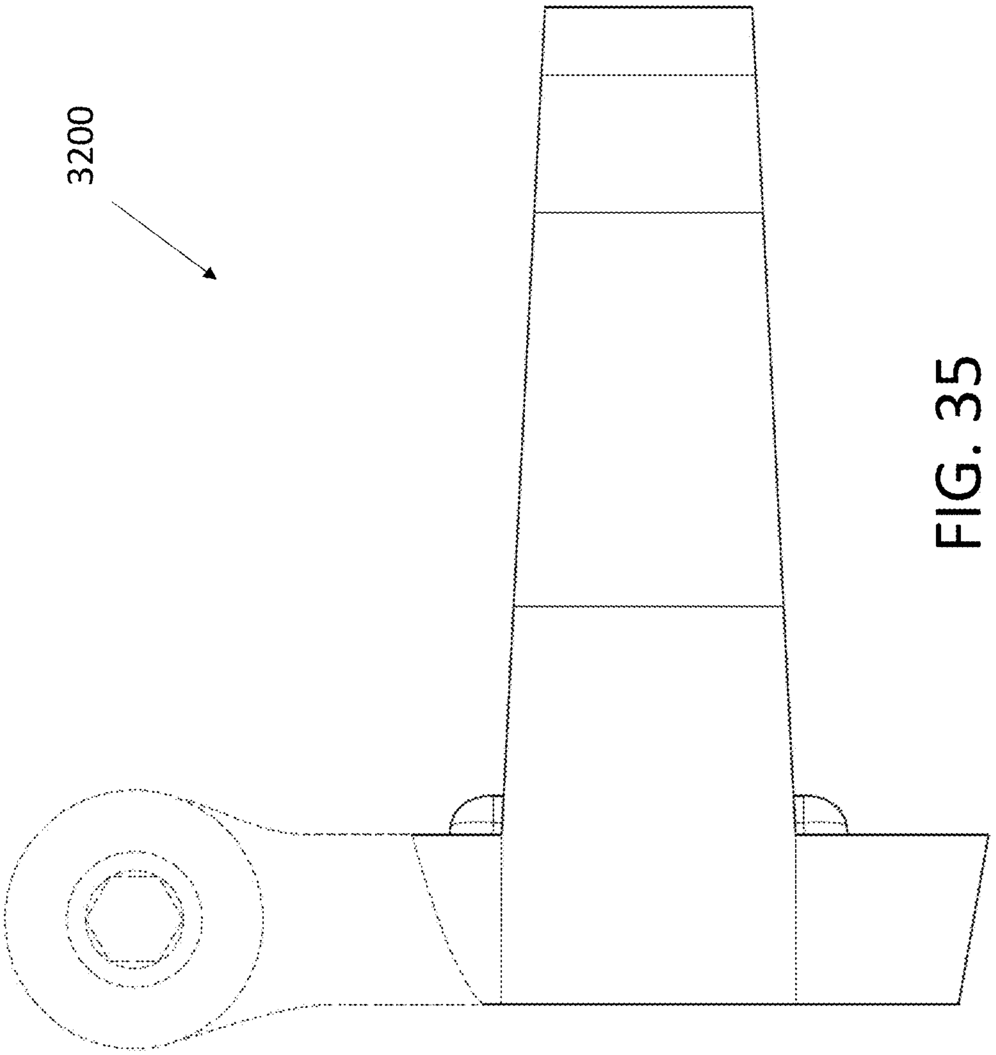
FIG. 35 is an illustration of a side view of a musical instrument mounting device in accordance with certain embodiments of the present disclosure.
Figure 36:
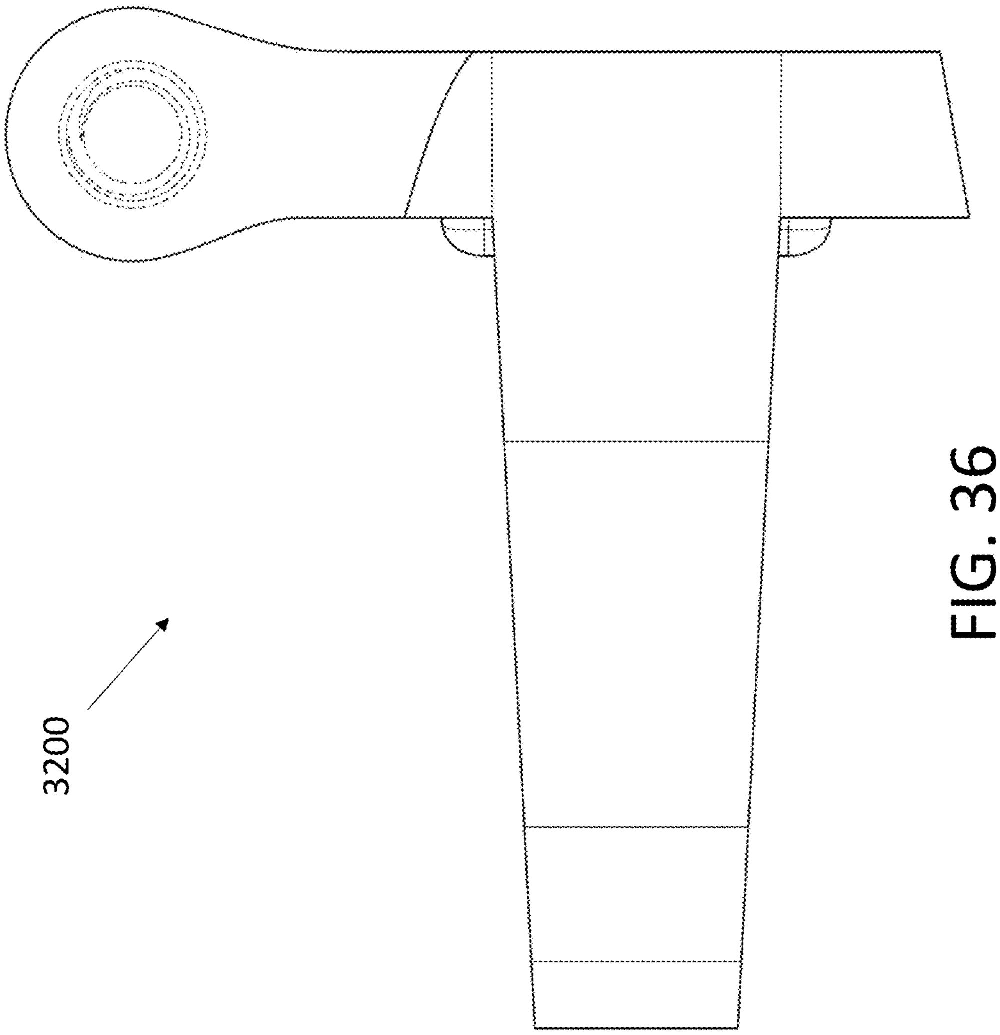
FIG. 36 is an illustration of an additional side view of a musical instrument mounting device in accordance with certain embodiments of the present disclosure.
Figure 37:
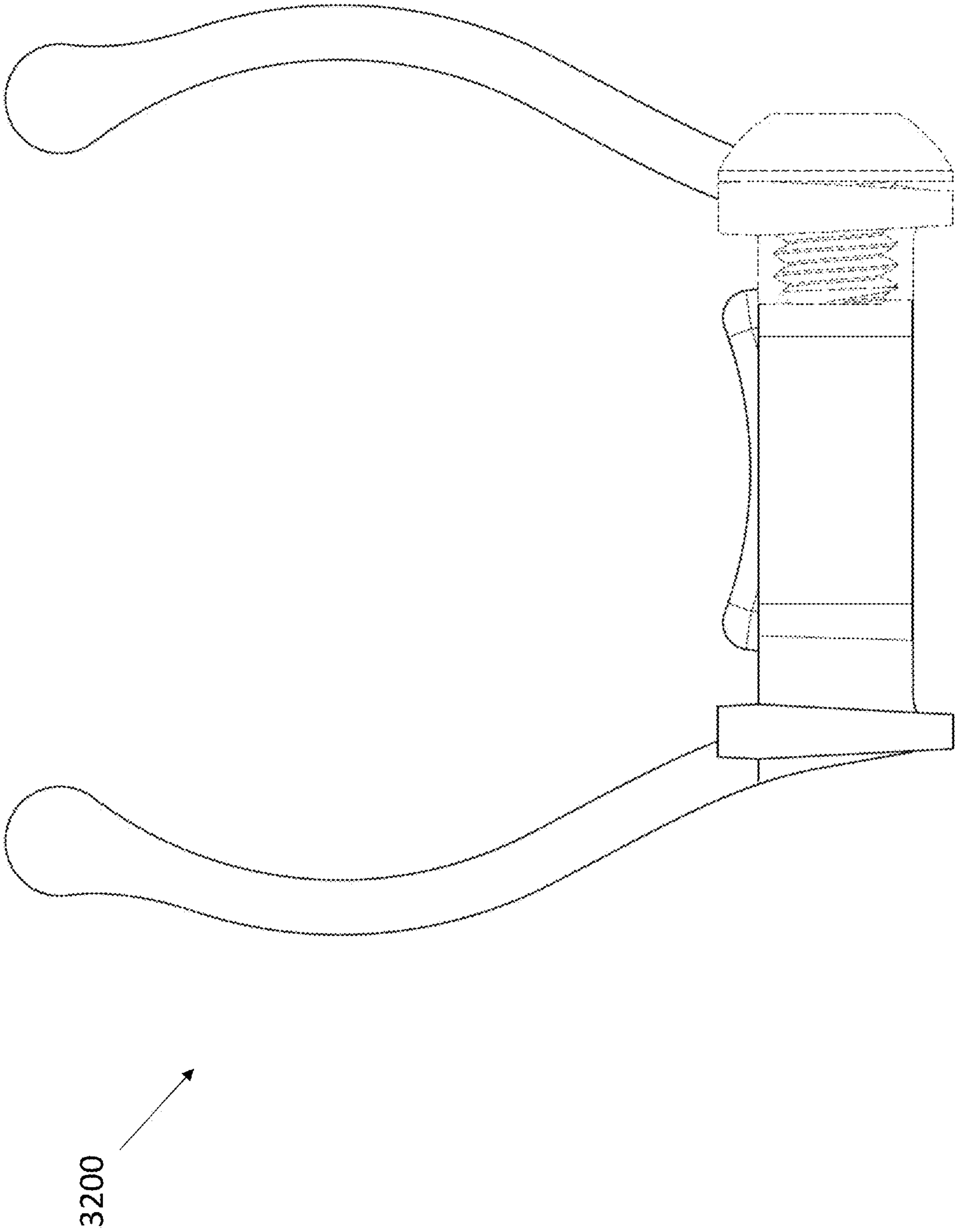
FIG. 37 is an illustration of a top view of a musical instrument mounting device in accordance with certain embodiments of the present disclosure.
Figure 38:
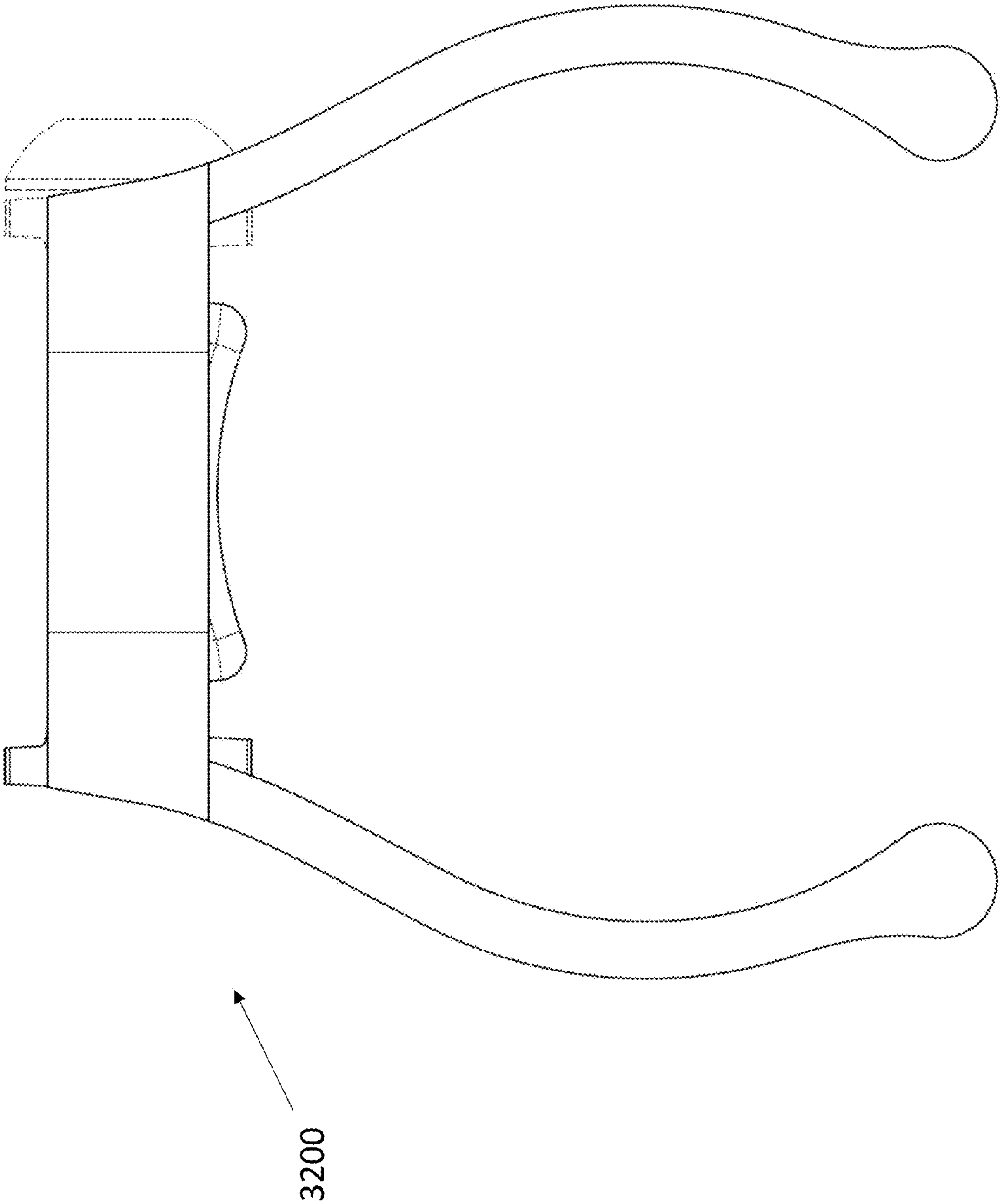
FIG. 38 is an illustration of a bottom view of a musical instrument mounting device in accordance with certain embodiments of the present disclosure.
Figure 39:
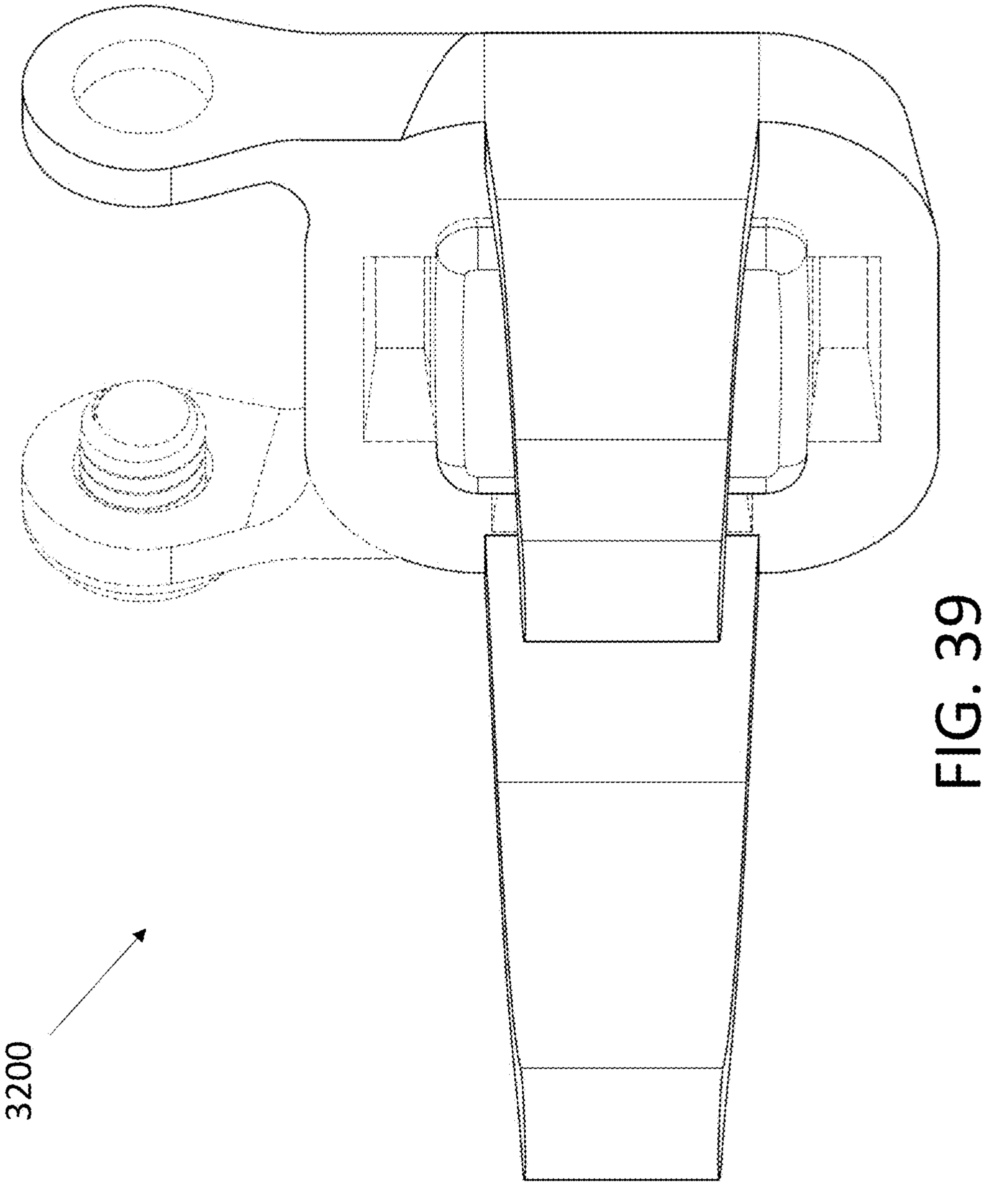
FIG. 39 is an illustration of a back perspective view of a musical instrument mounting device in accordance with certain embodiments of the present disclosure.
Figure 40:
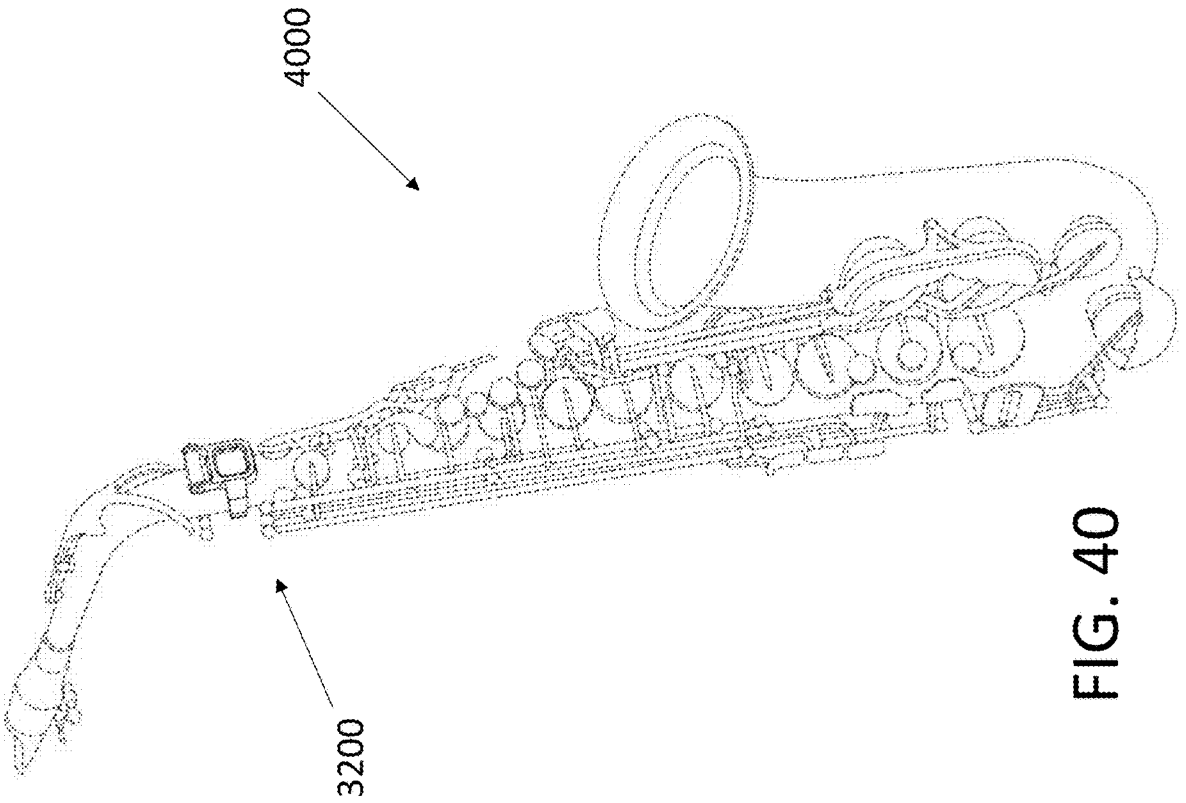
FIG. 40 is an illustration of a perspective view of a musical instrument mounting device mounted to a musical instrument in accordance with certain embodiments of the present disclosure.

FIG. 32 is an illustration of a perspective view of a musical instrument mounting device 3200 in accordance with certain embodiments of the present disclosure. FIG. 33 is an illustration of a front view of musical instrument mounting device 3200 in accordance with certain embodiments of the present disclosure. FIG. 34 is an illustration of a rear view of musical instrument mounting device 3200 in accordance with certain embodiments of the present disclosure. FIG. 35 is an illustration of a side view of musical instrument mounting device 3200 in accordance with certain embodiments of the present disclosure. FIG. 36 is an illustration of an additional side view of musical instrument mounting device 3200 in accordance with certain embodiments of the present disclosure. FIG. 37 is an illustration of a top view of musical instrument mounting device 3200 in accordance with certain embodiments of the present disclosure. FIG. 38 is an illustration of a bottom view of musical instrument mounting device 3200 in accordance with certain embodiments of the present disclosure. FIG. 39 is an illustration of a back perspective view of musical instrument mounting device 3200 in accordance with certain embodiments of the present disclosure. FIG. 40 is an illustration of a perspective view of musical instrument mounting device 3200 mounted to a musical instrument 4000 in accordance with certain embodiments of the present disclosure. As shown, musical instrument mounting device 3200 may be similar in structure and characteristics as musical instrument mounting device 350 (see FIGS. 3C-3E). It is further noted that some portions of musical instrument mounting device 3200 found in FIGS. 32-40 are for illustrative purposes only and form no part of any claimed design claimed herein or thereafter.

Figure 41:
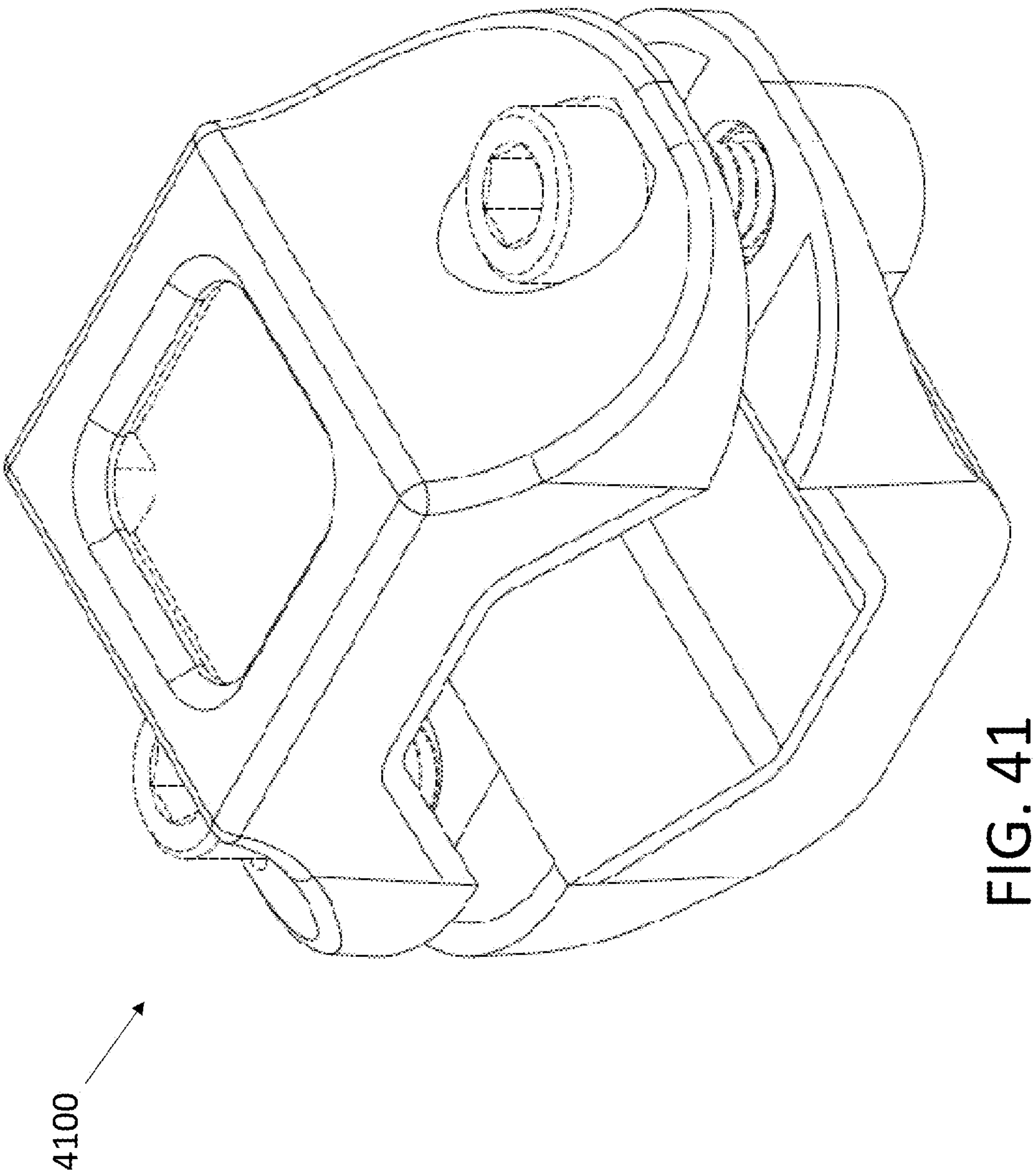
FIG. 41 is an illustration of a perspective view of a musical instrument mounting device in accordance with certain embodiments of the present disclosure.
Figure 42:
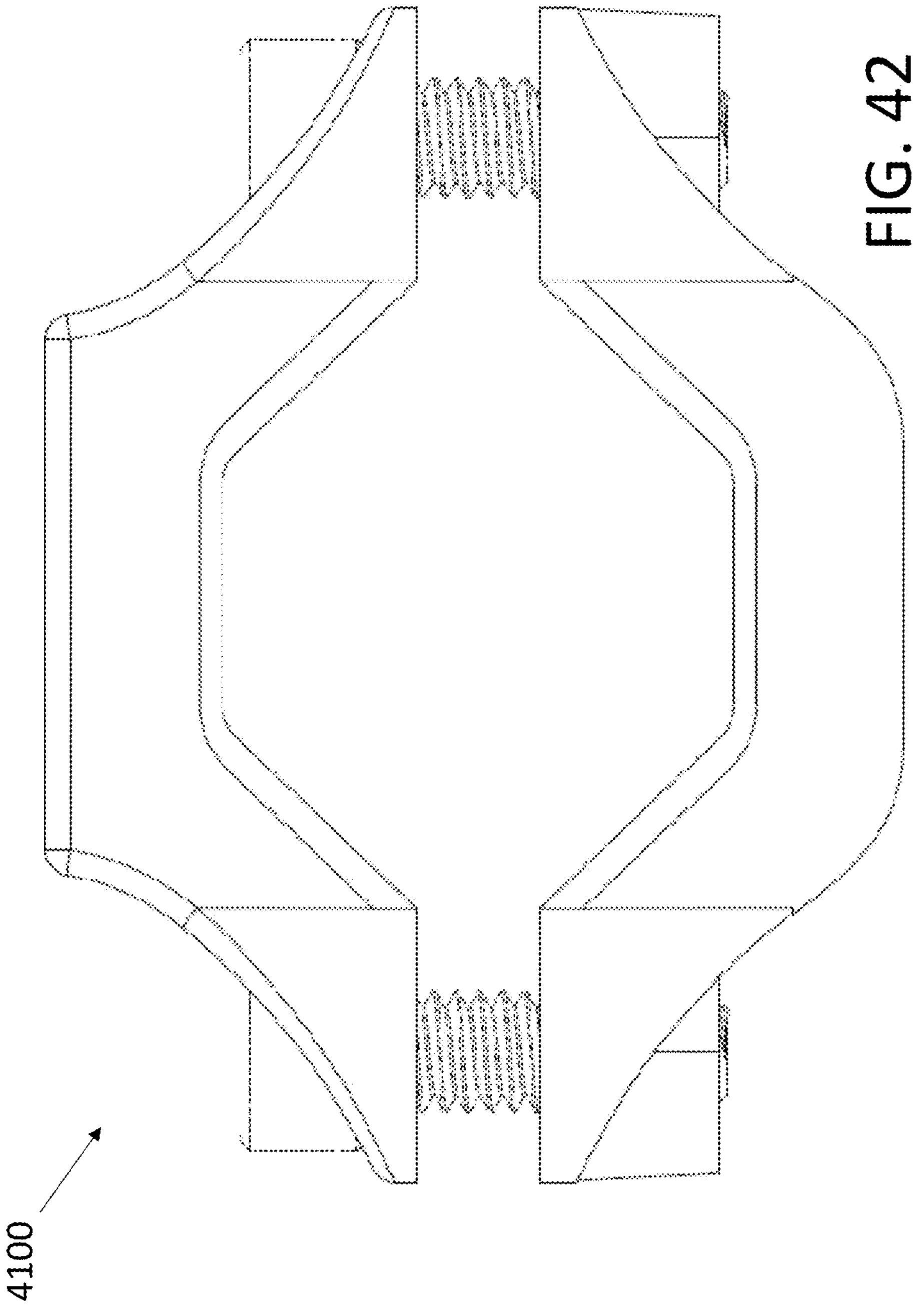
FIG. 42 is an illustration of a side view of a musical instrument mounting device in accordance with certain embodiments of the present disclosure.
Figure 43:
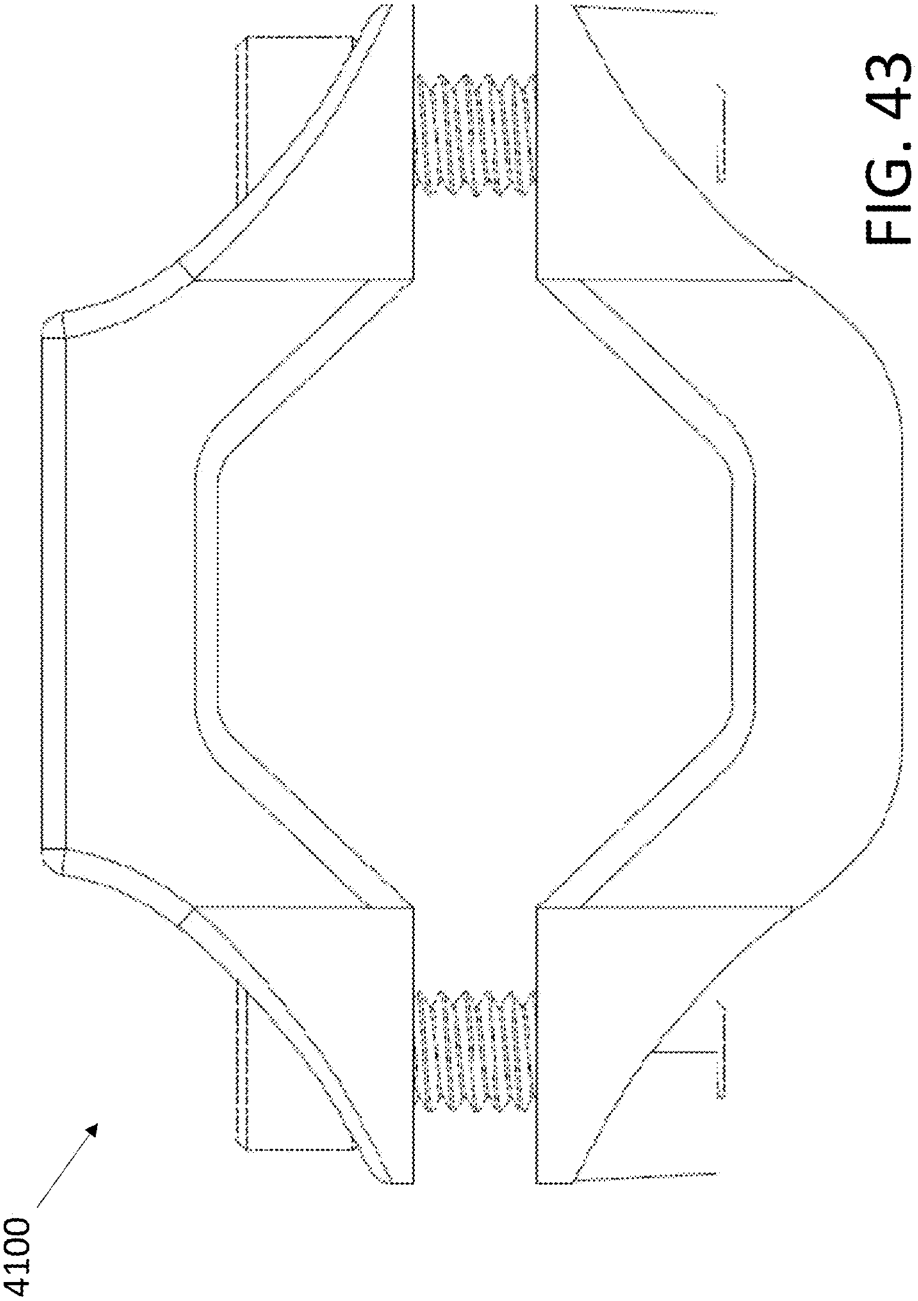
FIG. 43 is an illustration of an additional side view of a musical instrument mounting device in accordance with certain embodiments of the present disclosure.
Figure 44:
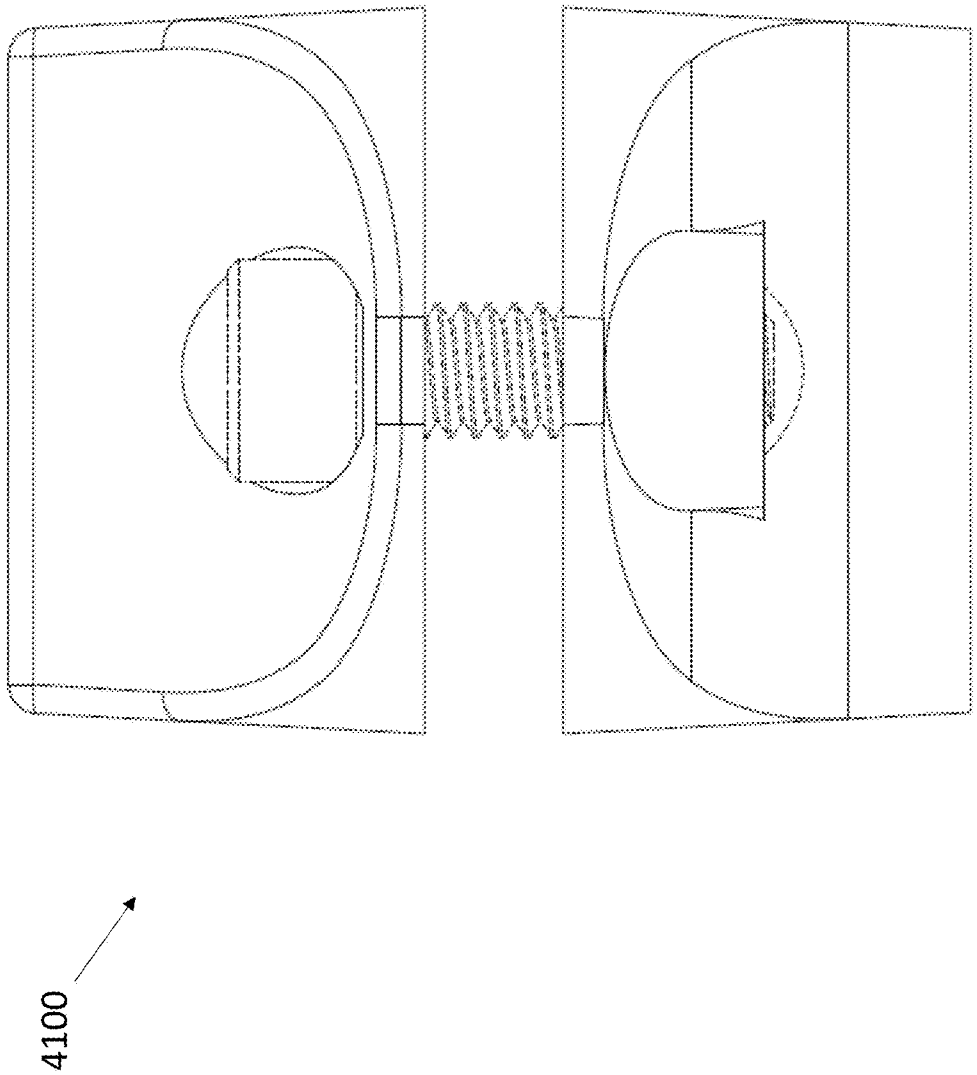
FIG. 44 is an illustration of an additional side view of a musical instrument mounting device in accordance with certain embodiments of the present disclosure.
Figure 45:
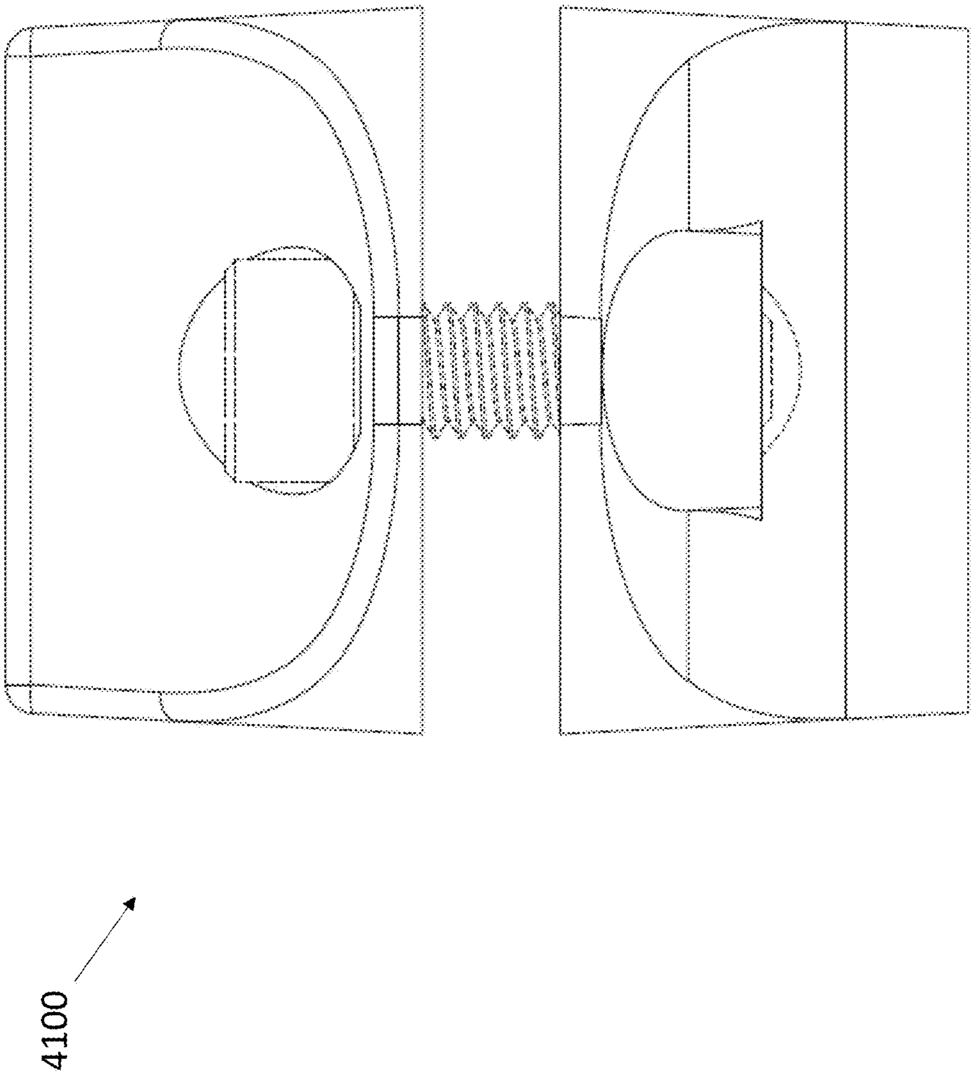
FIG. 45 is an illustration of an additional side view of a musical instrument mounting device in accordance with certain embodiments of the present disclosure.
Figure 46:
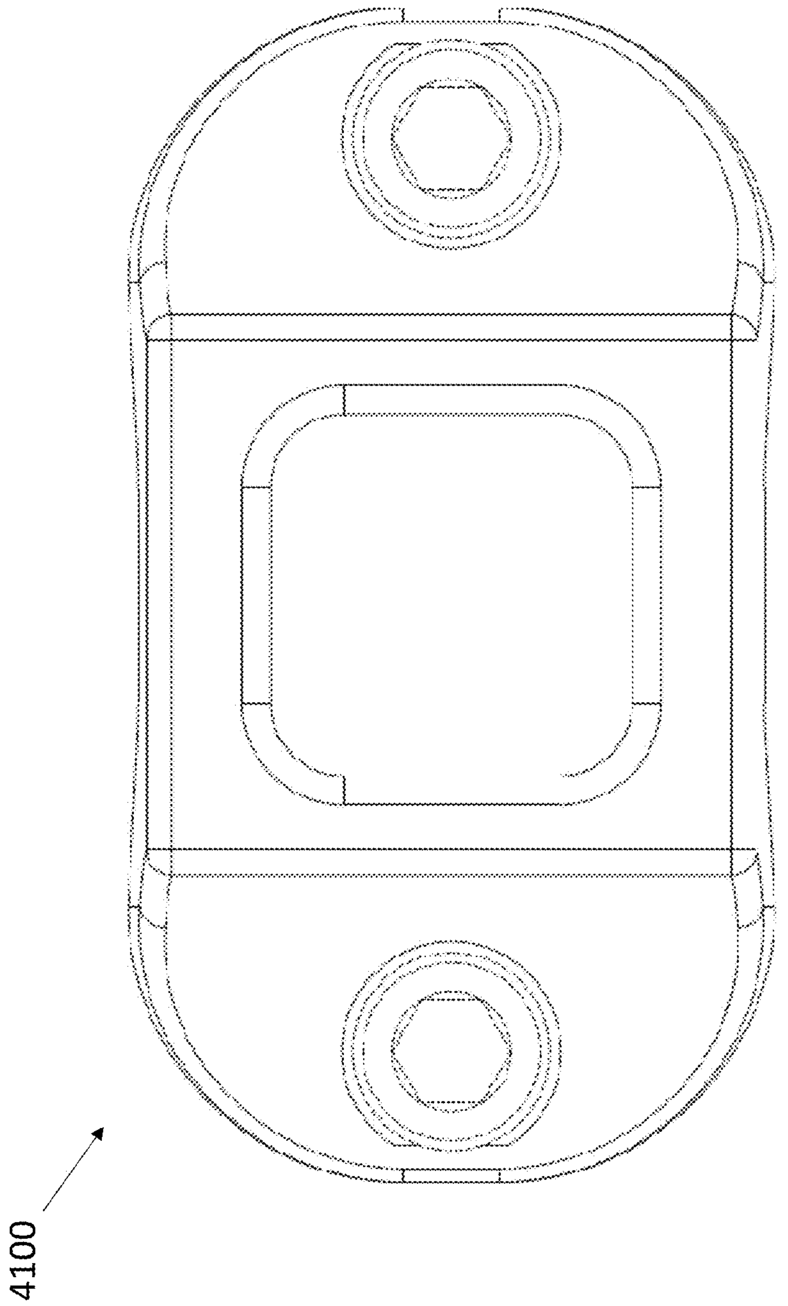
FIG. 46 is an illustration of a top view of a musical instrument mounting device in accordance with certain embodiments of the present disclosure.
Figure 47:
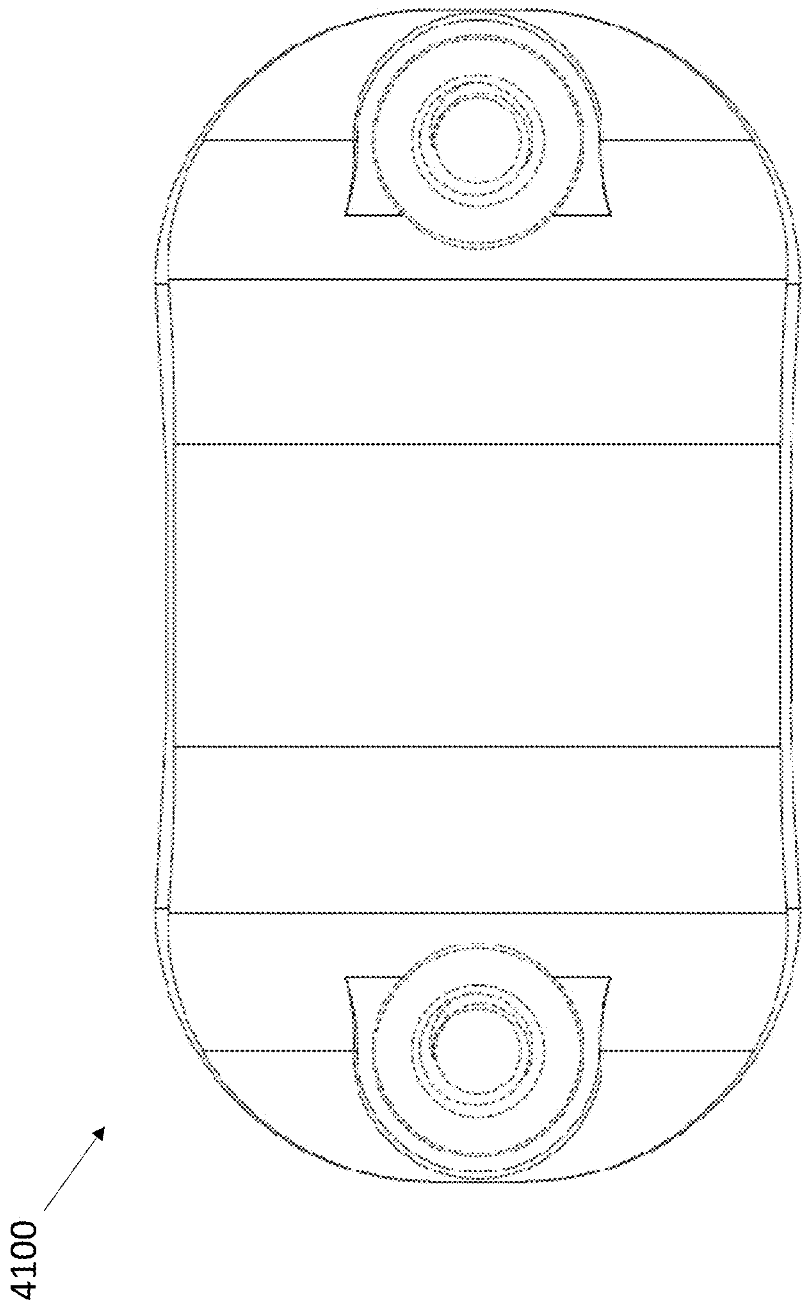
FIG. 47 is an illustration of a bottom view of a musical instrument mounting device in accordance with certain embodiments of the present disclosure.
Figure 48:
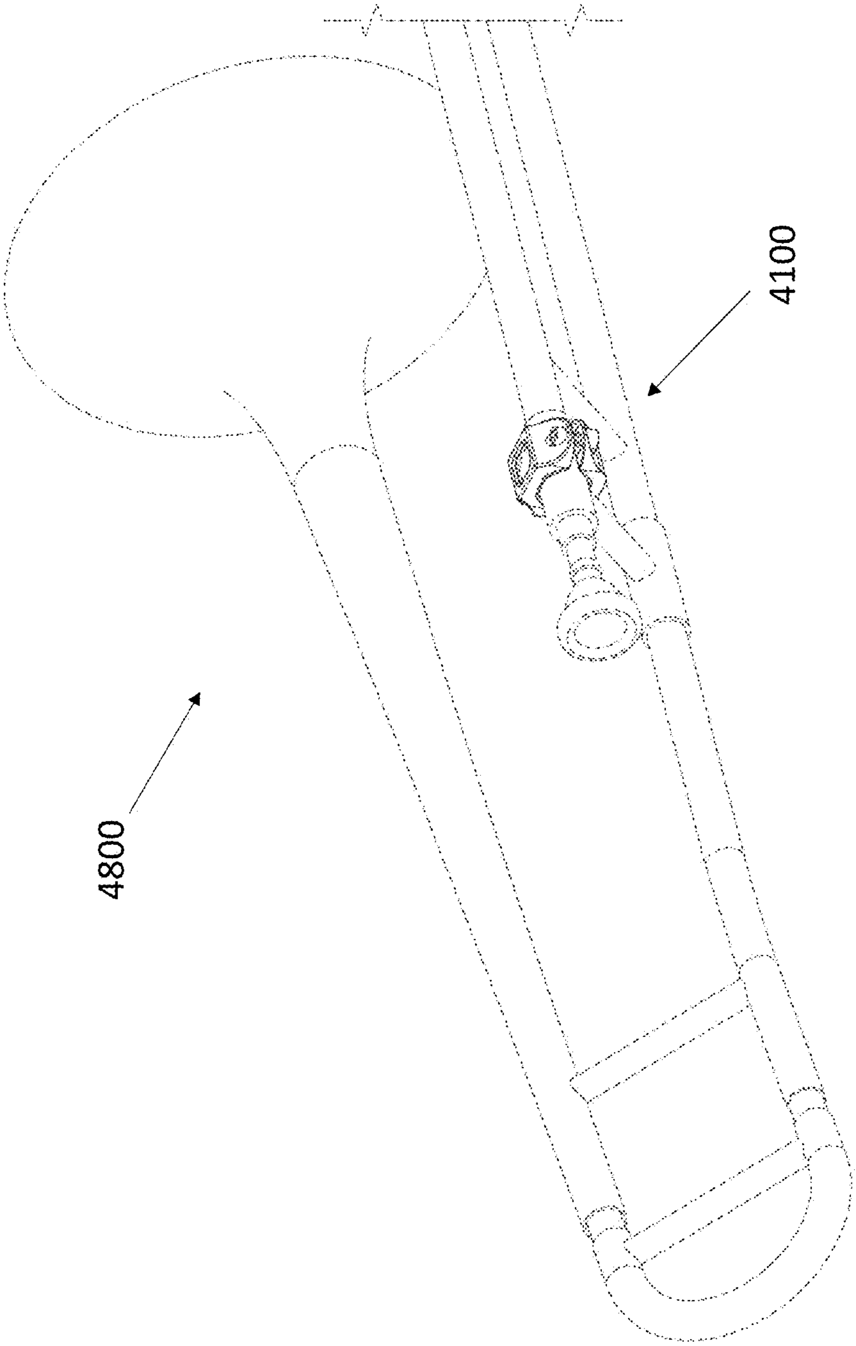
FIG. 48, which is an illustration of a perspective view of a musical instrument mounting device mounted to a musical instrument in accordance with certain embodiments of the present disclosure.

FIG. 41 is an illustration of a perspective view of a musical instrument mounting device 4100 in accordance with certain embodiments of the present disclosure. FIG. 42 is an illustration of a side view of musical instrument mounting device 4100 in accordance with certain embodiments of the present disclosure. FIG. 43 is an illustration of an additional side view of musical instrument mounting device 4100 in accordance with certain embodiments of the present disclosure. FIG. 44 is an illustration of an additional side view of musical instrument mounting device 4100 in accordance with certain embodiments of the present disclosure. FIG. 45 is an illustration of an additional side view of musical instrument mounting device 4100 in accordance with certain embodiments of the present disclosure. FIG. 46 is an illustration of a top view of musical instrument mounting device 4100 in accordance with certain embodiments of the present disclosure. FIG. 47 is an illustration of a bottom view of musical instrument mounting device 4100 in accordance with certain embodiments of the present disclosure. FIG. 48 is an illustration of a perspective view of musical instrument mounting device 4100 mounted to a musical instrument 4800 in accordance with certain embodiments of the present disclosure. As shown, musical instrument mounting device 4100 may be similar in structure and characteristics as musical instrument mounting device 400 (see FIGS. 4A and 4B). It is further noted that some portions of musical instrument mounting device 4100 found in FIGS. 41-48 are for illustrative purposes only and form no part of any claimed design claimed herein or thereafter.

It is noted that multiple musical instrument mounting devices are disclosed that include similar structural features. In embodiments, each of the disclosed musical instrument mounting devices include a mounting body and an attachment portion affixed to the mounting body, where the attachment portion is configured to attach to one or more types of musical instruments. The musical instrument mounting devices also include a receiver section affixed to the mounting body, where the receiver section is positioned adjacent the attachment portion. Further in regard to the musical instrument mounting devices, the attachment portion of the mounting body is proportional to an attachment point on each of the one or more types of musical instruments (see FIGS. 1C, 1E, 2D-2F, 3B, 3D, 3E, and 4B). For example, attachment portions (clamp sections 110, 160) of musical instrument mounting devices 100,155 are proportional to a leadpipe of a trumpet 145,195 or a leadpipe of similar instruments. As another example, attachment portions (upper compression sections 220,270) of musical instrument mounting devices 200,250 are proportional to a section just below a barrel of a clarinet 295 or a section of similar instruments. As another example, attachment portion (attachment segment 321) of musical instrument mounting device 300 is proportional to a neck/body of a saxophone 345 or a neck/body of similar instruments. As another example, attachment portion (first and second clip portions 372,374) of musical instrument mounting device 350 is proportional to a neck/body of a saxophone 395 or a neck/body of similar instruments. As another example, attachment portion (loop retainer 390) of musical instrument mounting device 350 is proportional to a neck screw of a saxophone 395 or a neck screw of similar instruments. As another example, attachment portion (clamp body 410) of musical instrument mounting device 400 is proportional to a mouthpiece receiver of a trombone 495 or a mouthpiece receiver of similar instruments.

Further in regard to the musical instrument mounting devices, the receiver sections of each musical instrument mounting device may vary in structure/configuration. For example, receiver section of musical instrument mounting device 100 includes at least receiver section 130 and retainer (buckle) body 132. As another example, receiver section of musical instrument mounting device 155 includes at least receiver section 180 and retainer body 182. As another example, receiver section of musical instrument mounting device 200 includes at least retainer (buckle) body 232. As another example, receiver section of musical instrument mounting device 250 includes at least retainer body 282. As another example, receiver section of musical instrument mounting device 300 includes at least retainer (buckle) body 332. As another example, receiver section of musical instrument mounting device 350 includes at least retainer body 382. As another example, receiver section of musical instrument mounting device 400 includes at least retainer body 482.

In further embodiments, the receiver section is positioned perpendicular to one or more compressive forces exerted by the attachment portion on the one or more types of musical instruments. In further embodiments, the attachment point is positioned adjacent a line of vision of an individual playing the one or more types of musical instruments. In further embodiments, the receiver section is configured to receive a retainer device for securing a mobile electronic device within a line of vision of an individual playing the one or more types of musical instruments. In further embodiments, the attachment portion and the receiver section are affixed to one another as an integral body.

It is noted that musical instrument mounting devices 100,155,200,250,300,350,400 include configurations (attachment portions such as, for example, clamp section 110, clamp section 160, upper compression section 220, upper compression section 270, attachment segment 321, first and second clip portions 372,374, loop retainer 390, and clamp body 410) that position a retainer body (such as, for example, retainer (buckle) body 132, retainer body 182, retainer (buckle) body 232, retainer body 282, retainer (buckle) body 332, and retainer body 382) within a line of sight of an individual playing a musical instrument. The attachment portions may be configured to receive a retainer device (such as, for example, retainer device 296, retainer device 750, retainer device 850, and retainer device 1050).

It is noted that, in embodiments, a “retainer body” may include a transition section and a receiver section of any of the musical instrument mounting devices disclosed.

For the purposes of this disclosure, the term “retainer device”, in regard to a mobile electronic device, may refer to a device that includes three main components: a coupling device (such as, for example, coupling device 860), an extension arm (such as, for example, extension arm 868), and a receiver section for receiving/securing a mobile electronic device (such as, for example, receiver portion 851). In other embodiments, the term “retainer device” may refer to a device that includes two main components: a coupling device (such as, for example, coupling portion 1060) and an extension arm (such as, for example, extension arm 1068).

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a system for mounting a mobile electronic device to a musical instrument, comprising: a musical instrument mounting device including: an attachment portion configured to attach to one or more types of musical instruments; and a receiver section attached to the attachment portion, the receiver section including a receiving means configured to receive a coupling device for securing a mobile electronic device to the musical instrument mounting device; a retainer device configured to retain a mobile electronic device, the retainer device including: an extension arm having a top end, a bottom end, a first side, and a second side; the coupling device affixed to the bottom end of the extension arm; and a receiver portion configured to support a mobile electronic device, the receiver portion removably affixed to the first side of the extension arm; and a cover plate removably affixed to the second side of the extension arm opposite the receiver portion, the cover plate including a substantially flat body having a first surface and a second surface.

Clause 2, the system of Clause 1, further comprising a twist knob positioned at a top end of the receiver portion, the twist knob configured to vary a compression force of the receiver portion on the mobile electronic device.

Clause 3, the system of Clause 1, wherein the receiver portion and the cover plate are removably affixed to the extension arm via magnets.

Clause 4, the system of Clause 3, wherein the extension arm comprises a stepped magnet positioned at the top end of the extension arm, the stepped magnet including a first surface exposed along the first side of the extension arm and a second opposing surface exposed along the second side of the extension arm, the receiver portion including a first disc magnet removably affixed to the first surface of the stepped magnet, the cover plate including a second disc magnet removably affixed to the second surface of the stepped magnet.

Clause 5, the system of Clause 4, wherein the receiver portion comprises a protrusion integral with the receiver portion and positioned below the first disc magnet, the protrusion configured to abut the extension arm and increase surface contact of the first disc magnet of the receiver portion and the first surface of the stepped magnet of the extension arm.

Clause 6, the system of Clause 1, wherein the extension arm comprises a first set of protrusions having a first set of aligned orifices, further wherein the coupling device comprises a second set of protrusions having a second set of aligned orifices, the first set of protrusions further defining a set of spaces for interlocking engagement with the second set of protrusions.

Clause 7, the system of Clause 6, wherein the first set of protrusions are secured to the second set of protrusions via a pin secured within the first set of aligned orifices and the second set of aligned orifices when the first set of protrusions and the second set of protrusions are interlockingly engaged.

Clause 8, the system of Clause 1, wherein the coupling device comprises a buckle latch, the buckle latch including a pair of extension arms affixed to a first end of the coupling device and extending along a majority of the length of the coupling device, the pair of extension arms each comprising a portion of a latch defined at a second end of the coupling device.

Clause 9, the system of Clause 8, wherein the receiving means of the receiver section comprises a buckle body including a first frame member and a second frame member defining a channel therebetween, the channel configured to receive the pair of extension arms when the pair of extension arms are compressed toward one another, the buckle body secured to the coupling device when the pair of extension arms and the portions of the latch abut the buckle body when in an uncompressed state.

Clause 10, the system of Clause 9, wherein the buckle body is secured to the coupling device, further wherein the coupling device comprises an alignment portion positioned parallel with the pair of extension arms when the extension arms are in an uncompressed state, the alignment portion engaging the buckle body for reduction in lateral movement of the coupling device.

Clause 11, the system of Clause 1, wherein retainer device comprises an integral body.

Clause 12, the system of Clause 1, further comprising the mobile electronic device supported in the receiver portion, wherein the mobile electronic device and the cover plate are parallel to one another.

Clause 13, the system of Clause 1, wherein the cover plate comprises a perimeter greater than that of the mobile electronic device.

Clause 14, the system of Clause 1, wherein the cover plate comprises at least one LED affixed to the second surface of the cover plate.

Clause 15, the system of Clause 14, wherein the cover plate further comprises a controller electrically connected to a processor of the mobile electronic device and the one or more LEDs, the controller configured to receive continuous varying signals from the processor of the mobile electronic device for adjustment of an emission of light from at least some of the one or more LEDs.

Clause 16, the system of Clause 1, wherein musical instrument mounting device comprises a transition section positioned between the attachment portion and the receiver section, the transition section extending away from the clamp section.

Clause 17, the system of Clause 16, wherein the attachment portion comprises a clamp section, further wherein the clamp section defines a clamp axis and the receiver section defines a receiver axis parallel with the clamp axis.

Clause 18, the system of Clause 17, wherein the transition section is wedged between at least one piston valve of the musical instrument and a finger hook of the musical instrument when the clamp section is affixed to a leadpipe of the musical instrument.

Clause 19, the system of Clause 1, further comprising at least one concavity defined along at least a distal end of the receiver section, the transition section, or the receiver section, wherein the concavity is configured to abut a portion of the musical instrument.

Clause 20, the system of Clause 1, wherein the at least one of a lower clamp portion and an upper clamp portion defines a space configured to securely receive a portion of a brass instrument.

What is claimed is:

1. A system for mounting a mobile electronic device to a musical instrument, comprising:

- a musical instrument mounting device including:
  - an attachment portion configured to attach to one or more types of musical instruments; and
  - a receiver section attached to the attachment portion, the receiver section including a receiving means configured to receive a coupling device for securing a mobile electronic device to the musical instrument mounting device;
- a retainer device configured to retain a mobile electronic device, the retainer device including:
  - an extension arm having a top end, a bottom end, a first side, and a second side;
  - the coupling device affixed to the bottom end of the extension arm; and
  - a receiver portion configured to support a mobile electronic device, the receiver portion removably affixed to the first side of the extension arm; and
- a cover plate removably affixed to the second side of the extension arm opposite the receiver portion, the cover plate including a substantially flat body having a first surface and a second surface.

2. The system of claim 1, further comprising a twist knob positioned at a top end of the receiver portion, the twist knob configured to vary a compression force of the receiver portion on the mobile electronic device.

3. The system of claim 1, wherein the receiver portion and the cover plate are removably affixed to the extension arm via magnets.

4. The system of claim 3, wherein the extension arm comprises a stepped magnet positioned at the top end of the extension arm, the stepped magnet including a first surface exposed along the first side of the extension arm and a second opposing surface exposed along the second side of the extension arm, the receiver portion including a first disc magnet removably affixed to the first surface of the stepped magnet, the cover plate including a second disc magnet removably affixed to the second surface of the stepped magnet.

5. The system of claim 4, wherein the receiver portion comprises a protrusion integral with the receiver portion and positioned below the first disc magnet, the protrusion configured to abut the extension arm and increase surface contact of the first disc magnet of the receiver portion and the first surface of the stepped magnet of the extension arm.

6. The system of claim 1, wherein the extension arm comprises a first set of protrusions having a first set of aligned orifices, further wherein the coupling device comprises a second set of protrusions having a second set of aligned orifices, the first set of protrusions further defining a set of spaces for interlocking engagement with the second set of protrusions.

7. The system of claim 6, wherein the first set of protrusions are secured to the second set of protrusions via a pin secured within the first set of aligned orifices and the second set of aligned orifices when the first set of protrusions and the second set of protrusions are interlockingly engaged.

8. The system of claim 1, wherein the coupling device comprises a buckle latch, the buckle latch including a pair of extension arms affixed to a first end of the coupling device and extending along a majority of the length of the coupling device, the pair of extension arms each comprising a portion of a latch defined at a second end of the coupling device.

9. The system of claim 8, wherein the receiving means of the receiver section comprises a buckle body including a first frame member and a second frame member defining a channel therebetween, the channel configured to receive the pair of extension arms when the pair of extension arms are compressed toward one another, the buckle body secured to the coupling device when the pair of extension arms and the portions of the latch abut the buckle body when in an uncompressed state.

10. The system of claim 9, wherein the buckle body is secured to the coupling device, further wherein the coupling device comprises an alignment portion positioned parallel with the pair of extension arms when the extension arms are in an uncompressed state, the alignment portion engaging the buckle body for reduction in lateral movement of the coupling device.

11. The system of claim 1, wherein the retainer device comprises an integral body.

12. The system of claim 1, further comprising the mobile electronic device supported in the receiver portion, wherein the mobile electronic device and the cover plate are parallel to one another.

13. The system of claim 1, wherein the cover plate comprises a perimeter greater than that of the mobile electronic device.

14. The system of claim 1, wherein the cover plate comprises at least one LED affixed to the second surface of the cover plate.

15. The system of claim 14, wherein the cover plate further comprises a controller electrically connected to a processor of the mobile electronic device and the one or more LEDs, the controller configured to receive continuous varying signals from the processor of the mobile electronic device for adjustment of an emission of light from at least some of the one or more LEDs.

16. The system of claim 1, wherein musical instrument mounting device comprises a transition section positioned between the attachment portion and the receiver section, the transition section extending away from the clamp section.

17. The system of claim 16, wherein the attachment portion comprises a clamp section, further wherein the clamp section defines a clamp axis and the receiver section defines a receiver axis parallel with the clamp axis.

18. The system of claim 17, wherein the transition section is wedged between at least one piston valve of the musical instrument and a finger hook of the musical instrument when the clamp section is affixed to a leadpipe of the musical instrument.

19. The system of claim 1, further comprising at least one concavity defined along at least a distal end of the receiver section, the transition section, or the receiver section, wherein the concavity is configured to abut a portion of the musical instrument.

20. The system of claim 1, wherein the at least one of a lower clamp portion and an upper clamp portion defines a space configured to securely receive a portion of a brass instrument.

* * * * *